(12) United States Patent
Schneider et al.

(10) Patent No.: US 11,292,016 B2
(45) Date of Patent: Apr. 5, 2022

(54) NOZZLE ASSEMBLY USED TO MANUFACTURE ABSORBENT ARTICLES

(71) Applicant: The Procter & Gamble Company, Cincinnati, OH (US)

(72) Inventors: Uwe Schneider, Cincinnati, OH (US); Klaus Eimann, Zellingen (DE); Agnieszka Zuzanna Ries, Cologne (DE); Ricky Reynaldo Yanez, Jr., Cincinnati, OH (US); Dirk Manfred Georg Esser, Sierscheid (DE)

(73) Assignee: The Procter & Gamble Company, Cincinnati, OH (US)

( * ) Notice: Subject to any disclaimer, the term of this patent is extended or adjusted under 35 U.S.C. 154(b) by 357 days.

(21) Appl. No.: 16/299,509

(22) Filed: Mar. 12, 2019

(65) Prior Publication Data

US 2019/0283050 A1   Sep. 19, 2019

Related U.S. Application Data

(60) Provisional application No. 62/643,785, filed on Mar. 16, 2018.

(51) Int. Cl.
*B29C 64/295* (2017.01)
*B29C 64/209* (2017.01)
(Continued)

(52) U.S. Cl.
CPC .............. *B05B 3/001* (2013.01); *B05B 1/24* (2013.01); *B05B 13/0457* (2013.01);
(Continued)

(58) Field of Classification Search
None
See application file for complete search history.

(56) References Cited

U.S. PATENT DOCUMENTS

| 4,324,246 A | 4/1982 | Mullane et al. |
| 4,342,314 A | 8/1982 | Radel et al. |

(Continued)

FOREIGN PATENT DOCUMENTS

| CN | 204 658 567 U | 9/2015 |
| DE | 197 48 110 A1 | 5/1998 |

(Continued)

*Primary Examiner* — Charles Capozzi
(74) *Attorney, Agent, or Firm* — Christian M. Best; Charles R. Matson

(57) ABSTRACT

An apparatus for applying a first fluid to an advancing substrate comprising a nozzle body made, at least in part, using an additive manufacturing method. The nozzle body comprises a fluid orifice for receiving the first fluid; a conduit in fluid communication with the fluid orifice for receiving the first fluid received by the fluid orifice; a passageway in fluid communication with the conduit for receiving the first fluid received by the conduit; and a slot in fluid communication with the passageway for applying the first fluid to the advancing substrate. A method for making an apparatus comprising a nozzle body is also provided, comprising: sequentially forming, from at least one material using an additive manufacturing method, a plurality of layers in a configured pattern corresponding to a shape of at least one of an upper nozzle assembly member or of a lower nozzle assembly member of the nozzle body.

13 Claims, 23 Drawing Sheets

(51) Int. Cl.
  *B05B 3/00* (2006.01)
  *B05B 13/04* (2006.01)
  *B05B 1/24* (2006.01)
  *B33Y 30/00* (2015.01)
  *B33Y 40/00* (2020.01)

(52) U.S. Cl.
  CPC .......... *B29C 64/209* (2017.08); *B29C 64/295* (2017.08); *B33Y 30/00* (2014.12); *B33Y 40/00* (2014.12)

(56) References Cited

U.S. PATENT DOCUMENTS

| | | |
|---|---|---|
| 4,463,045 A | 7/1984 | Ahr et al. |
| 4,493,868 A | 1/1985 | Meitner |
| 4,556,146 A | 12/1985 | Swanson et al. |
| 4,589,876 A | 5/1986 | Van Tilburg |
| 4,687,478 A | 8/1987 | Van Tilburg |
| 4,735,169 A | 4/1988 | Clawston et al. |
| 4,844,004 A | 7/1989 | Hadzimihalis et al. |
| 4,854,984 A | 8/1989 | Ball et al. |
| 4,950,264 A | 8/1990 | Osborn, III |
| 5,009,653 A | 4/1991 | Osborn, III |
| 5,259,283 A | 11/1993 | Michalik |
| 5,267,992 A | 12/1993 | Van Tilburg |
| 5,620,779 A | 4/1997 | Levy et al. |
| 5,798,167 A | 8/1998 | Connor et al. |
| 5,983,764 A | 11/1999 | Hillebrand |
| 6,004,893 A | 12/1999 | Van Tilburg |
| 6,244,148 B1 | 6/2001 | Vees |
| 6,248,195 B1 | 6/2001 | Schmitz |
| 6,319,316 B1* | 11/2001 | Gibson ................ B05C 5/0254 118/410 |
| 7,056,386 B2 | 6/2006 | Pahl |
| 7,777,094 B2 | 8/2010 | Mori et al. |
| 7,861,756 B2 | 1/2011 | Jenquin et al. |
| 8,186,296 B2 | 5/2012 | Brown et al. |
| 8,347,809 B2 | 1/2013 | Takahashi et al. |
| 8,399,053 B2 | 3/2013 | Bondeson et al. |
| 8,440,043 B1 | 5/2013 | Schneider et al. |
| 8,979,521 B2 | 3/2015 | Kondo |
| 9,248,054 B2 | 2/2016 | Brown et al. |
| 9,265,672 B2 | 2/2016 | Brown et al. |
| 9,295,590 B2 | 3/2016 | Brown et al. |
| 2005/0103174 A1 | 5/2005 | Held et al. |
| 2007/0142798 A1 | 6/2007 | Goodlander et al. |
| 2007/0142806 A1 | 6/2007 | Roe et al. |
| 2007/0287983 A1 | 12/2007 | Lodge et al. |
| 2008/0110398 A1* | 5/2008 | Wyatt .................... B05C 5/001 118/712 |
| 2009/0057944 A1* | 3/2009 | Fork ........................ B41J 2/005 264/177.1 |
| 2009/0071608 A1 | 3/2009 | Thomas et al. |
| 2009/0162595 A1* | 6/2009 | Ko ............................ B32B 7/06 428/41.9 |
| 2011/0023671 A1 | 2/2011 | Herlinger et al. |
| 2011/0271903 A1* | 11/2011 | Durst .................... B05C 5/0254 118/300 |
| 2012/0079926 A1 | 4/2012 | Long et al. |
| 2012/0219657 A1 | 8/2012 | Kondo |
| 2013/0049438 A1 | 2/2013 | Nootbaar et al. |
| 2013/0213547 A1 | 8/2013 | Schneider et al. |
| 2013/0218116 A1 | 8/2013 | Schneider |
| 2014/0377506 A1 | 12/2014 | Eckstein et al. |
| 2014/0377513 A1 | 12/2014 | Galie et al. |
| 2017/0057168 A1* | 3/2017 | Miller .................... B33Y 30/00 |
| 2017/0341256 A1 | 11/2017 | Schneider et al. |
| 2018/0050364 A1* | 2/2018 | Larrabee ............... F16B 39/021 |
| 2018/0369024 A1 | 12/2018 | Eimann et al. |

FOREIGN PATENT DOCUMENTS

| | | |
|---|---|---|
| DE | 102 09 214 A1 | 9/2003 |
| DE | 10 2006 017086 A1 | 10/2007 |
| EP | 2 042 437 A1 | 4/2009 |
| EP | 1 635 750 B1 | 10/2009 |
| EP | 2 279 954 A2 | 2/2011 |
| WO | WO 97/23398 A1 | 7/1997 |

* cited by examiner

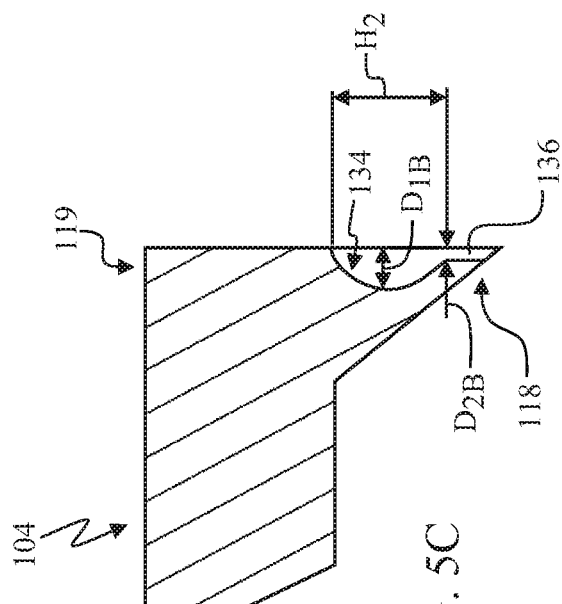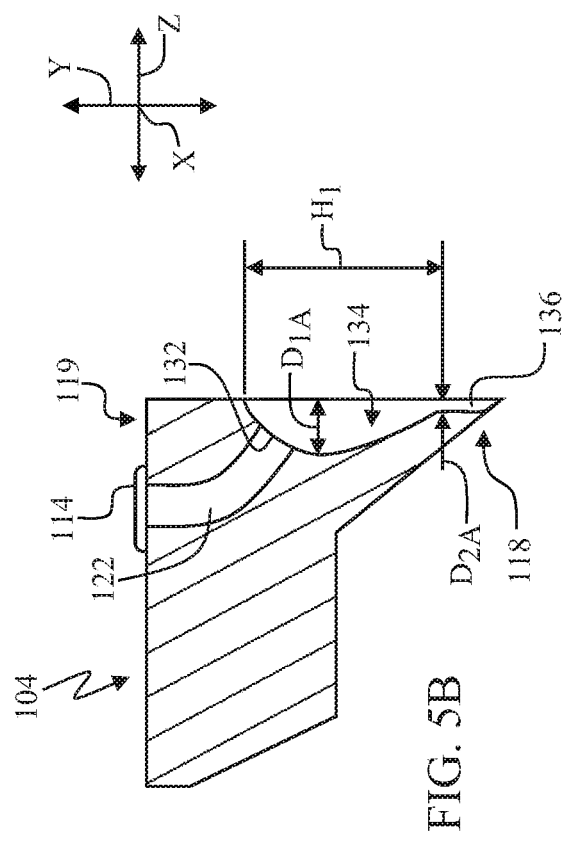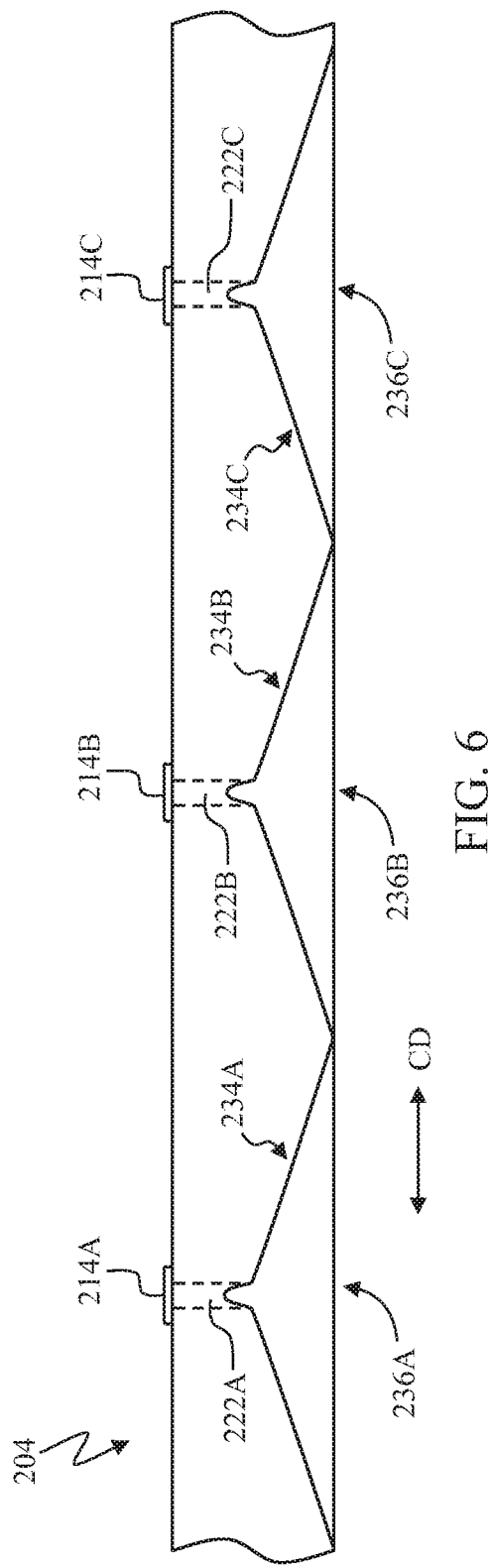

NOZZLE ASSEMBLY USED TO MANUFACTURE ABSORBENT ARTICLES

FIELD OF THE INVENTION

The present disclosure relates to apparatuses and methods for manufacturing absorbent articles, and more particularly, nozzles having a nozzle body constructed from at least two different materials for improved wear resistance and improved control of a temperature and a distribution pattern of a fluid applied by the nozzle to a substrate.

BACKGROUND OF THE INVENTION

Along an assembly line, various types of articles, such as for example, diapers and other absorbent articles, may be assembled by adding components to and otherwise modifying an advancing, continuous web of material using various methods and apparatuses. For example, some operations may utilize a nozzle to deposit a metered amount of a fluid, such as an adhesive or polymer, onto an advancing substrate that advances in a machine direction adjacent to the slot nozzle. The nozzle directs the fluid in the required distribution pattern onto the application area of the substrate. Once the desired component parts are assembled and the desired modifications are made, the advancing web(s) and component parts are subjected to a final knife cut to separate the web(s) into discrete diapers or other absorbent articles. The discrete diapers or absorbent articles may also then be folded and packaged.

Adhesives and polymers are typically deposited in molten form and pumped under pressure to the nozzle. Control of the fluid temperature is required to maintain a certain viscosity and pressure, which, in turn, control a distribution pattern of the fluid on the advancing substrate, fiber diameter, etc. The components of the nozzle are heated, typically to 100° C. and higher, to maintain this temperature control. However, many conventional nozzles suffer from uneven temperature profiles across the nozzle body. In addition, many fluids have a low solidification point or temperature and/or require a longer amount of time to solidify, and the current high processing temperatures prolong solidification, all of which may lead to undesirable results such as an uneven or incorrect distribution pattern, localized accumulations of the fluid on the substrate, regionally reduced bond strength between the fluid and the substrate, and the like.

Conventional nozzle manufacturing and repair techniques also have a number of drawbacks, including, for example, a higher cost and limited capabilities for combining different materials within a single apparatus and for forming custom shapes, particularly a complex and/or curved internal geometry. Furthermore, repetitive contact between the advancing substrate and the slot nozzle and/or the properties of the fluid expelled from the slot nozzle cause wear on the slot nozzle, which necessitates costly repair or replacement of the slot nozzle.

Accordingly, there is a need for methods and apparatuses with slot nozzles having improved wear resistance and improved temperature and distribution pattern control, in which the slot nozzles may be designed for ease of manufacture at relatively low costs.

SUMMARY OF THE INVENTION

Aspects of the present disclosure involve apparatuses and methods for manufacturing absorbent articles, and more particularly, apparatuses and methods for applying fluid to an advancing substrate during the manufacture of disposable absorbent articles.

In accordance with an aspect of the present disclosure, an apparatus for applying a first fluid to an advancing substrate is provided. The apparatus may comprise: a nozzle body made, at least in part, using an additive manufacturing method. The nozzle body may comprise: a fluid orifice for receiving the first fluid; a conduit in fluid communication with the fluid orifice for receiving the first fluid received by the fluid orifice; a passageway in fluid communication with the conduit for receiving the first fluid received by the conduit; and a slot in fluid communication with the passageway for applying the first fluid to the advancing substrate.

The nozzle body may comprise at least one first material having a first set of properties and at least one second material having a second set of properties, the first set of properties being different from the second set of properties. In some examples, the at least one first material may comprise at least one of an iron-based alloy, an aluminum-based alloy, a titanium-based alloy, a nickel-based alloy, or a high-alloy steel with one or more carbides; and the at least one second material may comprise at least one of an iron-based alloy, an aluminum-based alloy, a titanium-based alloy, a nickel-based alloy, or a high-alloy steel with one or more carbides. In other examples, the nozzle body may comprise an upper nozzle assembly comprising the at least one first material and a lower nozzle assembly comprising the at least one second material; the first material may comprise one or more metals; and the second material may comprise one of (i) one or more metals or (ii) one or more polymers.

The apparatus may further comprise at least one duct for receiving and conveying a second fluid. In some examples, the at least one duct may supply the second fluid via a supply channel to the first fluid as the first fluid exits the slot and is deposited onto the advancing substrate.

The nozzle body may comprise an upper nozzle assembly and a lower nozzle assembly, in which the apparatus may further comprise: a thermally insulating material positioned between the upper and lower nozzle assemblies.

The apparatus may further comprise a heating element embedded or formed into a portion of the nozzle body adjacent to at least one of the fluid orifice, the conduit, the passageway, or the slot, in which the heating element is adapted to provide heat energy to the portion of the nozzle body.

The nozzle body may comprise an upper nozzle assembly comprising a first nozzle member and a second nozzle member. In some examples, at least one of the first nozzle member or the second nozzle member may comprise the passageway; and at least one dimension of the passageway is configured to manage a pressure profile of the first fluid through the passageway. In some particular examples, the at least one dimension of the passageway may be configured to maintain a mass flow rate of the first fluid through the slot, the mass flow rate being substantially constant across a width of the passageway in a cross direction (CD). In other particular examples, the passageway may extend up to within 0.2 mm of opposing outer end surfaces of the at least one of the first nozzle member or the second nozzle member. In other examples, a first portion of at least one of the first nozzle member or the second nozzle member may comprise a first material having a first set of properties and a second portion of the at least one of the first nozzle member or the second nozzle member may comprise a second material having a second set of properties, the first set of properties being different from the second set of properties. In some particular examples, the at least one of the first nozzle member or the second nozzle member may comprise the passageway and the slot; the second portion may comprise an exit portion of the at least one of the first nozzle member or the second nozzle member, the second material being fused to the first material; and a section of the respective exit portion defines the slot and may comprise a plurality of distribution channels formed in the second material by a laser ablation process, the distribution channels controlling a distribution pattern of the first fluid deposited on the advancing substrate. In a further particular example, the second material may comprise a material having a greater wear resistance as compared to the first material. In further examples, at least one of the first nozzle member or the second nozzle member may have an internal hollow portion that may comprise approximately 50% of an internal volume of the one nozzle member.

The apparatus may further comprise at least one sensor embedded into a portion of the nozzle body. In some examples, the apparatus may further comprise a controller coupled to the at least one sensor for receiving data from the at least one sensor, in which the controller controls operation of the apparatus based on the data.

In accordance with an aspect of the present disclosure, a method for making an apparatus comprising a nozzle body with at least one nozzle member for applying a first fluid to an advancing substrate is presented. The method may comprise: sequentially forming, from at least one material using an additive manufacturing method, a plurality of layers in a configured pattern corresponding to a shape of the at least one nozzle member of the nozzle body. The nozzle body may comprise: a fluid orifice for receiving the first fluid; a conduit in fluid communication with the fluid orifice for receiving the first fluid received by the fluid orifice; a passageway in fluid communication with the conduit for receiving the first fluid received by the conduit; and a slot in fluid communication with the passageway for applying the first fluid to the advancing substrate.

The additive manufacturing method may comprise at least one of metal powder application (MPA), selective laser melting (SLM), or laser metal deposition (LMD).

The at least one material may comprise a first material having a first set of properties and a second material having a second set of properties, in which the first set of properties is different from the second set of properties.

The nozzle body may further comprise at least one duct for receiving and conveying a second fluid. In some examples, the at least one duct may be formed such that the second fluid is supplied to the first fluid as the first fluid exits the slot and is deposited onto the advancing substrate.

The at least one material may comprise at least one of an iron-based alloy, an aluminum-based alloy, a titanium-based alloy, a nickel-based alloy, or a high-alloy steel with one or more carbides.

The at least one nozzle member may comprise an upper nozzle assembly member and a lower nozzle assembly member; the at least one material used to form the upper nozzle assembly member may comprise one or more metals; and the at least one material used to form the lower nozzle assembly member may comprise one of (i) one or more metals or (ii) one or more polymers. In some examples, the method may further comprise: positioning a thermally insulating material between the upper and lower nozzle assembly members.

The at least one nozzle member may comprise the fluid orifice, the conduit, the passageway, and the slot, and the method may further comprise: during forming of the at least one nozzle member, embedding or forming a heating element into a portion of the nozzle member such that the heating element is adjacent to at least one of the fluid orifice, the conduit, the passageway, or the slot, in which the heating element is adapted to provide heat energy to the portion of the nozzle member.

The at least one nozzle member may comprise a first nozzle member, and the method may further comprise: sequentially forming, from at least one material using an additive manufacturing method, a plurality of layers in a configured pattern corresponding to a shape of a second nozzle member. In some examples, at least one of the first nozzle member or the second nozzle member may comprise the passageway; and at least one dimension of the passageway may be configured to manage a pressure profile of the first fluid through the passageway. In some particular examples, the at least one dimension of the passageway may be configured to maintain a mass flow rate of the first fluid through the slot, the mass flow rate being substantially constant across a width of the passageway in a cross direction (CD). In other examples, the passageway may extend up to within 0.2 mm of opposing outer end surfaces of the at least one of the first nozzle member or the second nozzle member. In further examples, a first portion of at least one of the first nozzle member or the second nozzle member may comprise a first material having a first set of properties and a second portion of the at least one of the first nozzle member or the second nozzle member may comprise a second material having a second set of properties, the first set of properties being different from the second set of properties. In some particular examples in which at least one of the first nozzle member or the second nozzle member comprises the passageway and the slot and the second portion comprises an exit portion of the at least one of the first nozzle member or the second nozzle member, the method may further comprise: fusing the second material to the first material; and forming, using a laser ablation process, a plurality of distribution channels in the second material of a section of the exit portion defining the slot, the distribution channels controlling a distribution pattern of the first fluid deposited on the advancing substrate. The second material may comprise a material having a greater wear resistance as compared to the first material. In yet further examples, at least one of the first nozzle member or the second nozzle member may have an internal hollow portion comprising approximately 50% of the internal volume of the one nozzle member.

The method may further comprise: embedding one or more sensors in the at least one nozzle member.

In accordance with an aspect of the present disclosure, an apparatus for applying a first fluid to an advancing substrate is provided. The apparatus may comprise a nozzle assembly comprising a nozzle body made, at least in part, using an additive manufacturing method. The nozzle body may comprise: a fluid orifice for receiving the first fluid; a conduit in fluid communication with the fluid orifice for receiving the first fluid received by the fluid orifice; a passageway in fluid communication with the fluid orifice for receiving the first fluid received by the conduit; a slot in fluid communication with the passageway for applying the first fluid to the advancing substrate; and a heating element embedded or formed into a portion of the nozzle body adjacent to at least one of the fluid orifice, the conduit, the passageway, or the slot, in which the heating element is adapted to provide heat energy to the portion of the nozzle body.

The nozzle body may comprise at least one first material having a first set of properties and at least one second material having a second set of properties, the first set of properties being different from the second set of properties. In some examples, the at least one first material may comprise at least one of an iron-based alloy, an aluminum-based alloy, a titanium-based alloy, a nickel-based alloy, or a high-alloy steel with one or more carbides; and the at least one second material may comprise at least one of an iron-based alloy, an aluminum-based alloy, a titanium-based alloy, a nickel-based alloy, or a high-alloy steel with one or more carbides. In other examples, the nozzle body may comprise an upper nozzle assembly comprising the at least one first material and a lower nozzle assembly comprising the at least one second material; the first material may comprise one or more metals; and the second material may comprise one of (i) one or more metals or (ii) one or more polymers.

The apparatus may further comprise at least one duct for receiving and conveying a second fluid. In some examples, the at least one duct may supply the second fluid via a supply channel to the first fluid as the first fluid exits the slot and is deposited onto the advancing substrate.

The nozzle body may comprise an upper nozzle assembly and a lower nozzle assembly, and the apparatus may further comprise: a thermally insulating material positioned between the upper and lower nozzle assemblies.

The nozzle body may comprise an upper nozzle assembly comprising a first nozzle member and a second nozzle member. In some examples, at least one of the first nozzle member or the second nozzle member may comprise the passageway; and at least one dimension of the passageway may be configured to manage a pressure profile of the first fluid through the passageway. In some particular examples, the at least one dimension of the passageway may be configured to maintain a mass flow rate of the first fluid through the slot, the mass flow rate being substantially constant across a width of the passageway in a cross direction (CD). In other particular examples, the passageway may extend up to within 0.2 mm of opposing outer end surfaces of the at least one of the first nozzle member or the second nozzle member. In other examples, a first portion of at least one of the first nozzle member or the second nozzle member may comprise a first material having a first set of properties and a second portion of the at least one of the first nozzle member or the second nozzle member may comprise a second material having a second set of properties, the first set of properties being different from the second set of properties. In some particular examples, the at least one of the first nozzle member or the second nozzle member may comprise the passageway and the slot; the second portion may comprise an exit portion of the at least one of the first nozzle member or the second nozzle member, the second material being fused to the first material; and a section of the respective exit portion defines the slot and may comprise a plurality of distribution channels formed in the second material by a laser ablation process, the distribution channels controlling a distribution pattern of the first fluid deposited on the advancing substrate. The second material may comprise a material having a greater wear resistance as compared to the first material. In further examples, at least one of the first nozzle member or the second nozzle member may have an internal hollow portion comprising approximately 50% of an internal volume of the one nozzle member.

The apparatus may further comprise at least one sensor embedded into a portion of the nozzle body. In some examples, the apparatus may further comprise a controller coupled to the at least one sensor for receiving data from the at least one sensor, in which the controller controls operation of the apparatus based on the data.

In accordance with an aspect of the present disclosure, a method for making an apparatus comprising a nozzle body with at least one nozzle member for applying a first fluid to an advancing substrate is provided. The method may comprise: sequentially forming, from at least one material using an additive manufacturing method, a first plurality of layers in a configured pattern corresponding to a shape of the at least one nozzle member of the nozzle body. The at least one nozzle member may comprise: a fluid orifice for receiving the first fluid; a conduit in fluid communication with the fluid orifice for receiving the first fluid received by the fluid orifice; a passageway in fluid communication with the conduit for receiving the first fluid received by the conduit; and a slot in fluid communication with the passageway for applying the first fluid to the advancing substrate. The method may further comprise: placing or forming a heating element adjacent to at least one of the fluid orifice, the conduit, the passageway, or the slot, in which the heating element is adapted to provide heat energy to a portion of the nozzle body; and following placement or formation of the heating element, sequentially forming, from the at least one material using an additive manufacturing method, a second plurality of layers in the configured pattern to complete the at least one nozzle member of the nozzle body.

The additive manufacturing method may comprise at least one of metal powder application (MPA), selective laser melting (SLM), or laser metal deposition (LMD).

The at least one material may comprise a first material having a first set of properties and a second material having a second set of properties, in which the first set of properties is different from the second set of properties.

The nozzle body may further comprise at least one duct for receiving and conveying a second fluid. In some examples, the at least one duct may be formed such that the second fluid is supplied to the first fluid as the first fluid exits the slot and is deposited onto the advancing substrate.

The at least one material may comprise at least one of an iron-based alloy, an aluminum-based alloy, a titanium-based alloy, a nickel-based alloy, or a high-alloy steel with one or more carbides.

The at least one nozzle member may comprise an upper nozzle assembly member and a lower nozzle assembly member; the at least one material used to form the upper nozzle assembly member may comprise one or more metals; and the at least one material used to form the lower nozzle assembly member may comprise one of (i) one or more metals or (ii) one or more polymers. In some examples, the method may further comprise: positioning a thermally insulating material between the upper and lower nozzle assembly members.

The at least one nozzle member may comprise a first nozzle member, and the method may further comprise: sequentially forming, from at least one material using an additive manufacturing method, a plurality of layers in a configured pattern corresponding to a shape of a second nozzle member. In some examples, at least one of the first nozzle member or the second nozzle member may comprise the passageway; and at least one dimension of the passageway may be configured to manage a pressure profile of the first fluid through the passageway. In some particular examples, the at least one dimension of the passageway may be configured to maintain a mass flow rate of the first fluid through the slot, the mass flow rate being substantially constant across a width of the passageway in a cross direction (CD). In other examples, the passageway may extend up to within 0.2 mm of opposing outer end surfaces of the at least one of the first nozzle member or the second nozzle member. In further examples, a first portion of at least one of the first nozzle member or the second nozzle member may comprise a first material having a first set of properties and a second portion of the at least one of the first nozzle member or the second nozzle member may comprise a second material having a second set of properties, the first set of properties being different from the second set of properties. In some particular examples in which at least one of the first nozzle member or the second nozzle member may comprise the passageway and the slot and the second portion may comprise an exit portion of the at least one of the first nozzle member or the second nozzle member, the method may further comprise: fusing the second material to the first material; and forming, using a laser ablation process, a plurality of distribution channels in the second material of a section of the exit portion defining the slot, the distribution channels controlling a distribution pattern of the first fluid deposited on the advancing substrate. The second material may comprise a material having a greater wear resistance as compared to the first material. In further examples, at least one of the first nozzle member or the second nozzle member may have an internal hollow portion comprising approximately 50% of the internal volume of the one nozzle member.

The method may further comprise: embedding one or more sensors in at the least one nozzle member.

In accordance with an aspect of the present disclosure, an apparatus for applying a first fluid to an advancing substrate is provided. The apparatus may comprise: a nozzle assembly comprising a nozzle body made, at least in part, using an additive manufacturing method. The nozzle assembly may comprise: a fluid orifice for receiving the first fluid; a conduit in fluid communication with the fluid orifice for receiving the first fluid received by the fluid orifice; and a passageway in fluid communication with the fluid orifice for receiving the first fluid received by the conduit; and a slot in fluid communication with the passageway for applying the first fluid to the advancing substrate, in which the nozzle assembly may comprise a nozzle member having a first portion formed from at least one first material and a second portion defining an exit portion of the nozzle member formed from a second material fused with the first portion comprising the at least one first material. The second material may comprise a material having a greater wear resistance as compared to the at least one first material. A section of the exit portion defining the slot may comprise a plurality of distribution channels formed by a laser ablation process, the distribution channels controlling a distribution pattern of the first fluid deposited on the advancing substrate.

The at least one first material may comprise a first set of properties and the second material may comprise a second set of properties, the first set of properties being different from the second set of properties. In some examples, the at least one first material may comprise at least one of an iron-based alloy, an aluminum-based alloy, a titanium-based alloy, a nickel-based alloy, or a high-alloy steel with one or more carbides; and the second material may comprise at least one of a powder-metallurgical steel, a high speed steel, or a carbide of at least one Group 4, Group 5, Group 6, or Group 7 element.

The nozzle body may comprise an upper nozzle assembly comprising the at least one first material and a lower nozzle assembly comprising a third material; the at least one first material may comprise one or more metals; and the third material may comprise one of (i) one or more metals or (ii) one or more polymers.

The apparatus may further comprise at least one duct for receiving and conveying a second fluid. In some examples, the at least one duct may supply the second fluid via a supply channel to the first fluid as the first fluid exits the slot and is deposited onto the advancing substrate.

The nozzle body may comprise an upper nozzle assembly and a lower nozzle assembly, and the apparatus may further comprise: a thermally insulating material positioned between the upper and lower nozzle assemblies.

The apparatus may further comprise a heating element embedded or formed into a portion of the nozzle body adjacent to at least one of the fluid orifice, the conduit, the passageway, or the slot, in which the heating element is adapted to provide heat energy to the portion of the nozzle body.

The nozzle body may comprise an upper nozzle assembly comprising a first nozzle member and a second nozzle member. In some examples, at least one of the first nozzle member or the second nozzle member may comprise the passageway; and at least one dimension of the passageway may be configured to manage a pressure profile of the first fluid through the passageway. In some particular examples, the at least one dimension of the passageway may be configured to maintain a mass flow rate of the first fluid through the slot, the mass flow rate being substantially constant across a width of the passageway in a cross direction (CD). In other examples, the passageway may extend up to within 0.2 mm of opposing outer end surfaces of the at least one of the first nozzle member or the second nozzle member. In further examples, at least one of the first nozzle member or the second nozzle member may have an internal hollow portion comprising approximately 50% of an internal volume of the one nozzle member.

The apparatus may further comprise at least one sensor embedded into a portion of the nozzle body. In some examples, the apparatus may further comprise a controller coupled to the at least one sensor for receiving data from the at least one sensor, in which the controller controls operation of the apparatus based on the data.

In accordance with an aspect of the present disclosure, a method for making an apparatus comprising a nozzle body for applying a first fluid to an advancing substrate is provided. The method may comprise: sequentially forming, from at least one first material using an additive manufacturing method, a first plurality of layers in a configured pattern corresponding to a shape of a first portion of a nozzle member of the nozzle body, in which the nozzle member may comprise: a fluid orifice for receiving the first fluid; a conduit in fluid communication with the fluid orifice for receiving the first fluid received by the fluid orifice; a passageway in fluid communication with the conduit for receiving the first fluid received by the conduit; and a slot in fluid communication with the passageway for applying the first fluid to the advancing substrate. The method may further comprise: forming a second portion defining an exit portion of the nozzle member, in which the second portion comprises at least one layer of a second material fused with the first portion comprising the at least one first material, the second material comprising a material having a greater wear resistance as compared to the at least one first material; and forming, by a laser ablation process in a section of the exit portion defining the slot, a plurality of distribution channels, the distribution channels controlling a distribution pattern of the first fluid deposited on the advancing substrate.

The additive manufacturing method may comprise at least one of metal powder application (MPA), selective laser melting (SLM), or laser metal deposition (LMD).

The at least one material may comprise a first set of properties and the second material comprises a second set of properties, in which the first set of properties is different from the second set of properties.

The nozzle body may further comprise at least one duct for receiving and conveying a second fluid. In some examples, the at least one duct may be formed such that the second fluid is supplied to the first fluid as the first fluid exits the slot and is deposited onto the advancing substrate.

The at least one first material may comprise at least one of an iron-based alloy, an aluminum-based alloy, a titanium-based alloy, a nickel-based alloy, or a high-alloy steel with one or more carbides; and the second material may comprise at least one of a powder-metallurgical steel, a high speed steel, or a carbide of at least one Group 4, Group 5, Group 6, or Group 7 element.

The nozzle member may comprise an upper nozzle assembly member, and the method may further comprise: sequentially forming, from a third material using an additive manufacturing method, a plurality of layers in a configured pattern corresponding to a shape of a lower nozzle assembly member of the nozzle body. In some examples, the method may further comprise: positioning a thermally insulating material between the upper and lower nozzle assembly members.

The method may further comprise: during forming of the nozzle member, embedding or forming a heating element into a portion of the nozzle member such that the heating element is adjacent to at least one of the fluid orifice, the conduit, the passageway, or the slot, in which the heating element is adapted to provide heat energy to the portion of the nozzle member.

The nozzle member may comprise a first nozzle member, and the method may further comprise: sequentially forming, from at least one material using an additive manufacturing method, a plurality of layers in a configured pattern corresponding to a shape of a second nozzle member. In some examples, at least one of the first nozzle member or the second nozzle member may comprise the passageway; and at least one dimension of the passageway may be configured to manage a pressure profile of the first fluid through the passageway. In some particular examples, the at least one dimension of the passageway may be configured to maintain a mass flow rate of the first fluid through the slot, the mass flow rate being substantially constant across a width of the passageway in a cross direction (CD). In other examples, the passageway may extend up to within 0.2 mm of opposing outer end surfaces of the at least one of the first nozzle member or the second nozzle member. In further examples, at least one of the first nozzle member or the second nozzle member may have an internal hollow portion comprising approximately 50% of the internal volume of the one nozzle member.

The method may further comprise: embedding one or more sensors in the nozzle member.

In accordance with an aspect of the present disclosure, an apparatus for applying a first fluid to an advancing substrate is provided. The apparatus may comprise: a nozzle assembly comprising a nozzle body made, at least in part, using an additive manufacturing method. The nozzle body may comprise: a fluid orifice for receiving the first fluid; a conduit in fluid communication with the fluid orifice for receiving the first fluid received by the fluid orifice; and a passageway in fluid communication with the fluid orifice for receiving the first fluid received by the conduit; and a slot in fluid communication with the passageway for applying the first fluid to the advancing substrate, in which at least one dimension of the passageway is configured to manage a pressure profile of the first fluid through the passageway.

The nozzle body may comprise at least one first material having a first set of properties and at least one second material having a second set of properties, the first set of properties being different from the second set of properties. In some examples, the at least one first material may comprise at least one of an iron-based alloy, an aluminum-based alloy, a titanium-based alloy, a nickel-based alloy, or a high-alloy steel with one or more carbides; and the at least one second material may comprise at least one of an iron-based alloy, an aluminum-based alloy, a titanium-based alloy, a nickel-based alloy, or a high-alloy steel with one or more carbides.

The nozzle body may comprise an upper nozzle assembly comprising the at least one first material and a lower nozzle assembly comprising the at least one second material; the first material may comprise one or more metals; and the second material may comprise one of (i) one or more metals or (ii) one or more polymers.

The apparatus may further comprise at least one duct for receiving and conveying a second fluid. In some examples, the at least one duct may supply the second fluid via a supply channel to the first fluid as the first fluid exits the slot and is deposited onto the advancing substrate.

The nozzle body may comprise an upper nozzle assembly and a lower nozzle assembly, and the apparatus may further comprise: a thermally insulating material positioned between the upper and lower nozzle assemblies.

The apparatus may further comprise a heating element embedded or formed into a portion of the nozzle body adjacent to at least one of the fluid orifice, the conduit, the passageway, or the slot, in which the heating element is adapted to provide heat energy to the portion of the nozzle body.

The nozzle body may comprise an upper nozzle assembly comprising a first nozzle member and a second nozzle member. In some examples, the at least one dimension of the passageway may be configured to maintain a mass flow rate of the first fluid through the slot, the mass flow rate being substantially constant across a width of the passageway in a cross direction (CD). In other examples, the passageway may extend up to within 0.2 mm of opposing outer end surfaces of the at least one of the first nozzle member or the second nozzle member. In further examples, a first portion of at least one of the first nozzle member or the second nozzle member may comprise a first material having a first set of properties and a second portion of the at least one of the first nozzle member or the second nozzle member may comprise a second material having a second set of properties, the first set of properties being different from the second set of properties. In some particular examples, the at least one of the first nozzle member or the second nozzle member may comprise the passageway and the slot; the second portion may comprise an exit portion of the at least one of the first nozzle member or the second nozzle member, the second material being fused to the first material; and a section of the respective exit portion defines the slot and may comprise a plurality of distribution channels formed in the second material by a laser ablation process, the distribution channels controlling a distribution pattern of the first fluid deposited on the advancing substrate. The second material may comprise a material having a greater wear resistance as compared to the first material. In yet further examples, at least one of the first nozzle member or the second nozzle member may have an internal hollow portion comprising approximately 50% of an internal volume of the one nozzle member.

The apparatus may further comprise at least one sensor embedded into a portion of the nozzle body. In some examples, the apparatus may further comprise a controller coupled to the at least one sensor for receiving data from the at least one sensor, in which the controller controls operation of the apparatus based on the data.

In accordance with an aspect of the present disclosure, a method for making an apparatus comprising a nozzle body for applying a first fluid to an advancing substrate is provided. The method may comprise: sequentially forming, from at least one material using an additive manufacturing method, a plurality of layers in a configured pattern corresponding to a shape of at least one nozzle member of the nozzle body. The nozzle body may comprise: a fluid orifice for receiving the first fluid; a conduit in fluid communication with the fluid orifice for receiving the first fluid received by the fluid orifice; a passageway in fluid communication with the conduit for receiving the first fluid received by the conduit; and a slot in fluid communication with the passageway for applying the first fluid to the advancing substrate. At least one dimension of the passageway may be configured to manage a pressure profile of the first fluid through the passageway.

The additive manufacturing method may comprise at least one of metal powder application (MPA), selective laser melting (SLM), or laser metal deposition (LMD).

The at least one material may comprise a first material having a first set of properties and a second material having a second set of properties, in which the first set of properties is different from the second set of properties.

The nozzle body may further comprise at least one duct for receiving and conveying a second fluid. In some examples, the at least one duct may be formed such that the second fluid is supplied to the first fluid as the first fluid exits the slot and is deposited onto the advancing substrate.

The at least one material may comprise at least one of an iron-based alloy, an aluminum-based alloy, a titanium-based alloy, a nickel-based alloy, or a high-alloy steel with one or more carbides.

The at least one nozzle member may comprise an upper nozzle assembly member and a lower nozzle assembly member; the at least one material used to form the upper nozzle assembly member may comprise one or more metals; and the at least one material used to form the lower nozzle assembly member may comprise one of (i) one or more metals or (ii) one or more polymers. In some examples, the method may further comprise: positioning a thermally insulating material between the upper and lower nozzle assembly members.

The at least one nozzle member may comprise the fluid orifice, the conduit, the passageway, and the slot, and the method may further comprise: during forming of the at least one nozzle member, embedding or forming a heating element into a portion of the nozzle member such that the heating element is adjacent to at least one of the fluid orifice, the conduit, the passageway, or the slot, in which the heating element is adapted to provide heat energy to the portion of the nozzle member.

The at least one nozzle member may comprise a first nozzle member, and the method may further comprise: sequentially forming, from at least one material using an additive manufacturing method, a plurality of layers in a configured pattern corresponding to a shape of a second nozzle member. In some examples, the at least one dimension of the passageway may be configured to maintain a mass flow rate of the first fluid through the slot, the mass flow rate being substantially constant across a width of the passageway in a cross direction (CD). In other examples, the passageway may extend up to within 0.2 mm of opposing outer end surfaces of the at least one of the first nozzle member or the second nozzle member. In further examples, a first portion of at least one of the first nozzle member or the second nozzle member may comprise a first material having a first set of properties and a second portion of the at least one of the first nozzle member or the second nozzle member may comprise a second material having a second set of properties, the first set of properties being different from the second set of properties. In some particular examples in which at least one of the first nozzle member or the second nozzle member may comprise the passageway and the slot and the second portion may comprise an exit portion of the at least one of the first nozzle member of the second nozzle member, the method may further comprise: fusing the second material to the first material; and forming, using a laser ablation process, a plurality of distribution channels in the second material of a section of the exit portion defining the slot, the distribution channels controlling a distribution pattern of the first fluid deposited on the advancing substrate. The second material may comprise a material having a greater wear resistance as compared to the first material. In yet further examples, at least one of the first nozzle member or the second nozzle member may have an internal hollow portion comprising approximately 50% of the internal volume of the one nozzle member.

The method may further comprise: embedding one or more sensors in the at least one nozzle member.

BRIEF DESCRIPTION OF THE DRAWINGS

FIG. 5B is a cross-sectional view of the nozzle member of FIG. 5A taken along the line 5B-5B;

FIG. 5C is a cross-sectional view of the nozzle member of FIG. 5A taken along the line 5C-5C;

FIG. 6 is a plan view of a nozzle member comprising a plurality of passageways;

DETAILED DESCRIPTION OF THE INVENTION

Figure 1:
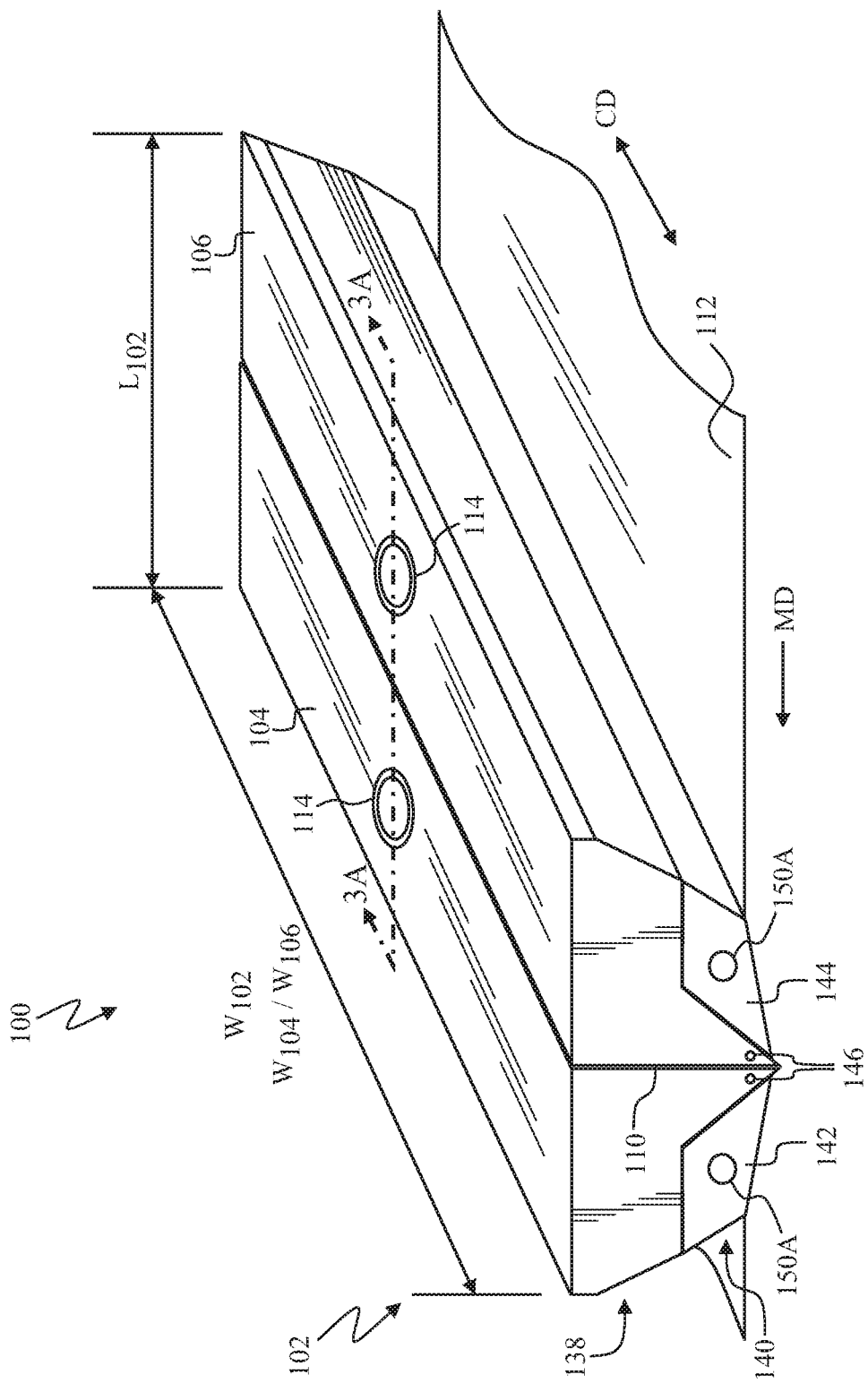
FIG. 1 is a perspective view of a nozzle assembly and an advancing substrate.

The following term explanations may be useful in understanding the present disclosure: The term "absorbent article" as used herein may include disposable articles such as sanitary napkins, panty liners, tampons, interlabial devices, wound dressings, pants, taped diapers, adult incontinence articles, wipes, and the like. At least some of such absorbent articles are intended for the absorption of body liquids, such as menses or blood, vaginal discharges, urine, and feces. Wipes may be used to absorb body liquids, or may be used for other purposes, such as for cleaning surfaces. The nonwoven materials described herein may comprise at least part of other articles such as scouring pads, wet or dry-mop pads (such as SWIFFER® pads), paper towels, toilet tissue, and the like.

The term "disposable" is used herein to describe absorbent articles which generally are not intended to be laundered or otherwise restored or reused as an absorbent article (e.g., they are intended to be discarded after a single use and may also be configured to be recycled, composted or otherwise disposed of in an environmentally compatible manner).

The term "elastic," "elastomer" or "elastomeric" refers to materials exhibiting elastic properties, which include any material that upon application of a force to its relaxed, initial length can stretch or elongate to an elongated length more than 10% greater than its initial length and will substantially recover back to about its initial length upon release of the applied force.

As used herein, the term "fluid" refers to a substance that deforms continuously under the application of a shear stress and encompasses liquids, gases, and/or mixtures thereof.

As used herein, the term "joined" encompasses configurations whereby an element is directly secured to another element by affixing the element directly to the other element, and configurations whereby an element is indirectly secured to another element by affixing the element to intermediate member(s) which in turn are affixed to the other element.

The term "machine direction" (MD) is used herein to refer to the direction of material flow through a process. In addition, relative placement and movement of material can be described as flowing in the machine direction through a process from upstream in the process to downstream in the process. The term "cross direction" (CD) is used herein to refer to a direction that is generally perpendicular to the machine direction.

The term "nonwoven" refers herein to a material made from continuous (long) filaments (fibers) and/or discontinuous (short) filaments (fibers) by processes such as spunbonding, meltblowing, carding, and the like. Nonwovens do not have a woven or knitted filament pattern.

The term "substrate" is used herein to describe a material which is primarily two-dimensional (i.e. in an XY plane) and whose thickness (in a Z direction) is relatively small (i.e. $\frac{1}{10}$ or less) in comparison to its length (in an X direction) and width (in a Y direction). Non-limiting examples of substrates include a web, layer or layers or fibrous materials, nonwovens, films and foils such as polymeric films or metallic foils. These materials may be used alone or may comprise two or more layers laminated together. As such, a web is a substrate.

The present disclosure relates to apparatuses and methods for manufacturing absorbent articles, and more particularly, to an apparatus for applying a fluid to an advancing substrate, e.g., a nozzle assembly that may be used to dispense a fluid onto a substrate advancing in a machine direction MD. The nozzle assembly may be configured to extrude a fluid onto a substrate in a film-like or strip-like manner or sprayed pattern. More specifically, the nozzle assembly may include a nozzle body comprising a passageway and a slot through which the fluid may pass such that the fluid may be deposited onto the advancing substrate. The fluid may be deposited onto the advancing substrate by spraying, extruding, slot-coating, or otherwise dispensing material from an exit portion of the nozzle body spaced from the substrate, or the advancing substrate may contact the exit portion of the nozzle body as fluid is deposited onto the advancing substrate. Contact between the nozzle body and the advancing substrate and/or with the fluid as it is extruded may result in wear of an outer surface of the exit portion of the nozzle body.

One or more components or portions of components of the nozzle assembly may be made from one or more materials using one or more additive manufacturing processes. A nozzle body in accordance with the present disclosure may comprise two or more different materials. In some examples, a first portion of the nozzle body defining a receiving portion is formed from one material and a second portion defining the exit portion is formed from one or more different materials having increased abrasion or wear resistance. A section of the exit portion defines the slot and may comprise a plurality of distribution channels formed in the wear-resistant material, which may entirely replace a conventional shim plate or allow for use of a thinner shim plate. In other examples, the nozzle assembly may comprise two or more materials each having different properties or sets of properties, such as a different thermal and/or electrical conductivity, hardness, toughness, wear or abrasion resistance, and chemical resistance.

Use of different materials for the nozzle assembly allows for selection of materials based on criteria separate from abrasion or wear resistance, such as cost, thermal capabilities, ease of manufacture, and the like. Similarly, the wear-resistant material may be selected based on criteria specific to the type of fluid to be dispensed, the substrate properties, abrasion resistance, and the like. Due to the relatively small amount of wear-resistant material required, cost becomes relatively less of a factor, which is important for producing cost-competitive products, such as absorbent articles. Further, the manufacture and maintenance of the nozzle assembly may be optimized. As discussed in more detail below, the wear-resistant material may be formed on and fused to the nozzle body, as opposed to requiring new fabrication of the entire nozzle body and/or various additional materials being fastened thereto. Thus, some of the difficulties associated with current slot nozzle manufacturing techniques may be alleviated.

Furthermore, use of additive manufacturing techniques allows the formation of customized components having a desired internal geometry and/or comprising two or more different materials that allow more precise control of, for example, the fluid distribution pattern and the temperature of the nozzle body and the fluid. The nozzle body may include, for example, internal conduits, passageways, and channels having smooth, substantially continuous curves and/or portions or sections that are hollow or comprise a material that is different from an adjacent or neighboring material. A nozzle body in accordance with the present disclosure may comprise a passageway with at least one dimension that is configured to manage a pressure profile of the first fluid through the passageway. In particular, the at least one dimension of the passageway may be configured to maintain a mass flow rate of the first fluid through the slot, in which the mass flow rate is substantially constant across a width of the passageway in a cross direction (CD). A nozzle body in accordance with the present disclosure may also include a heating element that is embedded or formed into the nozzle body during the manufacturing process. The heating element may be used to control the temperature of the nozzle body and/or the fluid passing through the nozzle body and onto the advancing substrate. A nozzle body in accordance with the present disclosure may further include one or more ducts for conveying a temperature control fluid.

Figure 2A:
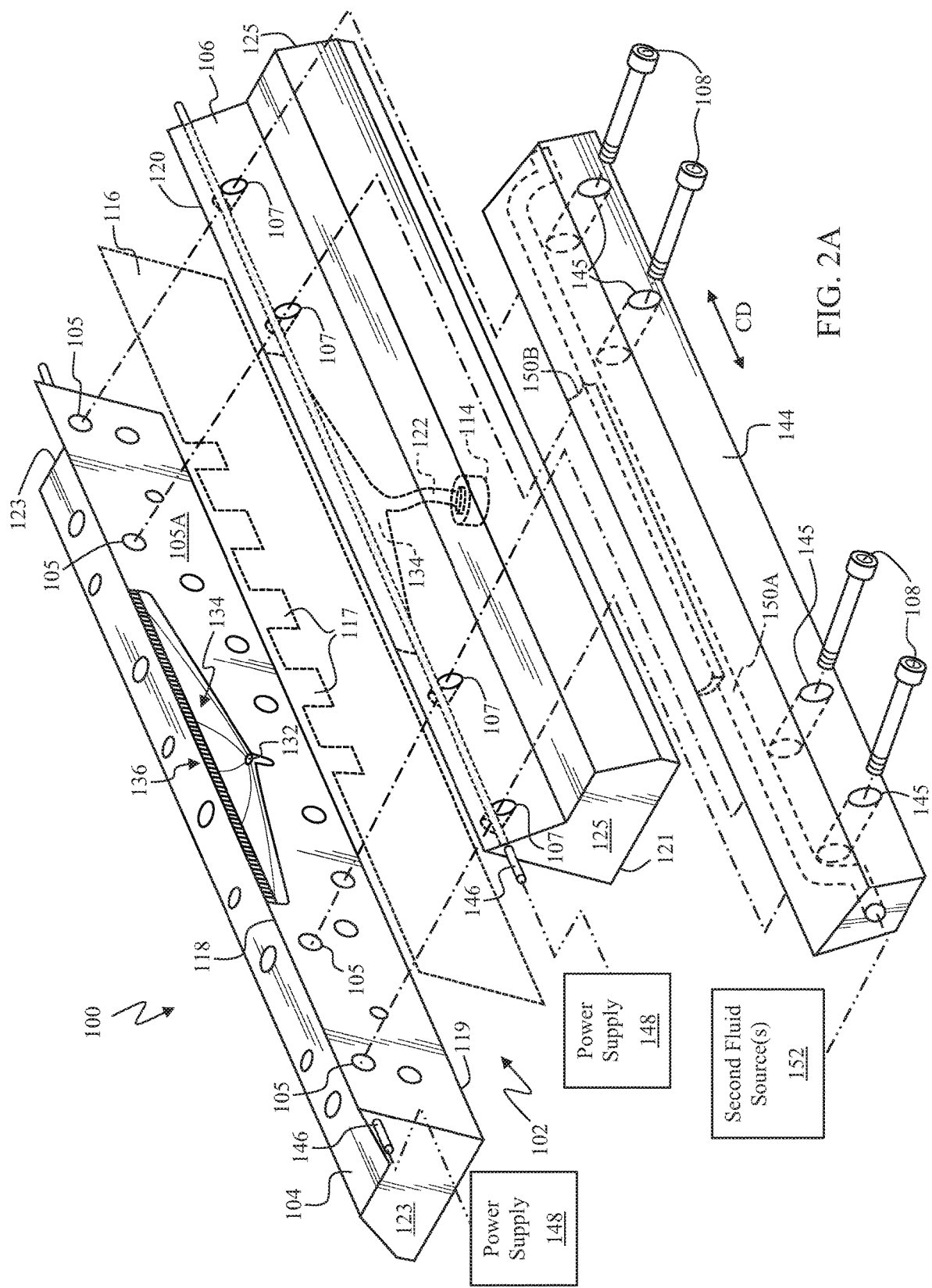
FIG. 2A is an exploded view of a nozzle assembly.
Figure 2B:
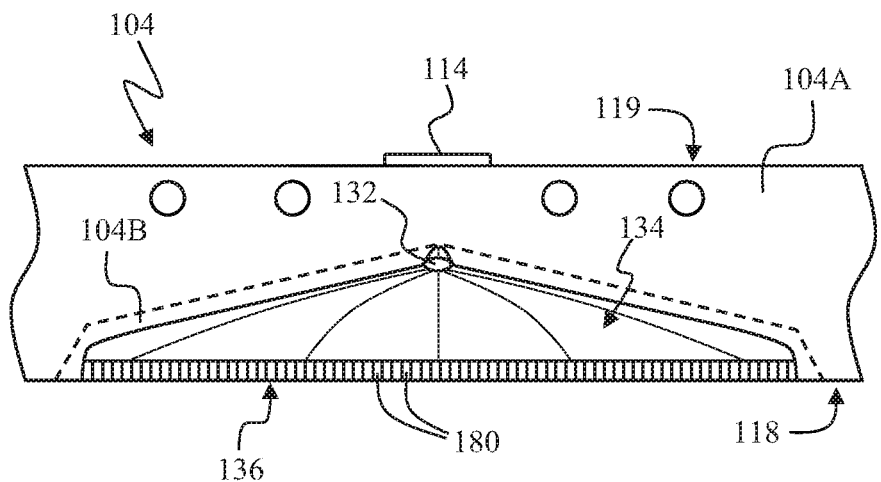
FIG. 2B is a detailed plan view of a portion of a first nozzle member of FIG. 2A.
Figure 3A:
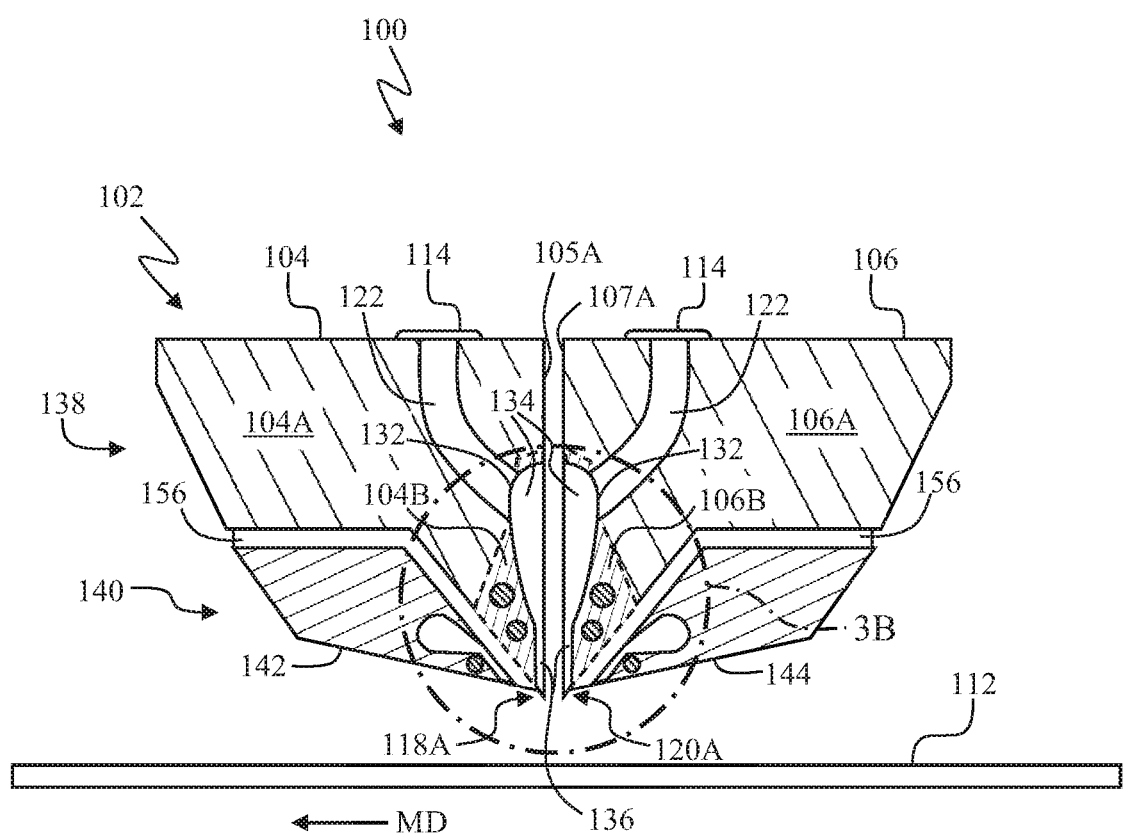
FIG. 3A is a cross-sectional view of the nozzle assembly of FIG. 1 taken along the line 3A-3A.
Figure 3B:
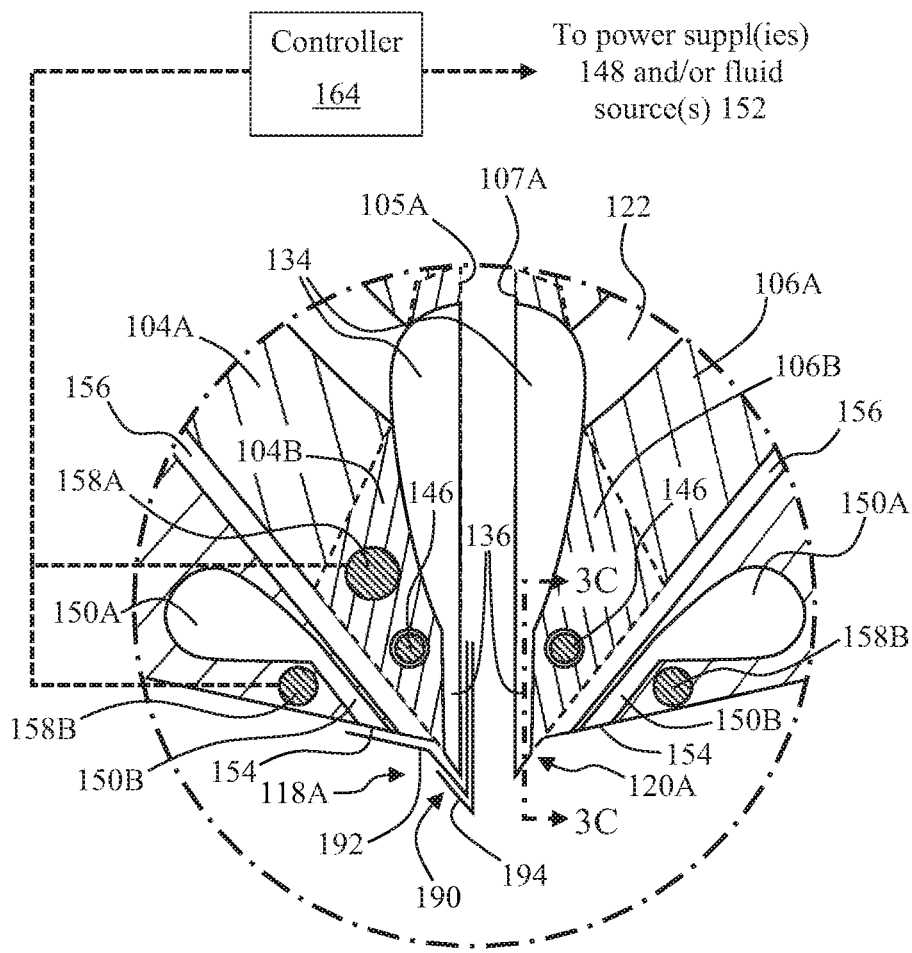
FIG. 3B is an enlarged, cross-sectional view of an exit portion of the nozzle assembly of FIG. 3A.

It is to be appreciated that a nozzle assembly as described herein may be configured in various ways. FIGS. 1, 2A, 3A, 3B, 3D, and 3E depict exemplary configurations of a nozzle assembly 100, 100', 300. FIG. 1 is a perspective view of the nozzle assembly 100. FIG. 2A is an exploded view of the nozzle assembly 100 of FIG. 1, in which a portion of the internal structure of a second nozzle member 106 and a fourth nozzle member 144 is shown with dashed lines. FIG. 2B is a detailed plan view of a portion of a first nozzle member 104 of FIG. 2A. FIG. 3A is a cross-sectional view of the nozzle assembly 100 of FIG. 1 taken along the line 3A-3A, and FIG. 3B is an enlarged, cross-sectional view of a nozzle exit portion of the nozzle assembly 100 of FIG. 3A. FIG. 3D is a cross-sectional view, similar to FIG. 3A, of an additional exemplary nozzle assembly 100'. FIG. 3E is an end view of another exemplary nozzle assembly 300.

With reference to FIGS. 1, 2A, 3A, and 3D, the nozzle assemblies 100, 100' may each comprise a nozzle body 102 with an upper nozzle assembly 138 and a lower nozzle assembly 140. The upper nozzle assembly 138 may comprise a single nozzle member or two or more nozzle members. For example, the upper nozzle assembly 138 in FIGS. 1, 2A, 3A, and 3D comprises a first nozzle member 104 and a second nozzle member 106. The lower nozzle assembly 140 may also comprise a single nozzle member or two or more nozzle members. For example, as shown in FIGS. 1, 2A, 3A, 3D, the lower nozzle assembly 140 comprises a third nozzle member 142 and a fourth nozzle member 144 (the third nozzle member 142 is removed in FIG. 2A to illustrate other aspects of the nozzle body 102 in more detail). In other examples, as shown in FIG. 3E, the nozzle assembly 300 may comprise a nozzle body 302 with a first nozzle member 304 and a second nozzle member 306. As shown in FIG. 2A, the first and second nozzle members define respective outer surfaces 118, 120, base surfaces 119, 121, and opposing end surfaces 123, 125.

The nozzle members 104, 106, 142, 144 as shown in FIGS. 1 and 2A and nozzle members 304, 306 as shown in FIG. 3E may be removably coupled to or connected with each other to form the nozzle assembly 100, 300. For example, as shown in FIG. 2A, the fourth nozzle member 144 may comprise through-bores 145 for receiving bolts or screws 108, which also pass through corresponding through-bores 107 in the second nozzle member 106 and through-bores 105 in the first nozzle member 104 and engage, for example, nuts (not shown) or threaded bores in the third nozzle member (not shown; see FIGS. 1, 3A, and 3D) to couple the nozzle members 104, 106, 142, 144 together. As shown in FIG. 3E, the first and second nozzle members 304, 306 may similarly be removably coupled to or connected with each other via bolts or screws 308. It is to be appreciated that the nozzle members 104, 304, 106, 306, 142, 144 may also be removably connected or coupled together with another mechanical connection device such as pins, clasps, nails, or the like. In other examples (not shown), the first and second nozzle members 104, 106 may be connected or coupled together independent of the third and fourth nozzle members 142, 144, and/or the third and fourth nozzle members 142, 144 may be connected or coupled together independent of the first and second nozzle members 104, 106.

In all configurations, a portion of the first nozzle member 104 may be in a facing relationship with a corresponding portion of the second nozzle member 106. As illustrated in FIGS. 2A, 3A, 3B, and 3D, the first nozzle member 104 may be coupled to or connected with the second nozzle member 106 such that an inner surface 105A of the first nozzle member 104 faces a corresponding inner surface 107A of the second nozzle member 106. The third and fourth nozzle members 144 may be in a facing relationship with the first and second nozzle members 104, 106, respectively, of the upper nozzle assembly 138, 140. In FIGS. 3A, 3B, and 3D, a separation between the first and second nozzle members 104, 106 and the third and fourth nozzle members 142, 144 is exaggerated to illustrate aspects of the nozzle body 102 in detail. It is to be understood that when the nozzle body 102 is assembled, the inner surface 105A of the first nozzle member 104 will abut the inner surface 107A of the second nozzle member 106 and the inner surfaces of the third and fourth nozzle members 142, 144 (not separately labeled) will abut each other. As explained below, when a shim plate 116 is present the inner surfaces of the nozzle members 104, 106, 142, 144 will abut the shim plate 116.

With reference to FIGS. 1, 2A, 2B, 3A, 3D, and 3E, one or both of the first nozzle member 104, 304 and the second nozzle member 106, 306 may comprise one or more fluid orifices 114, 314. Each fluid orifice 114, 314 is in fluid communication with at least one conduit 122 (not shown in FIG. 3E). Each fluid orifice 114 receives a fluid (not shown; referred to herein as a first fluid) from a first fluid source (not shown), and the conduit 122 receives the first fluid received by the fluid orifice(s) 114. The first fluid may comprise, for example, an adhesive, a polymer, a lotion, a wax, or a performance fluid (e.g., a fluid that, upon deposition on the substrate surface, alters one or more physical properties of the substrate). The fluid orifice(s) 114 may be coupled to a single first fluid source, or in examples in which the nozzle assembly 100 comprises more than one fluid orifice 114, the fluid orifices 114 may be coupled to different first fluid sources (see FIGS. 6 and 7). A passageway 134 is in fluid communication via an inlet 132 with at least one conduit 122 for receiving the first fluid received by the conduit 122. The passageway 134 facilitates distribution of the first fluid in the cross direction CD. A slot 136 is in fluid communication with the passageway 134 for applying the first fluid to an advancing substrate 112. As shown in FIGS. 1, 2A, 3A, and 3B, the first and second nozzle member 104, 106 may both comprise a fluid orifice 114, passageway 134, conduit 122, and slot 136. In other examples, as shown in FIG. 3D, only one of the nozzle members, e.g., the first nozzle member 104, may comprise a fluid orifice 114, passageway 134, conduit 122, and slot 136, and the other nozzle member, e.g., the second nozzle member 106 may lack one or more of the fluid orifice 114, passageway 134, conduit 122, and slot 136. For example, the second nozzle member 106 in FIG. 3D comprises only a slot 136. Although not shown in detail, it is to be understood that the nozzle assembly 300 of FIG. 3E may comprise any of the features and internal geometry discussed herein with respect to the nozzle assemblies 100, 100' of FIGS. 1, 2A, 2B, and 3A-3D, including one or more fluid orifices 314, conduits, passageways, slots, ducts, heating elements, etc. (not shown).

As illustrated in FIGS. 1, 3A, 3B, 3D, and 3E, the substrate 112, 312 may advance in a machine direction MD and traverse past an exit portion of the nozzle body 102, which, as noted above, may be defined by a second portion of the nozzle body 102. As also noted above, the nozzle body 102 may also comprise a first portion defining a receiving portion, in which the first and second portions may be made from different materials. The receiving portion of the nozzle body 102 may comprise a first receiving portion 104A of the first nozzle member 104 and a second receiving portion 106A of the second nozzle member 106, as shown in FIGS. 2B, 3A, and 3B. The exit portion of the nozzle body 102 may comprise a first exit portion 104B of the first nozzle member 104 and a second exit portion 106B of the second nozzle member 106. Separate labeling of the receiving and exit portions 104A, 106A, 104B, 106B is eliminated in FIGS. 3D and 3E to illustrate other aspects of the nozzle assembly 100', 300 in detail. As illustrated in FIGS. 2B, 3A, and 3B, the first and second exit portions 104B, 106B may encompass, for example, the passageway 134 and slot 136. In other examples (not shown), the exit portions 104B, 106B may encompass the fluid orifice 114, the conduit 122, and/or the additional sections of an outer surface 118, 318, 120, 320 of one or both of the nozzle members 104, 304, 106, 306, as described herein.

In some examples, as shown in FIG. 3E, the substrate 312 may engage, i.e., contact, the nozzle body 302 as the substrate 312 advances in the machine direction MD (generally referred to herein as slot coating). In particular, section(s) (not separately labeled in FIG. 3E; see reference numerals 118A, 120A in FIGS. 3A, and 3D) of the outer surface 318, 320 of one or both of the nozzle members 304, 306 adjacent to the slot (not shown in FIG. 3E; see reference numeral 136 in FIGS. 3A and 3D) may contact the advancing substrate 312. The first fluid is pumped from the first fluid source under pressure and is forced out of the nozzle body 300 onto the substrate 312. In other examples, as shown in FIGS. 3A and 3D, the substrate 112 and nozzle body 102 may be spaced apart such that the substrate 112 does not come into contact with the nozzle body 102. As the substrate 112 advances past the nozzle body 102 in the machine direction MD, the first fluid is dispensed so as to be, for example, sprayed or extruded onto the substrate 112, e.g., via application of a second fluid as described herein.

It is to be appreciated that the nozzle body 102, 302 may have various shapes and dimensions. As shown in FIG. 1, the nozzle body 102 may have a width $W_{102}$ extending in a direction parallel to the cross direction CD and a length $L_{102}$ extending in a direction parallel to the machine direction MD. In some examples, the width $W_{102}$ of the nozzle body 102, 302 (which also corresponds to a width $W_{104}$, $W_{106}$ of the first and second nozzle members 104, 106 as shown in FIG. 1) may be from about 10 mm to about 500 mm and the length $L_{102}$ may be from about 10 mm to about 100 mm. The nozzle body 102 may have a width $W_{102}$ sufficient to cover the portion of the substrate 112 intended to receive the first fluid. Further, the nozzle body 102 may have a width $W_{102}$ that extends beyond the outer edges of the substrate 112, as shown in FIG. 1. It is also to be appreciated that the width $W_{102}$ of the nozzle body 102 may also be less than the width of the substrate 112 (not shown).

In addition, the outer surfaces 118, 120 of the first and second nozzle members 104, 106, including the outer surface sections 118A, 120A of the first and second exit portions 104B, 106B, may have various shapes and dimensions. The shape and/or dimensions of the outer surfaces 118, 120 and outer surface sections 118A, 120A may depend, in part, on the first fluid to be dispensed from the nozzle body 102, the material of the substrate 112, and the manner in which the first fluid is to be deposited onto the substrate 112, 312 (i.e., contact applications such as slot coating vs. non-contact applications such as spraying or extruding). For example, the nozzle body 102 depicted in FIGS. 1, 2A, 3A, 3B, and 3D is generally used in non-contact applications, while the nozzle body 302 depicted in FIG. 3 is generally used in a contact application. Additional exemplary nozzle assemblies and techniques for applying the first fluid to the substrate 112, 312 are disclosed in U.S. patent application Ser. No. 15/628,678, filed on Jun. 21, 2017, and in U.S. Pat. Nos. 8,186,296; 9,248,054; 9,265,672; and 9,295,590.

Figure 4:
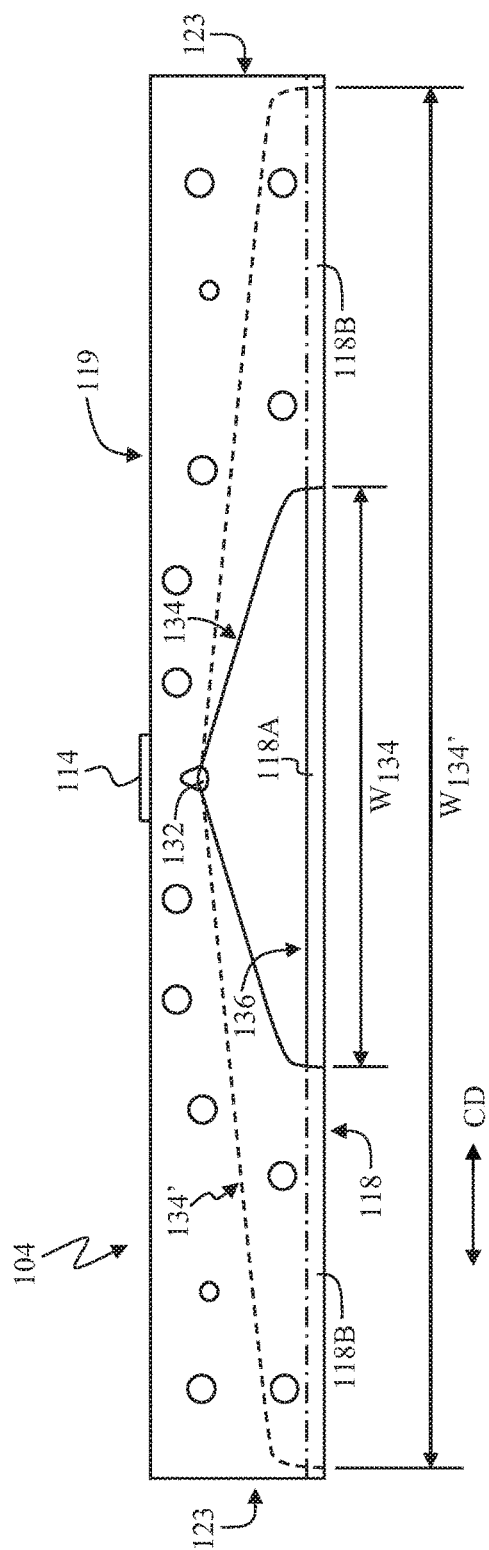
FIG. 4 is a plan view of a nozzle member.

The passageway 134 may comprise any suitable dimension(s) and/or shape. FIGS. 4-7 illustrate nozzle members 104, 204, 204' comprising one or more exemplary passageways 134, 134', 234A-234C, 234A'-234C', 234", in which the nozzle member 104 in each of FIGS. 4 and 5A-5C and the nozzle member 204, 204' in each of FIGS. 6 and 7 may represent one or both of the first and second nozzle members 104, 106 as described herein. Some details of the nozzle members 104, 204, 204' have been removed in FIGS. 4-7 to illustrate other aspects of the nozzle members 104, 204, 204' in detail. With reference to FIGS. 2A and 4 and 5A-5C, the passageway 134 may comprise one or more dimensions that may be varied in the X, Y, and/or Z directions, in which the X direction is parallel to the cross direction CD and the Z direction is parallel to the machine direction MD (extends into the page in FIG. 5A). As shown in FIGS. 2A and 4, the passageway 134 may comprise a width $W_{134}$ that extends substantially in the cross direction CD (X direction) along at least a portion of the width $W_{104}$, (see FIG. 1) of the nozzle member 104. In some examples, the width $W_{134}$ may be from about 3 to 5 mm up to almost an entirety of the width $W_{104}$, $W_{106}$ of the nozzle member 104, 106. In some examples, the passageway 134 may extend in the cross direction CD across a central section of the nozzle member 104, as shown in FIGS. 2A and 4. In other examples, as shown in phantom in FIG. 4, the passageway 134' may comprise a greater width $W_{134'}$ and may extend in the cross direction CD across a larger section of the nozzle member 104. In particular, as described herein in more detail, the additive manufacturing techniques used to form the nozzle members 104, 106 allows the width $W_{134}$ of the passageway 134 to extend up to within, for example, 0.2 mm of any one of the exterior surfaces 118, 119, 120, 121, 123, 125 of the nozzle member 104, 106. In some particular examples in which the passageway 134' extends across substantially the entire width $W_{104}$ (see FIG. 1) of the nozzle member 104, the outer surface section 118A of the exit portion 104B (see FIGS. 3A and 3B) may encompass substantially the entirety of the outer surface 118 of the nozzle member 104.

Figure 5A:
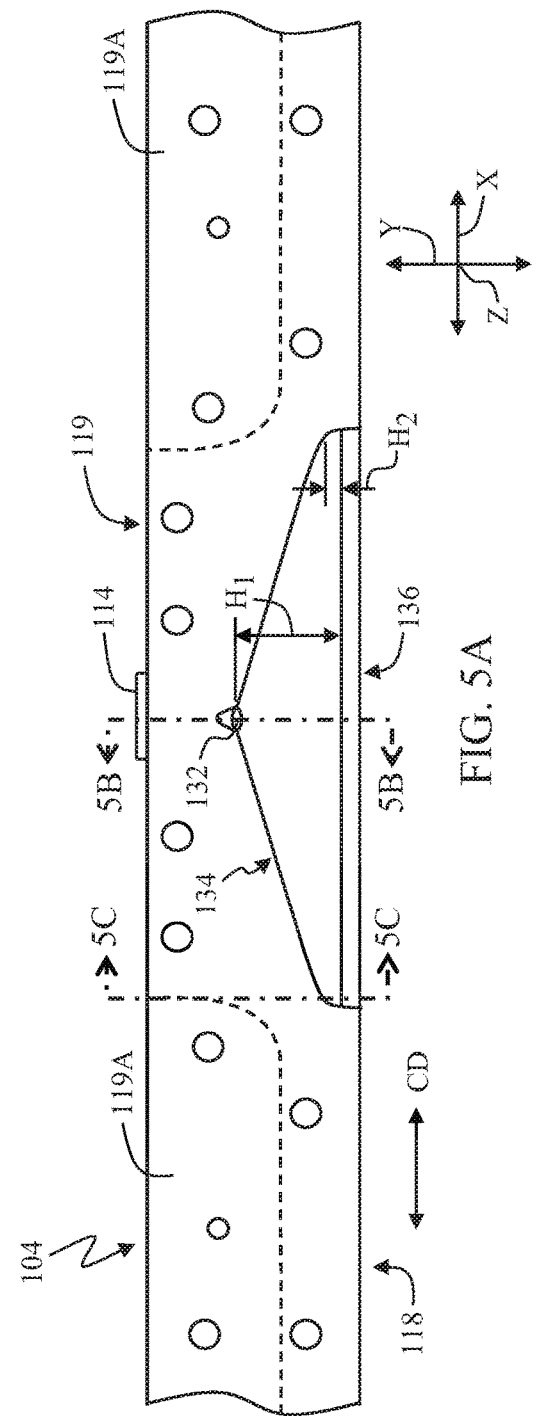
FIG. 5A is a plan view of a nozzle member.

With reference to FIGS. 5A-5C, the passageway 134 may further comprise a first height $H_1$ in the Y direction adjacent to the inlet 132 and may taper in the cross direction CD to a second, smaller height $H_2$ in the Y direction, as shown in FIG. 5A (see also FIGS. 5B and 5C). As shown in FIGS. 5B and 5C, the passageway 134 may define one or more depths $D_1$, $D_2$ that vary in the Z direction along the passageway 134 in the X and/or Y direction. In particular, as shown in FIG. 5B, the passageway 134 near the center of the nozzle member 104 may comprise a depth $D_{1A}$ adjacent to the inlet 132 and a depth $D_{2A}$ adjacent to the slot 136, in which $D_{2A}$ is less than $D_{1A}$. Near an outer edge (not separately labeled) of the passageway 134, the passageway 134 may vary from a depth $D_{1B}$ to a depth $D_{2B}$, in which $D_{2B}$ is less than $D_{1B}$. In some instances, the passageway 134 may comprise a greatest depth, e.g., depth $D_{1A}$, and height, i.e., height $H_1$, near the center of the nozzle member 104.

Figure 7:
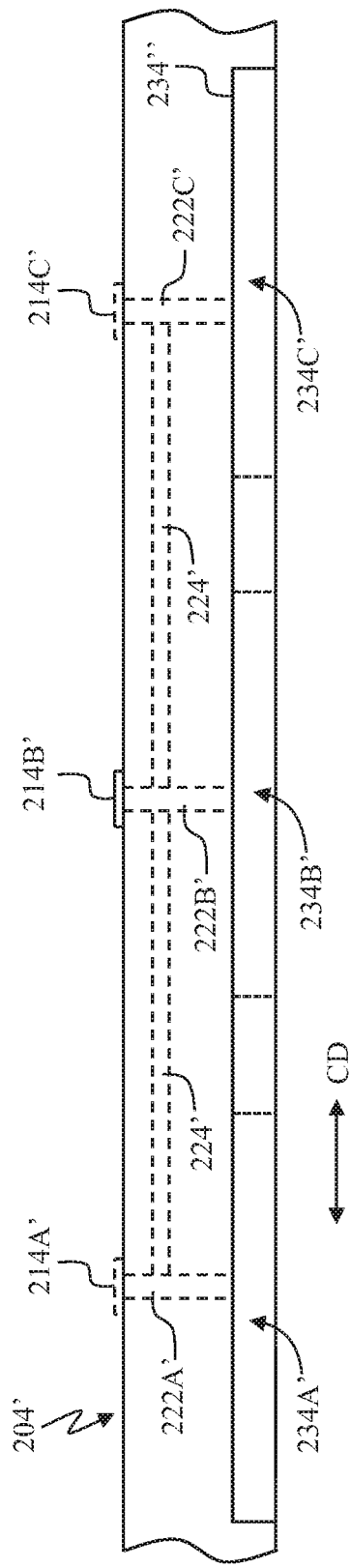
FIG. 7 is a plan view of a nozzle member comprising one or more passageways.

The passageway 134 may define any suitable shape. As shown in FIGS. 2A, 2B, and 4-6, the passageways 134, 134', 234A-234C may comprise the general shape of a coat hanger. In other examples, as shown in FIG. 7, the passageways 234A'-234C', 234" may comprise a generally rectangular shape. In further examples, as shown in FIGS. 6 and 7, each nozzle member 204, 204' may comprise two or more passageways 234A-234C, 234A'-234C'. For example, FIG. 6 depicts a nozzle member 204 that comprises three, coat-hanger shaped passageways 234A-234C. FIG. 7 depicts a nozzle member 204' that comprises three, generally rectangular passageways 234A'-234C'. Each passageway 234A-234C, 234A'-234C' may comprise at least one respective fluid orifice 214A-214C, 214A'-214C' and conduit 222A-222C, 222A'-222C'. In some examples, as shown in FIG. 7, multiple fluid orifices 214A'-214C' and conduits 222A'-222C' may supply a single passageway 234". As shown in FIG. 6, the passageways 234A-234C may connect at the respective slots 236A-236C of adjacent passageways 234A-234C such that the first fluid is dispensed substantially continuously in the cross direction CD along the section of the nozzle member 204 comprising the passageways 234A-234C. In other examples, as shown in FIG. 7, one or more cross channels 224' may be used to equalize the fluid pressure within the passageways 234A'-234C' in multi-passageway configurations or to equalize a pressure profile across the passageway 234" in single passageway configurations.

In all examples, the shape, dimensions, and number of passageways 134, 134', 234A-234C, 234A'-234C', 234" may be used to control, for example, the distribution pattern and amount of the first fluid deposited on the advancing substrate 112 and a pressure profile of the first fluid, as described herein.

In some aspects, with reference to FIG. 2A, the nozzle assembly 100 may optionally comprise one or more shim plates 116 that may be positioned between the first nozzle member 104 and the second nozzle member 106. A first side (not labeled) of the shim plate 116 may abut the inner surface 105A of the first nozzle member 104, and a second side (not labeled) of the shim plate 116 may abut the inner surface 107A of the second nozzle member 106. The shim plate 116 may be used to define locations of the slot 136 through which the first fluid is allowed to exit and other locations of the slot 136 where the first fluid is blocked or prevented from exiting the slot 136. The shim plate 116 may include a plurality of openings 117 that are in fluid communication with the passageway 134 defined in at least one of the first nozzle member 104 or the second nozzle member 106. The first fluid (not shown) may traverse through the passageway 134 and into the openings 117 of the shim plate 116. The first fluid may then exit the slot 136 and be deposited onto an advancing substrate 112 via the slot 136 (see FIGS. 1, 3A, and 3B; a shim plate is not shown in FIGS. 3A and 3B). The number, dimensions, and shape of the openings 117 may be varied to achieve the desired distribution pattern of the first fluid onto the advancing substrate 112. As shown in FIG. 2A, the shim 116 may be shaped like a comb, with a plurality of teeth defining therebetween the openings 117. Additional non-limiting examples of shim plates are described in U.S. Pat. Nos. 7,056,386; 8,399,053; 8,347,809; and 8,979,521. In some examples, the nozzle assembly 100 may comprise a single shim plate 116, as shown in FIG. 2A. In other examples, the nozzle assembly 100 may comprise two or more shim plates (not shown) positioned between the first nozzle member 104 and the second nozzle member 106. The one or more shim plates 116 allow for relatively greater customization of the distribution pattern of the first fluid. For example, the number and/or thickness of the shim plate(s) 116 may be varied.

At least one of the third nozzle member 142 or the fourth nozzle member 144 of the lower nozzle assembly 140 may comprise one or more ducts for receiving and conveying a second fluid (not shown). As shown in FIGS. 1 and 2A, a first duct 150A may extend through one or both of the third and fourth nozzle members 142, 144 in the cross direction CD and may be coupled to one or more second fluid sources 152 that supply the second fluid. In some examples, as shown in FIGS. 2A, 3A, and 3B, the first duct 150A may communicate with at least one supply channel 150B. The supply channel 150B extends between the first duct 150A and an exit orifice 154 such that the second fluid is expelled from the one or more exit orifices 154 adjacent to the exit from the nozzle body 102, i.e., the slot 136. In some configurations, as shown in FIG. 2A, the supply channel 150B may comprise a single continuous channel formed along at least a portion of the third and/or fourth nozzle members 142, 144 in the cross direction CD that connects with a single exit orifice 154. In other configurations (not shown), the supply channel 150B may comprise multiple, discrete channels that each connect with a discrete exit orifice 154.

Alternatively, or in addition to the first duct 150A and supply channel 150B, as shown in FIG. 3D, one or both of the third and fourth nozzle members 142, 144 may optionally comprise a second duct 150C that conveys a second fluid. The second duct 150C extends through the third and/or fourth nozzle members 142, 144 in the cross direction CD but does not expel the second fluid from the nozzle body 102. In further configurations, one or both of the first nozzle members 104, 106 may optionally comprise one or more third ducts (not shown) for conveying a second fluid. The third duct(s) may extend through the first and/or second nozzle members 104, 106 in the cross direction CD but does not expel the second fluid from the nozzle body 102.

In all configurations, the second fluid may help to control a temperature of the lower nozzle assembly 140 and/or a temperature of the second fluid, which is typically maintained in a molten form within the nozzle body 102. In some examples, the second fluid may be a cooling gas, liquid, or mixture thereof and may comprise air, nitrogen, carbon dioxide, or combinations thereof. The cooling gas(es) may be provided at a temperature of, for example, minus 20° C. to plus 50° C. (−20° C. to +50° C.). In some particular examples, the cooling gas(es) may be provided at a temperature of 0° C. to +30° C. In other examples, the second fluid may be a heated gas, liquid, or mixture thereof, such as heated air, and may be provided at a temperature of, for example, +140° C. to +185° C. In some particular examples, the heated gas may be supplied at a temperature of +145° C. to +165° C. In configurations in which the second fluid exits the nozzle body 102 (see FIGS. 2A, 3A, and 3B), the second fluid may be supplied to the first fluid via the supply channel 150B such that the second fluid engages or strikes the first fluid as the first fluid exits the nozzle body 102 via the slot 136 and is deposited on the advancing substrate 112. In some particular examples, the second fluid flowing from the exit orifices 154 helps to create a draw at the nozzle exit that supports fiber creation as the first fluid exits the nozzle body 102 and may also alter the distribution pattern of the first fluid on the advancing substrate 112.

It is to be appreciated that the nozzle body 102 may be directly or indirectly removably coupled to or connected with another device (not shown) and may comprise one or more additional corresponding apertures and/or threaded openings designed to receive one or more screws, bolts, and the like (not shown). For example, in some embodiments, one or more adapters (not shown) may be used to connect the nozzle body 102 to another device, such as a slot die coating apparatus.

One or more components and/or portions of one or more components of the nozzle assembly 100 may be made, at least in part, using an additive manufacturing process. The additive manufacturing processes may comprise one or more of selective laser melting (SLM), selective laser sintering (SLS), stereolithography, fused filament fabrication (FFF), a cold spray method such as Metal Powder Application (MPA; Hermle® Maschinenbau GmbH, Gosheim, Germany), laser metal deposition (LMD), and direct metal laser sintering (DMLS). It is to be understood that these processes may be known by several different names depending on the industry, location, etc. and that the present disclosure is intended to encompass all processes employing similar techniques. For example, LMD may also be known as direct energy deposition, laser power forming, or laser engineered net shaping, and cold spray may also be referred to as cold spray powder deposition or gas dynamic cold spray.

As described herein, SLM and MPA may generally be used for producing new metallic components and/or for building up new metallic structures on existing components. LMD may generally be used for repairing and modifying metallic existing components. Because SLM, MPA, and LMD offer a greater freedom of geometry, these additive processes enable functionally optimized components to be produced. The additive manufacturing processes described herein may be used individually, in combination with one or more additive manufacturing processes, and/or in conjunction with conventional manufacturing processes (e.g., machining, forging, molding, etc.) to make one or more components and/or portions of one or more components of the nozzle assembly 100. In general, the additive manufacturing processes described herein involve sequentially forming one or more layers of at least one material in a configured pattern that corresponds to a shape of the component of the nozzle assembly 100 or portion thereof. A three-dimensional shape of the component or portion is built up, layer-by-layer, to achieve the desired shape, thickness, and the like.

In the SLM process, the starting material comprises a metal powder. The metal powder is applied to a substrate plate as a thin layer (about 20-100 µm) inside a closed process chamber. According to the calculated layers of a sliced CAD model, the powder is selectively melted by the local application of heat from a laser beam to form a first layer. Afterwards, the substrate plate is lowered, and a new powder layer is applied. The next layer is again melted selectively with laser radiation and binds metallurgically with the first layer. This process is repeated to generate a custom-made component, layer by layer, from the metal powder. The completed component may undergo one or more final processing and/or heat treatment steps in order to reach the required surface quality and dimensional accuracy, as well as the desired microstructure with the corresponding mechanical properties, in accordance with the application envisioned for the component.

SLM may be used with a variety of materials, including, but not limited to, stainless steel, tool steel, and titanium, aluminum, cobalt, and nickel alloys. Complete melting of the metal powder particles by the laser beam allows the finished product to have a relative density of approximately 100%. Due to these characteristics, the mechanical properties of components made using SLM substantially correspond to the specifications of the material comprising the metal powder used to make the component. In addition, the layer-by-layer process allows a three-dimensional manufacturing task to be reduced to two dimensions, such that the manufacturing costs do not depend primarily upon the geometric complexity but rather upon the quantity of metal powder required to form the component. Individualization and complexity, including integration of functions, internal structures (e.g., passageways and channels, integrated hollow or lattice structures for weight and/or materials reduction, etc.), topology-optimized design, and monolithic design of former assemblies, are possible without added cost or time.

In the MPA process, the starting material also comprises a metal powder. The metal powder is accelerated at high speeds and sprayed onto a substrate. The metal powder particles and the surface of the substrate plate undergo plastic deformation upon particle impact. At the boundary surface, the heat generated by the impact causes the particles to become bonded to the substrate plate. Additional layers of metal powder particles are added, with each subsequent layer becoming bonded to the previous layer. A metal component is built up, layer by layer, using kinetic compaction. During the MPA process, the metal powder particles and the substrate plate are not melted and there is no laser required, both of which minimize the thermal stresses. Following heat treatment, a component made using MPA may have a relative density of approximately 100%. MPA may be used to form internal cavities and channels. A water soluble filler material may be deposited, and one or more layers of metal particles may be deposited on the filler material. The filler material is then dissolved and flushed out, leaving the internal cavity or channel formed in the metal. MPA may also be used with a variety of materials, including stainless steel; hot- and cold-working steels; pure iron, copper, and bronze; and various alloys such as invar.

The use of additive manufacturing provides a number of advantages over conventional manufacturing processes. For example, with reference to FIGS. 1, 2A, 3A, 3B, and 3D, additive manufacturing may be used to form a nozzle assembly 100, 100' with a relatively complex and precisely located internal geometry, including nozzle members 104, 106, 142, 144 with one or more fluid orifices 114, conduits 122, passageways 134, slots 136, ducts 150A, 150C, supply channel 150B, and/or threaded bores and through-bores 105, 107, 145. In some instances, the nozzle members 104, 106, 142, 144 may be formed using additive manufacturing as a single piece without the use of or with a reduced need for complex and/or multi-part molds. In addition, the need to remove material via milling, shaping, drilling, and the like may be greatly reduced, and the internal conduits and passageways may be formed with smooth walls and/or with substantially continuous curves, as compared to conventional techniques that typically require angled turns. For example, as shown in FIGS. 3A and 3D, the conduit 122 may be curved and may comprise a smooth transition of almost 90° from the fluid orifice 114 to the inlet 132.

Furthermore, additive manufacturing allows the dimensions of the internal fluid pathways, including the conduit 122, the inlet 132, and the passageway 134, to be precisely controlled. As shown in FIGS. 4 and 5A-5C, the passageway 134 may comprise one or more dimensions, e.g., a width $W_{134}$, $W_{134'}$, height H, and depth $D_1$, $D_2$, that may be varied in the X, Y, and/or Z directions along at least a portion of the passageway 134. For example, additive manufacturing allows formation of the nozzle member 104 with any desired width $W_{134}$, $W_{134'}$, and in particular, allows the formation of a passageway with a width $W_{134'}$ that extends very close to the opposing end surfaces 123 of the nozzle member 104. In some examples, the passageway 134 may extend to within 0.2 mm of one or both of the outer end surfaces 123 of the nozzle member 104. In other examples (not shown), the passageway may extend to within 0.2 mm of, for example, the outer surface 118 and/or the base surface 119 of the nozzle member 104. It is believed that this proximity of the passageway 134 to the surfaces 118, 119, 123 of the nozzle member 104 was not previously achievable using conventional manufacturing techniques such as milling. In addition, the height H may vary from height $H_1$ near the inlet 132 to height $H_2$ near the opposing outer edges (not separately labeled) of the passageway 134. The depth $D_1$ may vary from depth $D_{1A}$ to depth $D_{2A}$ near the center of the nozzle member 104, and the depth $D_2$ may vary from depth $D_{1B}$ to depth $D_{2B}$ near the outer edges of the passageway 134.

The width $W_{134}$, $W_{134'}$, height $H_1$, $H_2$, and/or depth $D_1$, $D_2$ of the passageway 134 formed in one or both of nozzle members 104, 106, which may be made using additive manufacturing in accordance with the present disclosure, may be configured, profiled, or designed to manage a pressure profile of the first fluid within the passageway 134. For example, the dimensions of the passageway 134 may be designed, e.g., using experimentation, modeling, or simulation, so as to create a more uniform fluid pressure across the width $W_{134}$, $W_{134'}$ of the passageway 134. In particular, it is believed that the dimensions of the passageway 134 may be more precisely controlled and tailored such that the fluid pressure near the slot 136, e.g., where the passageway 134 defines depths $D_{2A}$, $D_{2B}$, is substantially constant or uniform and such that a mass flow rate (kg/sec) of the first fluid through the slot 136 is substantially constant or uniform across the entire width $W_{134}$, $W_{134'}$ of the passageway 134 in the cross direction CD. It is to be understood that the particular passageway dimensions required to obtain a particular pressure profile and mass flow rate will be dependent upon a variety of factors, including, but not limited to, a temperature, viscosity, and/or rheological profile of the first fluid, type of substrate, method used to apply the first fluid to the substrate, desired distribution pattern, and the like.

In some configurations, the nozzle assembly 100 may be made using one or more additive manufacturing processes from a single material. The material may comprise a metal or metal alloy. In some examples, the material may comprise an iron-based alloy, an aluminum-based alloy, a nickel-based alloy, or a titanium-based alloy. In some particular examples, the iron-based alloy may comprise stainless steel, tool steel, or a high alloyed steel with one or more carbides. In other particular examples, the nickel-based alloy may comprise an INCONEL alloy. In other examples, the material may be a hot-working tool steel or a tool steel, such as for example, X37CrMoVS-1 steel. In further examples, the material may comprise pure copper or aluminum.

In other configurations, one or more components and/or portions of one or more components of the nozzle assembly 100 made using additive manufacturing may comprise two or more different materials. Using at least two different materials to form a component may be referred to as forming a hybrid component. In some instances, with reference to FIGS. 1 and 2A, the upper nozzle assembly 138 may comprise one or more first materials, and the lower nozzle assembly 140 may comprise one or more second materials, in which at least one of the first materials is different from at least one of the second materials. In particular, the first material(s) may comprise a first set of properties, as described herein, and the second material(s) may comprise a second set of properties, in which the first set of properties is different from the second set of properties. In some examples, the first and second materials may each comprise one or more metals or metal alloys, as described above. In other examples, the second material may comprise one or more polymers, and in particular, one or more heat-resistant polymers. Exemplary polymers may comprise one or more polyamides, which may optionally further comprise glass fibers or glass beads to increase a heat resistance of the polymer. In other instances, one section or region of one or both of the first and second nozzle members 104, 106 may comprise the first material having the first set of properties and another section or region of the nozzle member 104, 106 may comprise the second material having the second set of properties. In some examples, with reference to FIGS. 3A and 3B, the first portion of the nozzle body 102 defined by the first and second receiving portions 104A and 106A of one or both of the first and second nozzle members 104, 106 may comprise the first material having the first set of properties, and the first and second exit portions 104B and 106B of one or both of the nozzle members 104, 106 may comprise the second material having the second set of properties. In some particular examples, the first and second receiving portions 104A and 106A may be made from a first material such as copper or aluminum having a high thermal conductivity, i.e., good heat transfer properties, while the first and second exit portions 104B and 106B may be formed from a second material such as a high-alloy steel having a high resistance to abrasion, wear, and/or corrosion.

In other examples, with reference to FIG. 3D, one or more of regions 160 within the upper nozzle assembly 138 may comprise a different material, as compared to adjacent or neighboring regions 161 of material that are adjacent to and/or form one or more portions of, for example, an exterior surface (not separately labeled) of the nozzle member 104, 106, the fluid orifice 114, the conduit 122, the passageway 134, the slot 136, and/or the threaded bores and through-bores 105, 107 (see FIG. 2A). The region(s) 160 may comprise, for example, one or more materials having a different thermal conductivity than the adjacent or neighboring region(s) 161 of material. In some particular examples, the region(s) 160 may comprise a first material such as copper or aluminum having a high thermal conductivity, i.e., good heat transfer properties, and the adjacent or neighboring region(s) 161 may comprise a second material such as a high-alloy steel having a high resistance to abrasion, wear, corrosion and/or a low thermal conductivity so as to provide an insulating layer for the region(s) 160. One or more optional layers (not shown) may be applied between the regions 160, 161 to help with bonding of the materials, particularly when one of the materials has a hardness of more than 58 on the HRC scale. The optional layer(s) may comprise, for example, a Ni-based alloy.

In further examples, with continued reference to FIG. 3D one or more of the regions 160 in the first and/or second nozzle member 104, 106 may comprise no material and may define one or more hollow voids within the first and/or second nozzle member 104, 106. In nozzle members 104, 106 comprising one or more hollow voids, a lattice structure (not shown) spanning between an outer wall 165 and the internal structures (e.g., the fluid orifice 114, conduit 122, passageway 134, slot 136, and/or the threaded bores and through-bores 105, 107; see also FIG. 2A) of the nozzle member 104, 106 may be employed to provide additional structural support and stability. The hollow void(s) may provide insulation and reduce the weight of the upper nozzle assembly 138 and the amount of material(s) needed to form the upper nozzle assembly 138. In some examples, the region(s) 160 defining one or more hollow voids may comprise about 50% of an internal volume of one or both of the nozzle members 104, 106.

As shown in FIG. 3D, one section or region of one or both of the third and fourth nozzle members 142, 144 may comprise the first material, and another section or region of one or both of the third and fourth nozzle members 142, 144 may comprise the second material, as described herein. For example, the lower nozzle assembly 140 may comprise one or more regions 162 that comprise a different material, as compared to neighboring regions 163 of material that are adjacent to and/or form one or more portions of, for example, an exterior surface (not separately labeled) of the third and fourth nozzle members 142, 144, the ducts 150A, 150C, the supply channel(s) 150B, and/or the threaded bores and through-bores 145 (see FIG. 2A). The region(s) 162 may comprise, for example, one or more materials having a different thermal conductivity than the adjacent or neighboring region(s) 163 of material. In some particular examples, the region(s) 162 may comprise copper or aluminum, and the adjacent or neighboring region(s) 163 may comprise a high-alloy steel, with one or more optional bonding layers. In other examples, similar to the region(s) 160 in the first and second nozzle members 104, 106, the region(s) 162 of the third and fourth nozzle members 142, 144 may comprise no material and may define one or more hollow voids within the third and/or fourth nozzle members 142, 144. In some particular examples, the region(s) 162 defining one or more hollow voids may comprise about 50% of an internal volume of one or both of the nozzle members 142, 144.

In further configurations, as shown in FIGS. 3A and 3B, the nozzle assembly 100 may optionally comprise a thermally insulating material 156 positioned between the upper and lower nozzle assemblies 138, 140. An example of a suitable thermally insulating material is polyetheretherketone (PEEK). The thermally insulating material 156 may be used to help minimize heat transfer from the upper nozzle assembly 138 to the lower nozzle assembly 140, as described herein.

In further examples, one or more sections of the nozzle members 104, 106 may be eliminated. In particular, the nozzle members 104, 106 may be formed with material in the cross direction CD only where needed, e.g., along sections of the nozzle body 102 that are intended to engage the substrate 112. For example, with reference to FIGS. 3A, 3B, and 4, the outer surface 118 of the nozzle member 104 may comprise a section 118A of the exit portion 104B and two sections 118B on either side of the section 118A. One or both of sections 118B may be eliminated, as only section 118A contacts the substrate 112 and contact between sections 118B and the substrate 112 would generally not be required and may, in some cases, be undesirable. Alternatively, or in addition, with reference to FIG. 5A, the nozzle member 104 may be formed without one or both of sections 119A of a base surface 119 of the nozzle member 104, as these sections 119A are not involved with contacting the substrate 112 and do not contain any of the internal fluid pathways. The ability to eliminate unnecessary material may help to reduce material costs for manufacturing the nozzle assembly 100 and may also help to reduce the weight of the nozzle assembly 100. Alternatively, any of the sections 118A, 118B, 119A may comprise a different material, as compared to a neighboring material, as described herein.

With reference to FIGS. 1, 2A, 3A, 3B, and 3D, one or more heating elements 146 may be formed, integrated, or embedded into one or more portions of the first and/or second nozzle members 104, 106 during manufacture. The heating element 146 may comprise a flexible heating element such as, for example, a thermally conductive heating wire, which may be formed, for example, from copper or stainless steel. Flexible heating elements may be configured to any desired shape as described herein, including shapes that are customized or tailored to the desired final shape of the component and/or the desired application. The heating wire may comprise any suitable cross-sectional shape, e.g., circular, rectangular, etc., and may be selected based on the amount of heat energy required. For example, the heating wire may be a low-voltage wire where only a small amount of heat energy is required and/or where the portion(s) to be heated are small. In other examples, the heating wire may comprise a high-voltage wire where the required amount of heat energy is large and/or the portion(s) to be heated are large. Examples of suitable heating wires may comprise, for example, a tubular heater type RKH (Türk Hillinger; Tuttlingen, Germany) that is available in a straight or bent (e.g., wave) configuration with connections (e.g., bolt, thread, strand, or plug connector) at both ends. In other examples, the heating element 146 may also comprise a cartridge heater such as, for example, a Watt-Flex® Cartridge Heater (Dalton Electric Heating Co., Inc., Ipswich, Mass.).

The heating element 146 comprising the heating wire and/or cartridge heater may be placed or laid down during formation of the nozzle member 104, 106 using an additive manufacturing process such that the heating element 146 is integrated into the adjacent material(s) of the nozzle member(s) 104, 106 as subsequent layers are built up on top of and around the heating element 146. For example, a suitable additive manufacturing process as described herein may be used to sequentially form a first plurality of layers in a configured pattern corresponding to, for example, a shape of one of the first or second nozzle members 104, 106 or a portion thereof. The process may be halted temporarily to allow placement of a heating element 146 adjacent to one or more portions or sections of the partially-formed nozzle member 104, 106. After the heating element 146 has been placed, the manufacturing process resumes with sequentially forming a second plurality of layers on top of the heating element 146 until the nozzle member 104, 106 or portion thereof reaches a desired level of completion. The heating element 146, particularly a flexible heating wire 146, may be embedded in close proximity to a particular portion or section of the nozzle member 104, 106, as described herein, and at a substantially constant depth to enable a more even temperature distribution across the nozzle member 104, 106. As shown in FIG. 2A, the heating elements 146 in the first and second nozzle members 104, 106 are each coupled to a power supply 148. In other examples, each heating element 146 may be coupled to the same power supply 148 (not shown). In all configuration, the power supply 148 may supply a current or voltage to the heating element 146.

In further examples, the heating element 146 may comprise one or more channels (similar to the second duct 150C in the nozzle member(s) 142, 144) for conveying a heating fluid, such as a heated gas, from a heating fluid source (not shown). The channel(s) may be formed during manufacture of the nozzle member 104, 106 using, for example, MPA as described herein. The channel(s) may be formed at one or more desired location in any shape with any desired dimension(s).

Figure 8A:
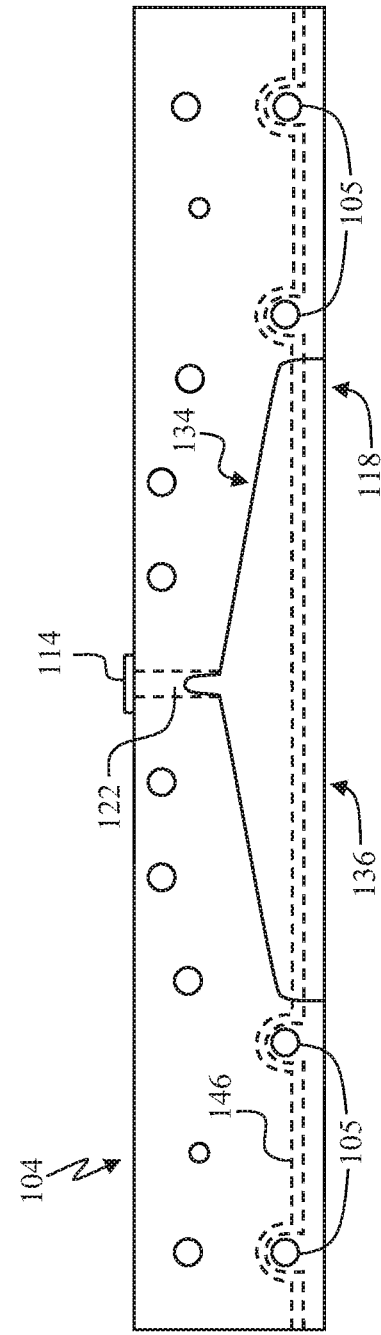
FIGS. 8A-8D are plan views of a nozzle member with various configurations of a heating element.

The heating element 146 is adapted to provide heat energy to the one or more portions or sections of the first and/or second nozzle member 104, 106 into which the heating element 146 is formed, integrated, or embedded and to neighboring or adjacent regions of the first and/or second nozzle member 104, 106. For example, the heating element 146 may be located adjacent to one or more of the fluid orifice(s) 114, the conduit(s) 122, the passageway(s) 134, or the slot(s) 136 formed within one or both of the nozzle members 104. 106. FIGS. 2A and 8A-8D illustrate various configurations and locations for the heating element 146, in which the nozzle member 104 in FIGS. 8A-8D may represent one or both of the first and second nozzle members 104, 106 as described herein. Some details of the nozzle member 104 have been removed in FIGS. 8A-8D to illustrate other aspects of the nozzle member 104 in detail. With reference to FIGS. 2A, 3A, 3B, and 3D, the heating element 146 may be substantially linear and may be positioned or formed between the outer surfaces 118, 120 and the through-bores 105, 107 of the respective nozzle member 104, 106. As shown in phantom in the second nozzle member 106 of FIG. 2A, the heating element 146 may run substantially parallel to the outer surface 120 and is adjacent to the slot 136 and a section of the passageway 134 near the slot 136. As shown in FIG. 8A, the heating element 146 may be positioned or formed such that the majority of the heating element 146 is adjacent and runs parallel to the outer surface 118 but may be loop below and around the through-bores 105. Similar to the heating element 146 shown in FIG. 2A, the heating element 146 in FIG. 8A is positioned or formed adjacent to the slot 136 and a section of the passageway 134 near the slot 136.

Figure 8B:
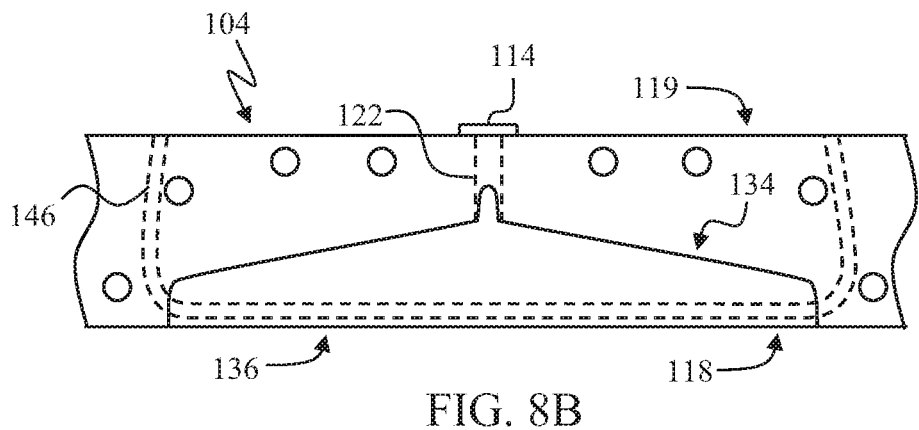
Figure 8C:
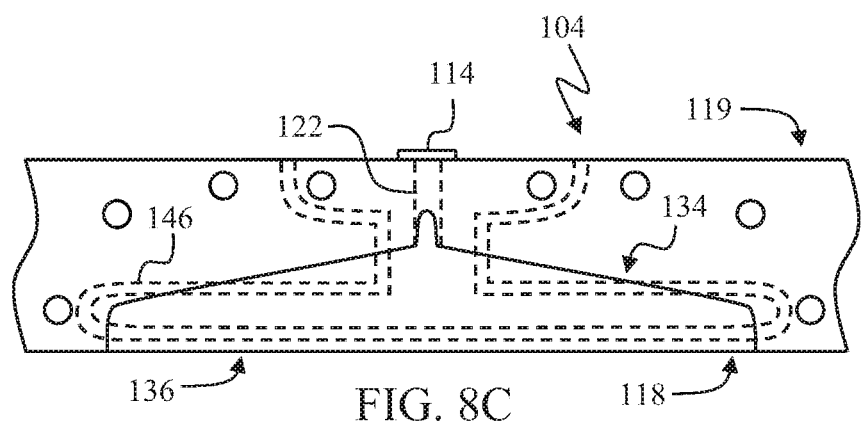
Figure 8D:
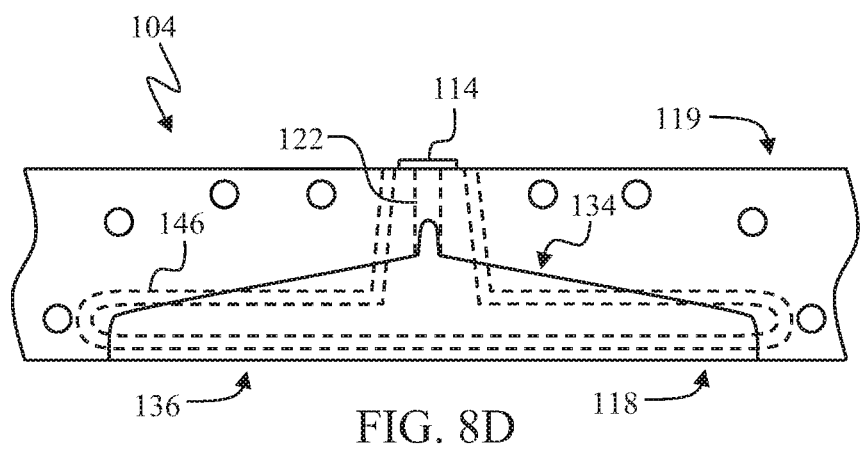

In FIGS. 8B-8D, the heating element 146 is positioned or formed such that its path substantially follows at least a portion of the shape of the passageway 134, e.g., a coat hanger shape. For example, in FIG. 8B, a section of the heating element 146 is adjacent and runs parallel to the outer surface 118, with this section of the heating element 146 being positioned or formed adjacent to the slot 136 and the section of the passageway 134 near the slot 136. The remainder of the heating element in FIG. 8B then extends toward the base surface 119 of the nozzle member 104. In FIG. 8C, a section of the heating element 146 is adjacent and runs parallel to the outer surface 118, with this section of the heating element 146 being positioned or formed adjacent to the slot 136 and the section of the passageway 134 near the slot 136. The heating element 146 in FIG. 8C then loops back toward the center of the passageway 134, extends toward the base surface 119 adjacent to a section of the conduit 122, before looping away from the conduit 122 and around through-bores 105 near the base surface 119. The heating element 146 in FIG. 8D is similar to the heating element in FIG. 8C, except that after looping back toward the center of the passageway 134, the heating element 146 then extends along substantially the entire length of the conduit 122 to the base surface 119. In some examples (not shown), one or both of the nozzle members 104, 106 may each comprise two or more heating elements 146. In addition, it is to be appreciated that the heating element 146 may be used in examples in which the nozzle member 104 comprises two or more fluid orifices 114, conduits 122, passageways 134, and/or slots 136 (see FIGS. 6 and 7).

With reference to FIGS. 3A, 3B, and 3D, the nozzle assembly 100, 100' may further comprise one or more sensors 158A, 158B embedded in or coupled to one or more components of the nozzle assembly 100, 100'. For example, one or more temperature sensors 158A may be located near the passageway 134, the slot 136, and/or the heating element 146 in one or both of the first and second nozzle members 104, 106 to detect the temperature of the adjacent portion(s) of the nozzle member 104, 106. Alternatively or in addition, one or more fluid flow rate and/or temperature sensors 158B may be located near the exit orifices 154 of the supply channels 150B in the third and/or fourth nozzle members 142, 144 to detect the temperature of the adjacent portion(s) of the third and/or fourth nozzle members 142, 144 and/or the fluid flow rate and/or temperature of the second fluid as it exits the nozzle body 102. The temperature sensors may comprise, for example, one or more thermocouples or resistance temperature detectors.

In all configurations, the structure and/or material(s) of a nozzle assembly in accordance with the present disclosure may be used to maintain and regulate one or more parameters of the nozzle assembly and/or the first fluid as it passes through the nozzle assembly and onto an advancing substrate. During operation, conventional nozzle assemblies generally require that the entire assembly, including the upper and lower nozzle assemblies, be heated to and maintained at a minimum operating temperature, i.e., a temperature required to maintain the first fluid in a molten state. The operating temperature is typically 100° C. or higher. With reference to FIGS. 1 and 2A, in a nozzle assembly 100 in accordance with the present disclosure, only the upper nozzle assembly 138 or portions thereof need to be heated to and maintained at the operating temperature. In some particular examples, the heating element 146 may be used to maintain and regulate the temperature of specific portion(s) or section(s) of the nozzle member 104, 106 and/or the first fluid as it passes through the nozzle member 104, 106. With reference to FIGS. 2A and 8A-8D, the heating element 146 may be used to maintain the temperature of passageway 134 and/or slot 136 at a same temperature as the remaining portions or sections of the nozzle member 104, 106, e.g., the fluid orifice(s) 114, the conduit(s) 122, and/or the sections of the nozzle member 104, 106 adjacent to the base surface 119. In some instances, the heating element 146 may allow the adjacent portion(s) or section(s) of the nozzle member 104, 106, specifically the passageway 134 and slot 136, to be operated at a higher temperature than the remaining portions or sections of the nozzle member 104, 106, such that the fluid orifice(s) 114, conduit(s) 122, and base surface 119, for example, need not be maintained at the operating temperature. One or both of ducts 150A, 150C may provide a flow of a second fluid that helps to regulate the temperature of the lower nozzle assembly 140 and/or the first fluid. In some examples as described herein, the second fluid may comprise a cooling fluid that maintains the lower nozzle assembly 138 at a lower temperature, e.g., ambient temperature, as compared to the upper nozzle assembly 138. The thermally insulating material 156 may optionally be placed between the upper and lower nozzle assemblies 138, 140 to help minimize heat transfer from the upper nozzle assembly 138 to the lower nozzle assembly 140 during operation.

In addition, one or more portions of the nozzle assembly may be formed from one or more materials that are selected for their individual properties, including thermal and/or electrical conductivity, hardness, toughness, wear or abrasion resistance, and chemical resistance. In particular, as described herein, one or more components and/or portions of one or more components of the nozzle assembly may be made, at least in part, using an additive manufacturing process. The additive manufacturing processes described herein may be used to form not only the desired internal geometry of the nozzle assembly (e.g., the conduit(s) 122, passageway(s) 134, duct(s) 150A, 150C, supply channel(s) 150B, etc.; see FIGS. 3A and 3D) but also to allow improved control over one or more parameters within the nozzle assembly. For example, with reference to FIGS. 2B, 3A, 3B, and 3D, the entire first and/or second nozzle member 104, 106 or portion(s) thereof, e.g., the region(s) 160 and/or the receiving portions 104A, 106A, may comprise a material with high thermal conductivity, as compared to neighboring regions 161 and/or the exit portions 104B, 106B that are formed from a different material with one or more different properties. The nozzle members 104, 106 may be formed such that the material with high thermal conductivity is located adjacent to or defines one or more of the fluid orifice(s) 114, the conduit(s) 122, the passageway 134, and/or the slot 136 so that the temperature of these portions of the nozzle members 104, 106 may be carefully maintained and so that heat energy applied to the nozzle member 104, 105, e.g., via the heating element 146, is efficiently conducted to these portions and transmitted into the first fluid.

With reference to FIGS. 3A and 3B, one or more components of the nozzle assembly 100 may be coupled to a controller 164, which may at least partially control operation of the nozzle assembly 100. For example, the controller 164 may be coupled to and may receive data from the one or more sensors 158A, 158B, the power supply 148, and/or the fluid source(s) 152. Based on the data received from the one or more sensors 158A, 158B, the controller 164 may control operation of the nozzle assembly 100 to achieve, for example, the desired distribution pattern and amount of first fluid deposited on the advancing substrate 112. In some examples, based on information received from the one or more temperature sensors 158A located in the upper nozzle assembly 138, the controller 164 may control a voltage or current supplied by the power supply 148 to increase or decrease the heat energy provided to the one or more portions of first and/or second nozzle member 104, 106, as described herein, thereby raising or lowering the temperature of these portions. The controller 164 may also receive information from the one or more temperature and/or fluid flow rate sensors 158A located in the lower nozzle assembly 140 and may control operation of the second fluid source(s) 152 to alter, for example, the flow rate, temperature, type, and/or content of the second fluid.

With reference to FIGS. 3A, 3B, and 4, one or more of the sections 118A, 118B of the outer surface 118 of the first nozzle member 104 may comprise one or more layers of a wear-resistant material 190. A LMD process may be used to repair and/or modify these section(s) 118A, 118B of the outer surface 118, as well as portions or sections of one or more other components of the nozzle assembly 100. In particular, LMD may be used to form the one or more layers of wear-resistant material 190 directly on the one or more sections 118A, 118B of the outer surface 118. Although only the first nozzle member 104 is depicted in FIG. 3B as comprising the one or more layers of the wear-resistant material 190, it is to be appreciated that one or more sections of the outer surfaces 118, 120 of one or both of the first nozzle member 104 or the second nozzle member 106 may comprise the wear-resistant material 190.

One or more sections 118A, 118B of the outer surface 118 of the nozzle member 104 may undergo wear due to constant or intermittent contact with the substrate 112 and/or the first fluid dispensed by the nozzle body 102. It is also to be appreciated that the wear may be due, at least in part, to the device used to advance the substrate 112, 312 past the nozzle body 102, such as a rotating drum or a conveyor (not shown). This wear may lead to relatively frequent replacement of the nozzle body 102, which becomes costly for manufacturers. To minimize cost and reduce the wear on the outer surface 118, an abrasion- or wear-resistant material 190 may be fused to one or more sections 118A, 118B of the outer surface 118 using an LMD process. Fusing one or more layers of wear-resistant material 190 to the outer surface 118 allows the outer surface 118 to be formed and/or replaced or repaired independent of the remainder of the nozzle body 102. In particular, the one or more layers of the wear-resistant material 190 may be fused to the exit portion 104B, 106B of one or both of the first and second nozzle members 104, 106.

Using LMD, the wear-resistant material 190 may be applied in one or more layers on the outer surface 118 and/or on any exterior surface of the nozzle member 104 or other component of the nozzle assembly 100. The nozzle member 104 may comprise a first material, and the wear-resistant material 190 comprises a second, different material. During the LMD process, the laser may operate out of focus in a range of from about 0.1 mm to several cm. In some examples, the first material of the nozzle member 104 may be partially melted during deposition of the wear-resistant material 190 onto the outer surface 118. As such, a metallurgic bond may be created between the wear-resistant material 190 and the first material of the nozzle member 104. As used herein, a "metallurgical bond" means that the wear-resistant material 190 is fused to the first material of the nozzle member 104 such that the microstructure of the first material may be intimately linked to the microstructure of the wear-resistant material 190. In some examples, when applying more than one wear-resistant material 190 and/or one or more layers of wear-resistant material 190, metallurgic bonds also may be created between the different wear-resistant materials 190 and/or between the layers. An exemplary LMD process is disclosed in more detail in U.S. Patent Publication No. 2013/0049438 A1.

For example, as shown in FIG. 3B, a first or bonding layer 192 of the wear-resistant material 190 may comprise a metal or a metal alloy that is similar to the first material of the nozzle member 104 that is adjacent to the bonding layer 192. The bonding layer 192 may form little or no brittle phase when mixed with the first material. A second or bearing layer 194 of the wear-resistant material 190 may be configured to provide sufficient strength, such as compressive strength, and stiffness when the coated portion is loaded during operation. Thus, the second layer or bearing layer 194 may comprise a metal or a metallic alloy that is similar to the bonding layer 192 but contains elements to form solid solutions and/or medium hard phases. A third or wear-resistant layer (not shown) may comprise a compound of a matrix in which hard phases, such as for example carbides, borides and/or nitrides, are embedded. The matrix may be a metallic alloy that is similar to the second layer 194 but also contains elements to form a solid solution and/or medium hard phases, and also be identical to the second layer 194.

The hard phases may be homogeneously distributed inside the metallic matrix in various amounts. The hard phases may also be incorporated as solid particles during the coating process or may precipitate during the solidification process from the melt. The additional layers of wear-resistant material 190 may lead to increased hardness of the outer surface 118. One or more of the layers comprising the wear-resistant material 190 may also comprise a corrosion-resistant material, such as stainless steel or H13 tool steel, for example. A separation between the nozzle body 102 and the layers 192, 194 of the wear-resistant material 190 is exaggerated for illustrative purposes. It is to be understood that the outer surface section 118A of the first nozzle member 104 would be substantially aligned with the outer surfaces section 120A of the second nozzle member 106 (see FIGS. 1 and 3A).

It is also to be appreciated that, in other examples, the nozzle member 104 may remain substantially unmelted, and thus, the nozzle member 104 may stay substantially in its pre-laser deposition condition. This lack of melting may be advantageous to minimize the heat-affected zone, which may lead to a relatively reduced number of cracks and a more resilient nozzle body 102.

The LMD process described herein may be used to form an initial wear-resistant material 190 on one or both of the nozzle members 104, 106 prior to usage. In some configurations, with reference to FIG. 4, a nozzle member 104 lacking one or more of sections 118A, 118B may be formed as described herein from a first material, and LMD may be used to build up and form section(s) 118A, 118B from a wear-resistant material 190. In a particular configuration, the nozzle member 104 may include sections 118B formed from the first material but may lack section 118A that is adjacent to the slot. LMD may be used to form the section 118A from the wear-resistant material 190 between the existing sections 118B formed from the first material. In other configurations, a complete nozzle member 104 (including section 118A) may formed from a first material, and one or more layers of a wear-resistant material 190 may be applied to one or more sections 118A, 118B of the outer surface 118, as described herein. In further configurations, LMD may be used to deposit one or more layers of wear-resistant material 190 to repair and/or replace portions of the nozzle members 104, 106 that have been damaged due to wear.

It is to be appreciated that any number of layers of wear-resistant material 190 may be applied to the outer surface 118 and/or other exterior surface of one or both of the nozzle members 104, 106. For example, a single layer, two layers, three layers, four layers, and/or five layers may be applied. In addition, each layer may not completely cover the entirety of the outer surface 118 or other surface. In some examples, the first layer 192 of the wear-resistant material 190 may be applied to a certain portion of the outer surface 118 of the nozzle member 104, and the second layer 194 may be applied such that only a portion of the first layer 192 is covered, as shown in FIG. 3B. In other examples (not shown), the second layer 194 may be applied to the first layer 192 in substantially the same area of the outer surface 118. Further, the placement of the one or more layers of wear-resistant material 190 may be based on the type and location of wear that occurs. For example, a portion (not separately labeled) of the outer surface 118 that first engages or initially contacts the substrate may incur more wear than a portion (not separately labeled) downstream of the initial contact area and, thus, may need more layers of wear-resistant material 190. By contrast, the downstream portion of the initial contact area may have fewer layers. This selective application may be a cost savings to manufacturers. In all examples, the area of application may depend upon the substrate and the first fluid to be dispensed.

Further, the wear-resistant material(s) 190 may be applied at various depths, as measured in a direction that is substantially perpendicular to the surface to which the material 190 is applied. For example, a layer of wear-resistant material 190 may be applied at a depth of from about 0.1 mm to about 4.5 mm, from about 0.5 mm to about 4.0 mm, and/or from about 1.0 mm to about 3.5 mm, specifically reciting all 0.1 mm increments within the specified ranges and all ranges formed therein and thereby. Each layer of wear-resistant material 190 may have a different depth or each layer of wear-resistant material 190 may have the same depth. As noted above, in some instances, the one or more layers of wear-resistant material 190 may be applied over one or more of the sections 118A, 118B formed from a first material, and in other instances, the wear-resistant material 190 may be used to build up and form one or more of sections 118A, 118B.

The one or more wear-resistant materials 190 may comprise various types of materials. For example, the one or more wear-resistant materials may include at least one of: powder-metallurgical steel; high speed steel; titanium carbide, niobium carbide, tantalum carbide, chromium carbide, tungsten carbide, or mixtures thereof. The wear-resistant material may comprise a carbide of at least one element of the fourth group of elements (Group 4; titanium carbide, zirconium carbide, or hafnium carbide), the fifth group (Group 5; vanadium carbide, niobium carbide, or tantalum carbide), the sixth group (Group 6; chromium carbide, molybdenum carbide, or tungsten carbide), and/or the seventh group (Group 7; manganese carbide or rhenium carbide) of the periodic table. Carbides of each group may be used individually, as a mixture with one or more carbide(s) in the same group, and/or as a mixture with one or more carbides in one or more other groups. In some particular examples, titanium carbide, niobium carbide, tantalum carbide, chromium carbide, tungsten carbide, or a mixture thereof may be used. The carbides may be deposited as a powder comprising particles of several sizes and/or shapes. For example, in some embodiments, the particles may be from about 40 am to about 90 am. Carbides may be provided in a matrix material, in which the matrix material may comprise nickel, cobalt and/or iron. The carbides may be present in the matrix material in an amount of from about 60% to about 80%, from about 70% to about 80%, from about 70% to about 75%, or in any individual number within the values provided or in any range including or within the values provided.

As previously mentioned, the first material of the nozzle members 104, 106 may be different from the one or more wear-resistant materials 190 fused thereto. The presence of the wear-resistant material(s) 190 allow the material(s) of the nozzle members 104, 106 to be selected based on properties other than wear resistance. For example, the first material of the nozzle member 104, 106 may comprise copper, which has good thermal conductivity but may experience significant wear during operation. The wear-resistant material(s) 190 may be used to protect the nozzle members 104, 106 and prolong their service life.

Figure 3C:
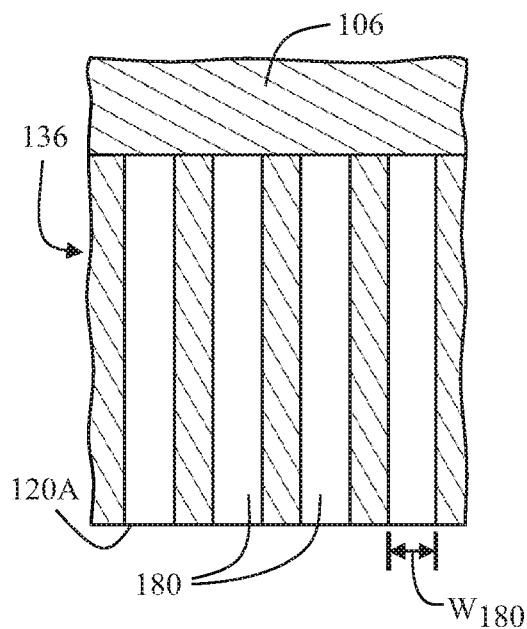
FIG. 3C is a cross-sectional view of a slot of the nozzle assembly of FIG. 3B taken along the line 3C-3C.
Figure 3D:
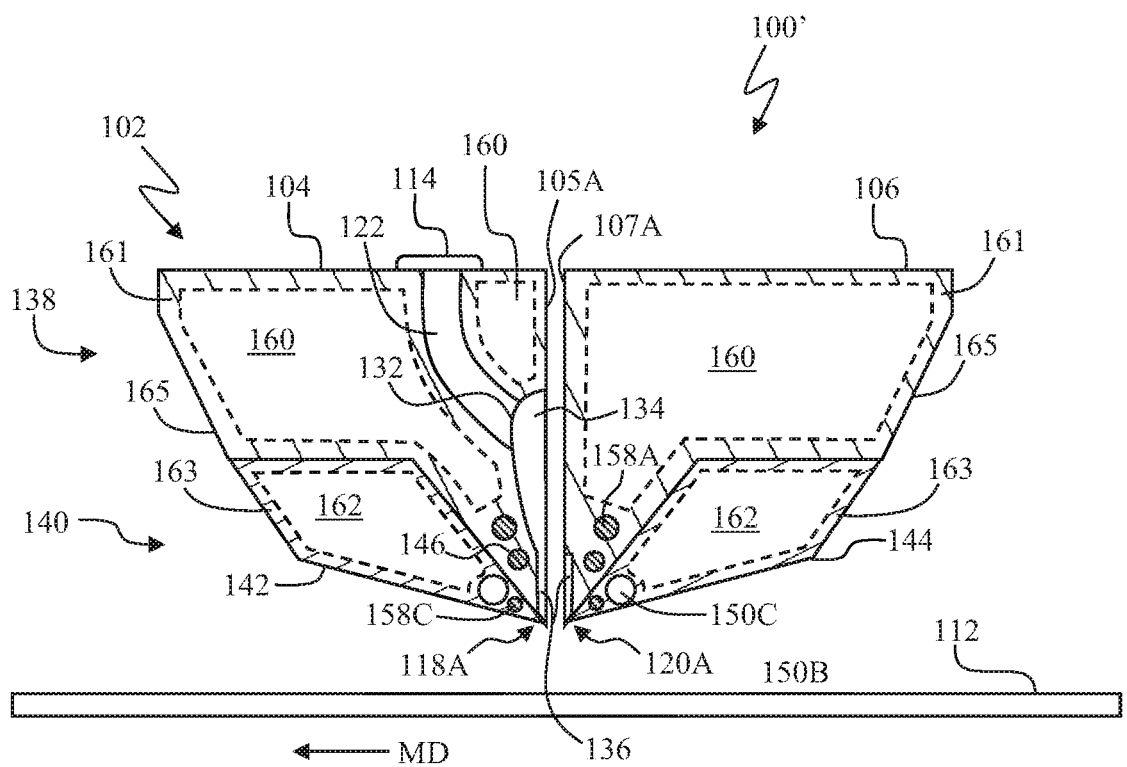
FIG. 3D is a cross-sectional view, similar to FIG. 3A, of another exemplary nozzle assembly.
Figure 3E:
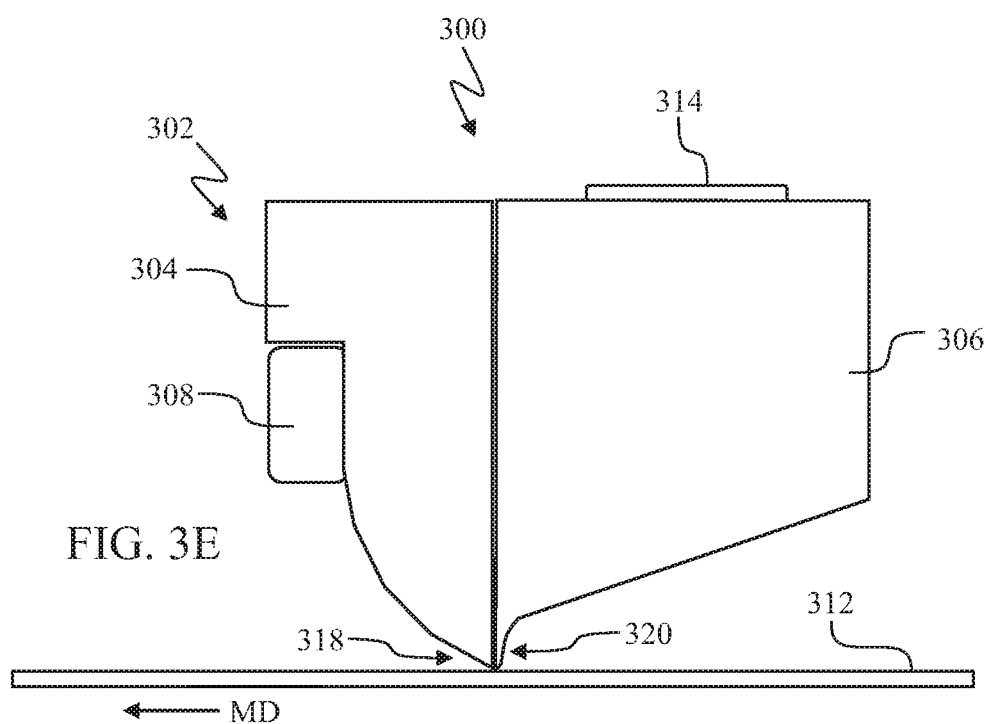
FIG. 3E is an end view of another exemplary nozzle assembly.

With reference to FIGS. 2B and 3A-3C, in some configurations, one or more distribution channels 180 may be formed in the exit portions 104B, 106B defining the slot 136 of one or both of the nozzle members 104, 106. FIG. 2B is a detailed plan view of the slot 136 of the first nozzle member 104 of FIG. 2A, and FIG. 3C is a detailed cross-sectional view taken along line 3C-3C of the slot 136 of the second nozzle member 106 in FIG. 3B.

In some examples, the distribution channels 180 may be formed using a laser ablation process. Laser ablation as a machining process may be used for several industrial applications in the fields of, for example, electronics, photovoltaics, printing, and mold-making. The main benefits of laser processing, as compared to conventional processing technologies, may include higher precision, contact-free processing, wear-free tools, and the possibility to process almost any material. By controlling the focus diameter ($d_f$) and pulse overlap (($1-d_f)/\Delta x$) and moving the laser focus with a velocity $v_s$ in adjacent tracks across a workpiece, cavities or structures may be ablated layer by layer in virtually any desired pattern. The applied laser sources may include continuous wave and pulsed laser systems. The pulse durations may range from milliseconds to hundreds of femtoseconds covering micro-, nano- and picoseconds (ps). The use of ultra-short pulsed laser radiation with pulse durations below 10 ps has gained increasing interest, as this duration enables very precise materials processing with negligible thermal load. Typically, very little thermal diffusion occurs due to the extremely short light-matter interaction times, and the absorbed energy is restricted to a small volume of the workpiece, leading to a negligible heat-affected zone and a high precision, sublimation-dominated ablation process.

In some instances, the distribution channels 180 may be formed in the wear-resistant material 190 that forms, or is deposited on and fused to, the outer surface sections 118A, 120A of the exit portions 104B, 106B of one or both of the nozzle members 104, 106. For example, with reference to FIGS. 3A and 3B, distribution channels 180 may be formed in the first nozzle member 104 by sequentially forming, from one or more materials using a suitable additive manufacturing method, a first plurality of layers in a configured pattern corresponding to a shape of a first portion, e.g., the receiving portion 104A, of the nozzle member 104; forming a second portion defining an exit portion 104B of the nozzle member 104 by fusing at least one layer of a second material to the first material comprising the first portion, in which the second material comprises a greater wear resistance as compared to the at least one first material; and forming, by laser ablation process in a section of the exit portion 104B defining the slot 136, a plurality of distribution channels 180.

In other instances, the distribution channels 180 may be formed in the outer surface sections 118A, 120A and one or more layers of wear-resistant material 190 may be deposited on top of the distribution channels 180. For example, with reference to FIGS. 3A and 3B, first and second portions of the first nozzle member 104 may be formed as described herein (from the same material or from different materials), and the distribution channels 180 may be formed in the exit portion 104B of the nozzle member 104 by laser ablation. One or more layers of the wear-resistant material 190 may then be deposited over the formed distribution channels 180.

The distribution channels 180 may comprise any suitable width $W_{180}$. In some examples, the width $W_{180}$ of the distribution channels 180 may be from about 5 μm up to substantially the entire width $W_{134}$, $W_{134'}$ of the passageway 134 (see FIG. 4). In particular, it is believed that such a small width $W_{180}$ was not previously achievable using conventional manufacturing techniques such as milling. In addition, the distribution channels 180 may be formed to define any of one of more suitable geometric shapes (extending into the page in FIG. 3C), including semi-circular, triangular or V-shaped, square or rectangular, hexagonal, etc. The distribution channels 180 may also be formed such that the width $W_{180}$ varies along at least a section of the distribution channel 180. The width $W_{180}$ and/or shape of the distribution channels 180 may vary based, at least in part, on the method used to apply the first fluid to the substrate 112, 312 (e.g., contact vs. non-contact). For example, for a non-contact application, the slot 136 may comprise a large number of distribution channels 180 with a smaller width $W_{180}$. For a contact application, the slot 136 may comprise a single distribution channel 180 that extends across substantially an entirety of the width $W_{134}$, $W_{134'}$ of the passageway 134 or a smaller number of distribution channels 180 with a greater width $W_{180}$.

The distribution channels 180 may be formed in one or both of the first or second nozzle members 104, 106. In particular, the distribution channels 180 may be formed in both nozzle members 104 such that when the nozzle members 104, 106 are assembled in a facing relationship as shown in FIGS. 3A and 3B, the distribution channels 180 formed in the first nozzle member 104 may be aligned with the distribution channels 180 formed in the second nozzle member 106. For example, if the distribution channels 180 formed in each nozzle member 104, 106 define a semi-circular shape, i.e., a half cylinder, the distribution channels 180 of the first and second nozzle members 104, 106 may align to form a substantially cylindrical shape when the first and second nozzle members 104, 106 are assembled. The shape and width $W_{180}$ of the distribution channels 180 may also be formed to define one or more complex three-dimensional shapes, including shapes such as a conical or frustoconical shape or a hyperboloid (e.g., an hourglass shape).

In some examples, the distribution channels 180 may be used in place of a conventional shim plate 116 (see FIG. 2A). In a conventional nozzle body, one or more shim plates and/or thicker shim plates may be required to achieve the desired distribution pattern and fiber formation. The distribution channels 180 of the nozzle body 102 according to the present disclosure assist in defining a particle shape of the first fluid and/or the distribution pattern of the first fluid as it exits the nozzle body 102 and is deposited on the advancing substrate 112, 312, as shown in FIGS. 1, 3A, 3D, and 3E. In particular, the shape and/or dimensions of the distribution channels 180 may be used to control multiple properties of the first fluid including, for example, the velocity and mass flow rate of the first fluid through the slot 136, as well as the dimensions, structure, and behavior (e.g., breakage) of the fibers or filaments comprising the first fluid generated by the distribution channels 180. For example, the distribution channels 180 may help to form microfibers comprising the first fluid, in which the microfibers are then deposited on the advancing substrate 112, 312. Because the fiber/filament properties (including formation of microfibers) may be at least partially controlled by the distribution channels 180, in some instances, the temperature of the first fluid may be reduced, as compared to conventional nozzle bodies that lack the distribution channels 180. In other examples, a nozzle body 102 comprising the distribution channels 180 may require a thinner shim plate 116 or only one shim plate 116 to achieve the desired distribution pattern and particle structure.

Figure 9:
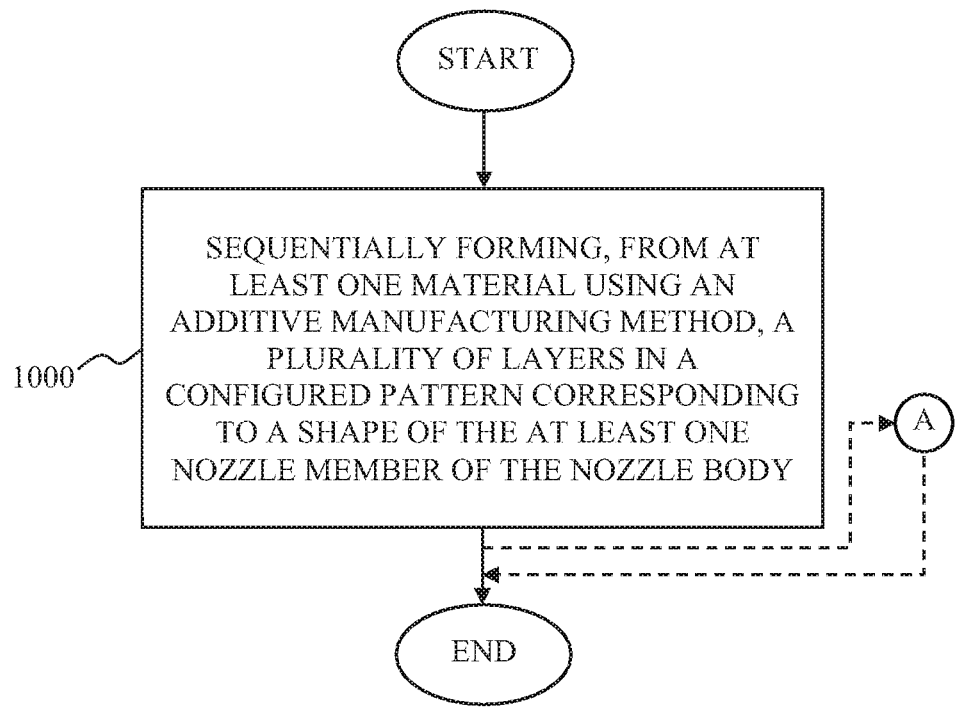
FIGS. 9-31 are flowcharts illustrating exemplary methods for making an apparatus comprising a nozzle body.

The flowcharts of FIGS. 9-31 depict exemplary methods for making an apparatus comprising a nozzle body in accordance with the present disclosure. With reference to FIG. 9, a method for making an apparatus comprising a nozzle body with at least one nozzle member for applying a first fluid to an advancing substrate may begin at Step 1000 in which a plurality of layers in a configured pattern corresponding to a shape of the at least one nozzle member of the nozzle body are sequentially formed from at least one material using an additive manufacturing method, in which the nozzle body comprises: a fluid orifice for receiving the first fluid; a conduit in fluid communication with the fluid orifice for receiving the first fluid received by the fluid orifice; a passageway in fluid communication with the conduit for receiving the first fluid received by the conduit; and a slot in fluid communication with the passageway for applying the first fluid to the advancing substrate, after which the method may terminate. The additive manufacturing method may comprise at least one of metal powder application (MPA), selective laser melting (SLM), or laser metal deposition (LMD). The at least one material may comprise a first material having a first set of properties and a second material having a second set of properties, in which the first set of properties may be different from the second set of properties. The at least one material may comprise, for example, at least one of an iron-based alloy, an aluminum-based alloy, a titanium-based alloy, a nickel-based alloy, or a high-alloy steel with one or more carbides. In some configurations, the nozzle body may further comprise at least one duct for receiving and conveying a second fluid. In some particular examples, the at least one duct may be formed such that the second fluid is supplied to the first fluid as the first fluid exits the slot and is deposited onto the advancing substrate. In other configurations, the at least one nozzle member may comprise an upper nozzle assembly member and a lower nozzle assembly member; the at least one material used to form the upper nozzle assembly member may comprise one or more metals; and the at least one material used to form the lower nozzle assembly member may comprise one of (i) one or more metals or (ii) one or more polymers.

Figure 10:
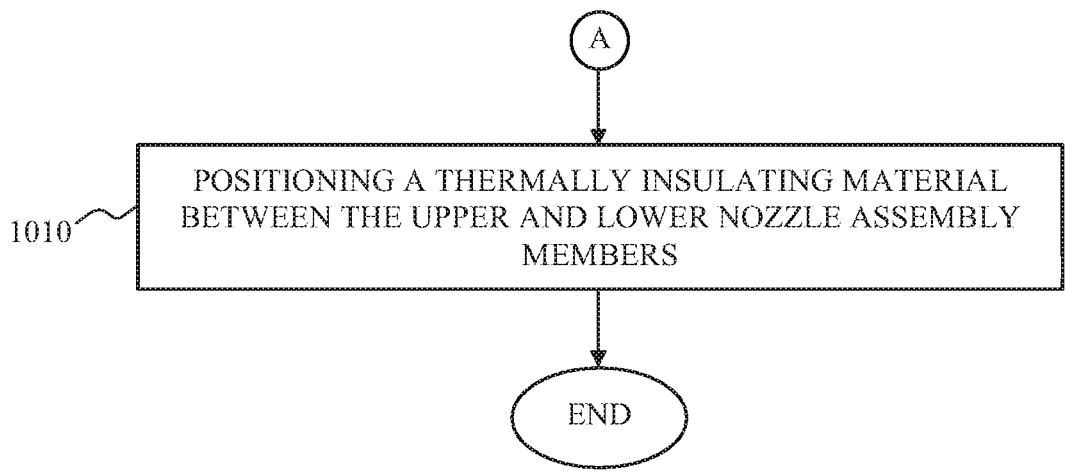
Figure 11:
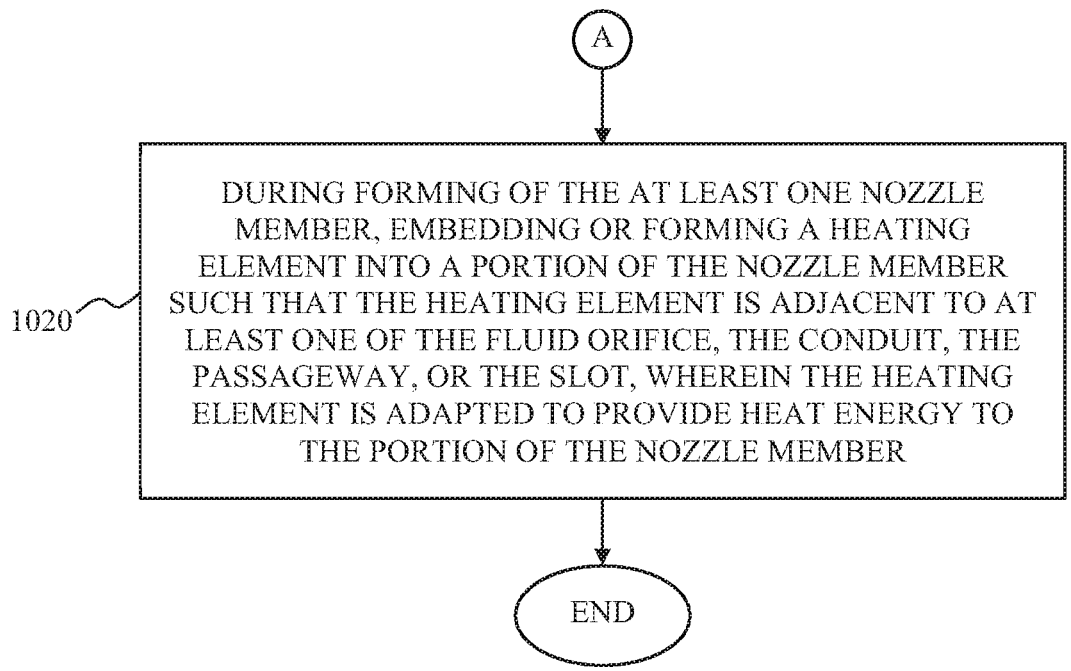

FIGS. 10-14 illustrate one or more additional, optional steps that may be performed, before, during, or after the steps depicted in FIG. 9 (indicated generally by the circled A in FIG. 9). As shown in FIG. 10, the method may further comprise optional Step 1010 in which a thermally insulating material is positioned between the upper and lower nozzle assembly members in configurations in which the at least one nozzle member may comprise an upper nozzle assembly member and a lower nozzle assembly member. As shown in FIG. 11, the method may further comprise optional Step 1020 in which a heating element is embedded or formed into a portion of the at least one nozzle member during formation of the nozzle member such that the heating element is adjacent to at least one of the fluid orifice, the conduit, the passageway, or the slot, in which the heating element is adapted to provide heat energy to the portion of the nozzle member.

Figure 12:
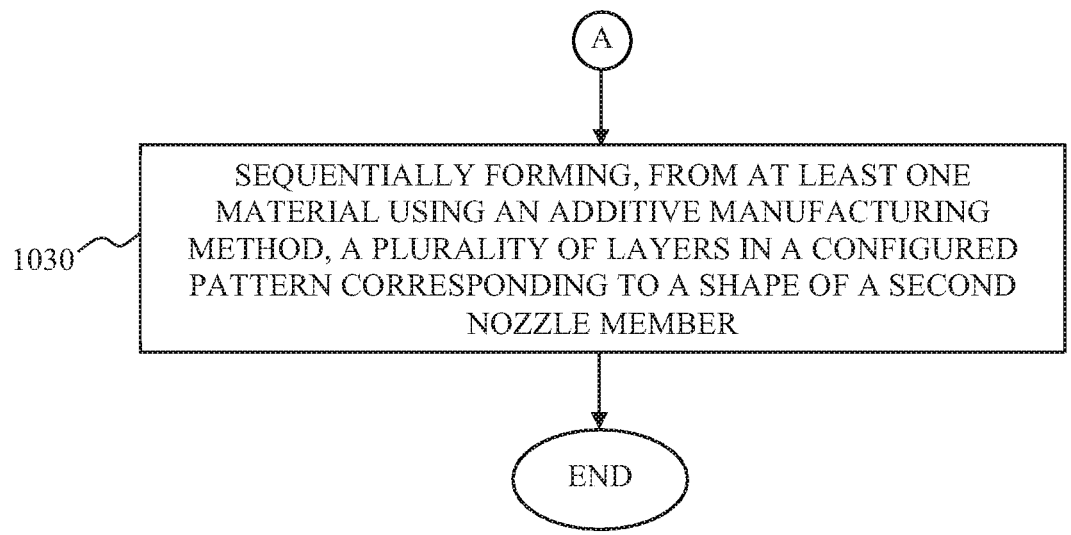

As shown in FIG. 12, in configurations in which the at least one nozzle member may comprise a first nozzle member, the method may further comprise optional Step 1030 in which a plurality of layers in a configured pattern corresponding to a shape of a second nozzle member are sequentially formed from at least one material using an additive manufacturing method. In some examples, at least one of the first nozzle member or the second nozzle member may comprise the passageway; and at least one dimension of the passageway may be configured to manage a pressure profile of the first fluid through the passageway. In some particular examples, the at least one dimension of the passageway may be configured to maintain a mass flow rate of the first fluid through the slot, the mass flow rate being substantially constant across a width of the passageway in a cross direction (CD). In other examples, the passageway may extend up to within 0.2 mm of opposing outer end surfaces of the at least one of the first nozzle member or the second nozzle member. In further examples, a first portion of at least one of the first nozzle member or the second nozzle member may comprise a first material having a first set of properties and a second portion of the at least one of the first nozzle member or the second nozzle member may comprise a second material having a second set of properties, the first set of properties being different from the second set of properties. In some particular examples, the second material may comprise a material having a greater wear resistance as compared to the first material. In yet further examples, one of the first nozzle member or the second nozzle member may have an internal hollow portion comprising approximately 50% of the internal volume of the one nozzle member.

Figure 13:
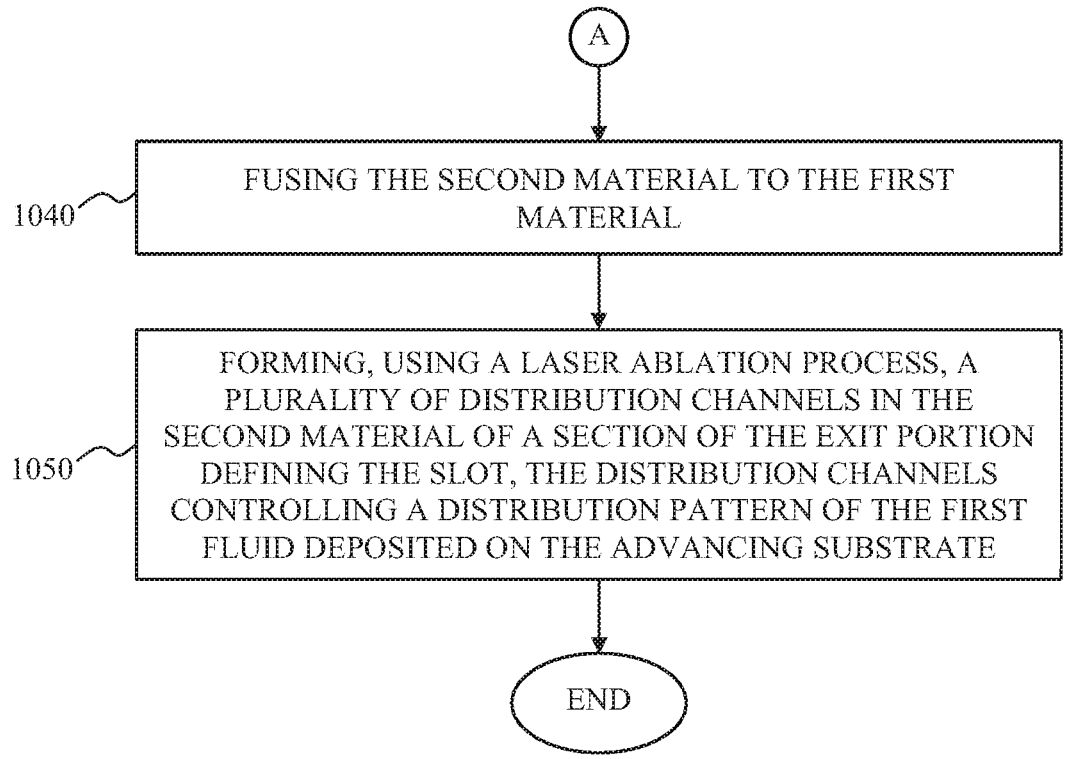
Figure 14:
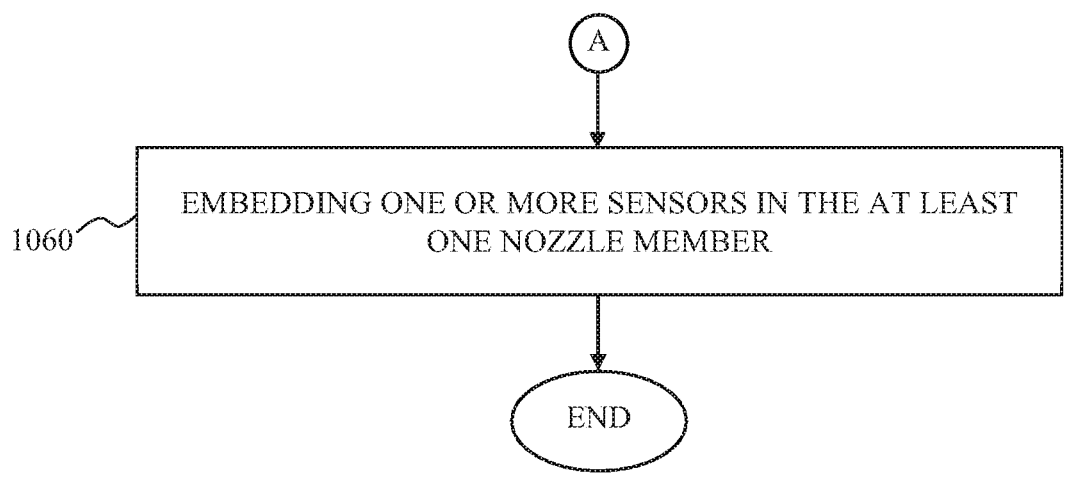

As shown in FIG. 13, in some particular configurations in which at least one of the first nozzle member or the second nozzle member comprises the passageway and the slot and the second portion comprises an exit portion of the at least one of the first nozzle member or the second nozzle member, the method may further comprise the optional steps of fusing the second material to the first material at Step 1040, and forming, using a laser ablation process at Step 1050, a plurality of distribution channels in the second material of a section of the exit portion defining the slot, the distribution channels controlling a distribution pattern of the first fluid deposited on the advancing substrate. As shown in FIG. 14, the method may further comprise the optional step of embedding one or more sensors in the at least one nozzle member at Step 1060.

Figure 15:
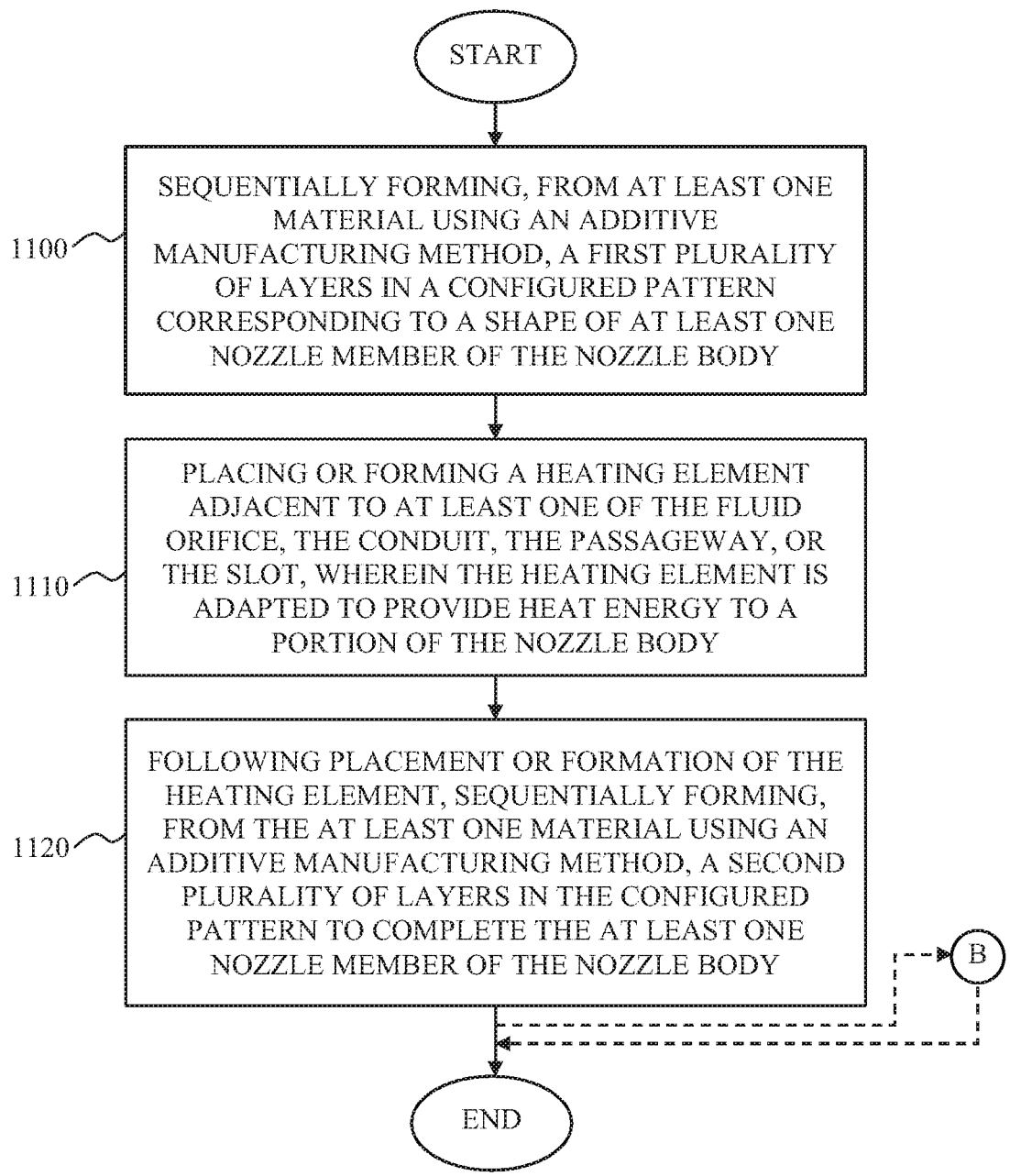

With reference to FIG. 15, a method for making an apparatus comprising a nozzle body with at least one nozzle member for applying a first fluid to an advancing substrate may begin at Step 1100 with sequentially forming, from at least one material using an additive manufacturing method, a first plurality of layers in a configured pattern corresponding to a shape of the at least one nozzle member of the nozzle body, in which the at least one nozzle member comprises: a fluid orifice for receiving the first fluid; a conduit in fluid communication with the fluid orifice for receiving the first fluid received by the fluid orifice; a passageway in fluid communication with the conduit for receiving the first fluid received by the conduit; and a slot in fluid communication with the passageway for applying the first fluid to the advancing substrate. The method may continue at Step 1110 with placing or forming a heating element adjacent to at least one of the fluid orifice, the conduit, the passageway, or the slot, in which the heating element is adapted to provide heat energy to a portion of the nozzle body, and following placement or formation of the heating element in Step 1110, the method may continue at Step 1120 with sequentially forming, from the at least one material using an additive manufacturing method, a second plurality of layers in the configured pattern to complete the at least one nozzle member of the nozzle body, after which the method may terminate. The additive manufacturing method may comprise at least one of metal powder application (MPA), selective laser melting (SLM), or laser metal deposition (LMD). The at least one material may comprise a first material having a first set of properties and a second material having a second set of properties, in which the first set of properties may be different from the second set of properties. The at least one material may comprise, for example, at least one of an iron-based alloy, an aluminum-based alloy, a titanium-based alloy, a nickel-based alloy, or a high-alloy steel with one or more carbides. In some configurations, the nozzle body may further comprise at least one duct for receiving and conveying a second fluid. In some particular examples, the at least one duct may be formed such that the second fluid is supplied to the first fluid as the first fluid exits the slot and is deposited onto the advancing substrate. In other configurations, the at least one nozzle member may comprise an upper nozzle assembly member and a lower nozzle assembly member; the at least one material used to form the upper nozzle assembly member may comprise one or more metals; and the at least one material used to form the lower nozzle assembly member may comprise one of (i) one or more metals or (ii) one or more polymers.

Figure 16:
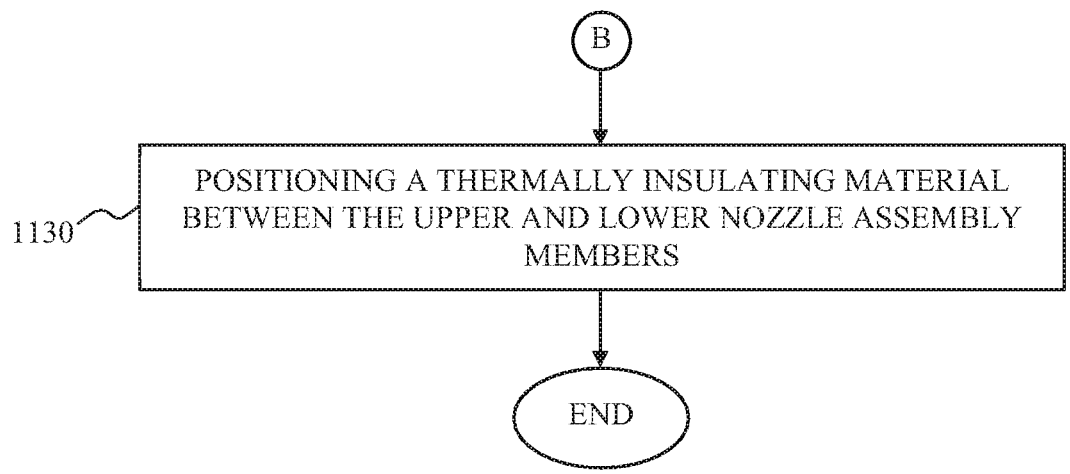
Figure 17:
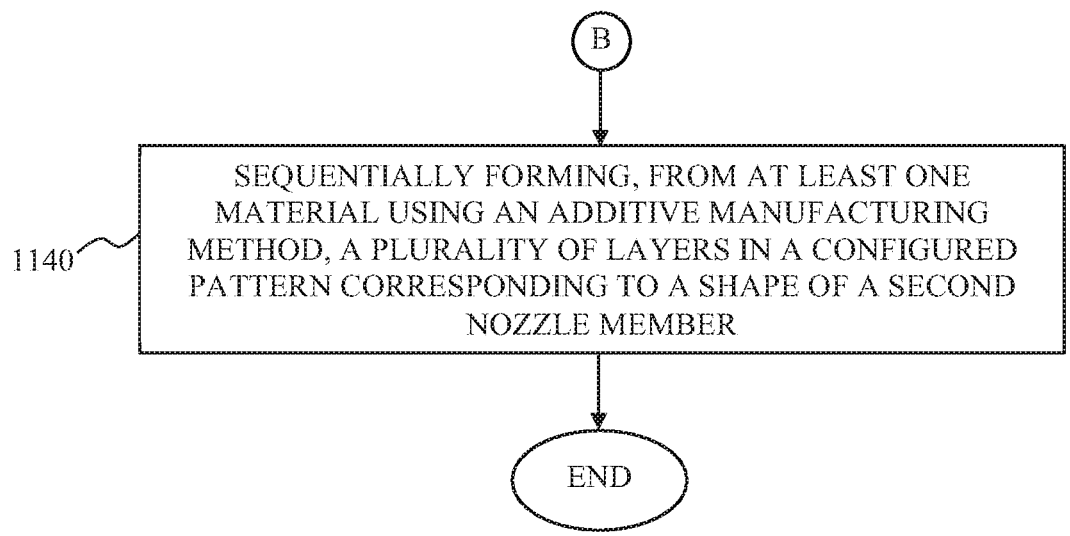

FIGS. 16-19 illustrate one or more additional, optional steps that may be performed, before, during, or after the steps depicted in FIG. 15 (indicated generally by the circled B in FIG. 15). As shown in FIG. 16, the method may further comprise optional Step 1130 in which a thermally insulating material is positioned between the upper and lower nozzle assembly members in configurations in which the at least one nozzle member may comprise an upper nozzle assembly member and a lower nozzle assembly member. As shown in FIG. 17, in configurations in which the at least one nozzle member may comprise a first nozzle member, the method may further comprise optional Step 1140 in which a plurality of layers in a configured pattern corresponding to a shape of a second nozzle member are sequentially formed from at least one material using an additive manufacturing method. In some examples, at least one of the first nozzle member or the second nozzle member may comprise the passageway; and at least one dimension of the passageway may be configured to manage a pressure profile of the first fluid through the passageway. In some particular examples, the at least one dimension of the passageway may be configured to maintain a mass flow rate of the first fluid through the slot, the mass flow rate being substantially constant across a width of the passageway in a cross direction (CD). In other examples, the passageway may extend up to within 0.2 mm of opposing outer end surfaces of the at least one of the first nozzle member or the second nozzle member. In further examples, a first portion of at least one of the first nozzle member or the second nozzle member may comprise a first material having a first set of properties and a second portion of the at least one of the first nozzle member or the second nozzle member may comprise a second material having a second set of properties, the first set of properties being different from the second set of properties. In some particular examples, the second material may comprise a material having a greater wear resistance as compared to the first material. In yet further examples, one of the first nozzle member or the second nozzle member may have an internal hollow portion comprising approximately 50% of the internal volume of the one nozzle member.

Figure 18:
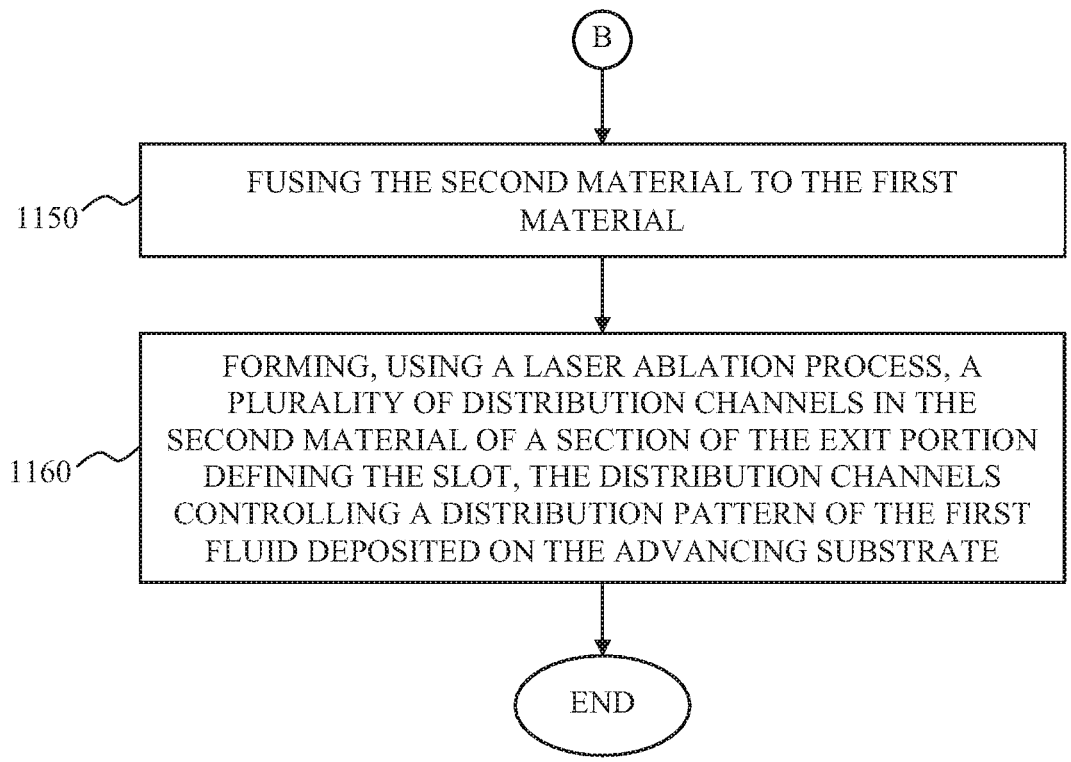
Figure 19:
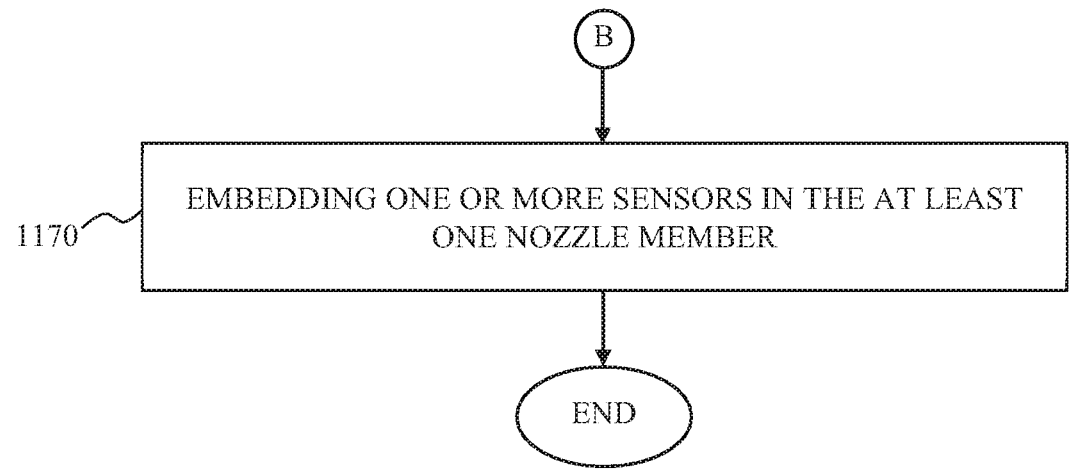

As shown in FIG. 18, in some particular configurations in which at least one of the first nozzle member or the second nozzle member comprises the passageway and the slot and the second portion comprises an exit portion of the at least one of the first nozzle member or the second nozzle member, the method may further comprise the optional steps of fusing the second material to the first material at Step 1150, and forming, using a laser ablation process at Step 1160, a plurality of distribution channels in the second material of a section of the exit portion defining the slot, the distribution channels controlling a distribution pattern of the first fluid deposited on the advancing substrate. As shown in FIG. 19, the method may further comprise the optional step of embedding one or more sensors in the at least one nozzle member at Step 1170.

Figure 20:
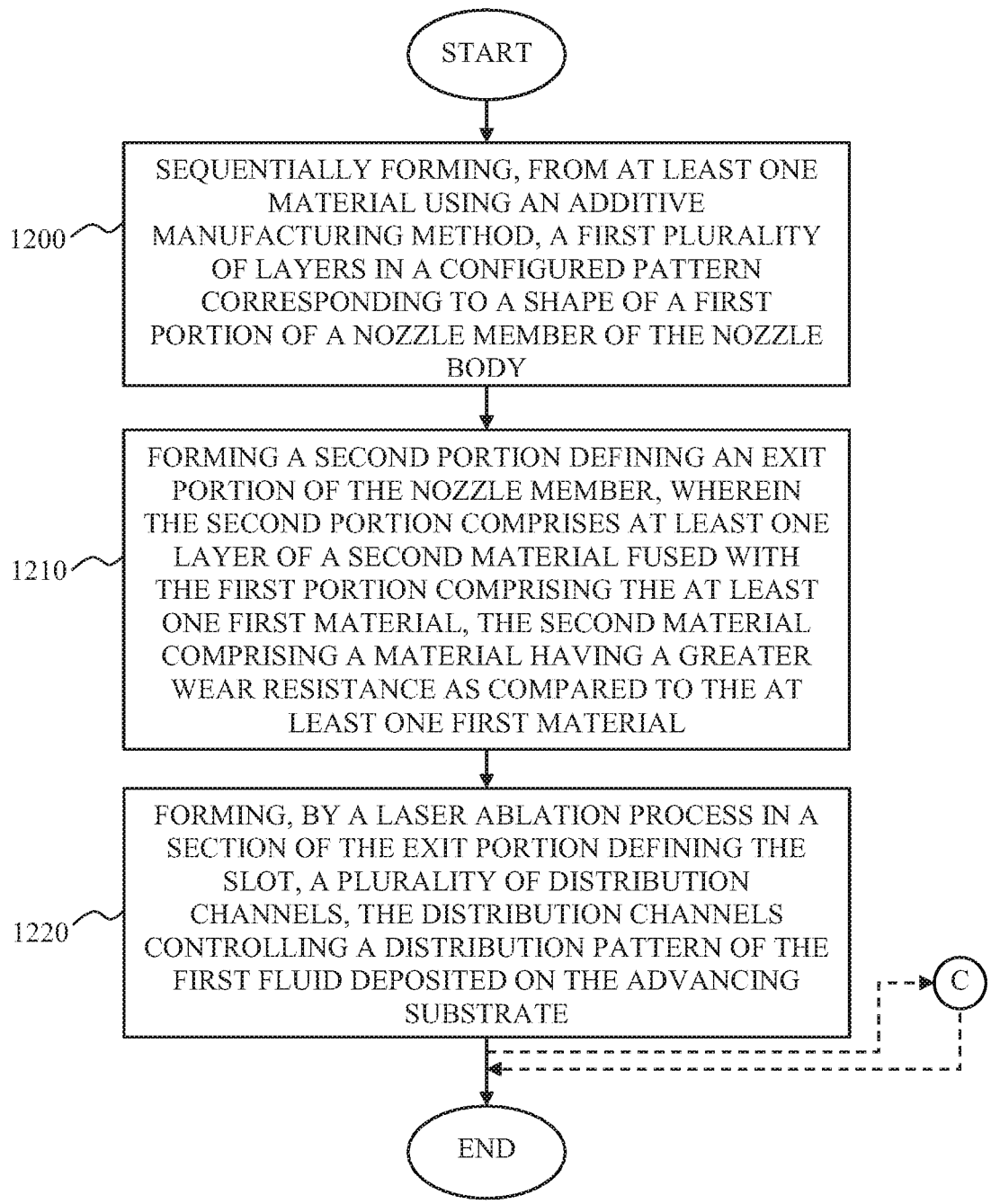

With reference to FIG. 20, a method for making an apparatus comprising a nozzle body for applying a first fluid to an advancing substrate may begin at Step 1200 with sequentially forming, from at least one first material using an additive manufacturing method, a first plurality of layers in a configured pattern corresponding to a shape of a first portion of a nozzle member of the nozzle body, in which the at least one nozzle member comprises: a fluid orifice for receiving the first fluid; a conduit in fluid communication with the fluid orifice for receiving the first fluid received by the fluid orifice; a passageway in fluid communication with the conduit for receiving the first fluid received by the conduit; and a slot in fluid communication with the passageway for applying the first fluid to the advancing substrate. The method may continue at Step 1210 with forming a second portion defining an exit portion of the nozzle member, in which the second portion may comprise at least one layer of a second material fused with the first portion comprising the at least one first material, the second material comprising a material having a greater wear resistance as compared to the at least one first material, and forming, by a laser ablation process in a section of the exit portion defining the slot, a plurality of distribution channels at Step 1220, the distribution channels controlling a distribution pattern of the first fluid deposited on the advancing substrate, after which the method may terminate. The additive manufacturing method may comprise at least one of metal powder application (MPA), selective laser melting (SLM), or laser metal deposition (LMD). The at least one material may comprise a first material having a first set of properties and a second material having a second set of properties, in which the first set of properties may be different from the second set of properties. The at least one first material may comprise at least one of an iron-based alloy, an aluminum-based alloy, a titanium-based alloy, a nickel-based alloy, or a high-alloy steel with one or more carbides; and the second material may comprise at least one of a powder-metallurgical steel, a high speed steel, or a carbide of at least one Group 4, Group 5, Group 6, or Group 7 element. In some configurations, the nozzle body may further comprise at least one duct for receiving and conveying a second fluid. In some particular examples, the at least one duct may be formed such that the second fluid is supplied to the first fluid as the first fluid exits the slot and is deposited onto the advancing substrate.

Figure 21:
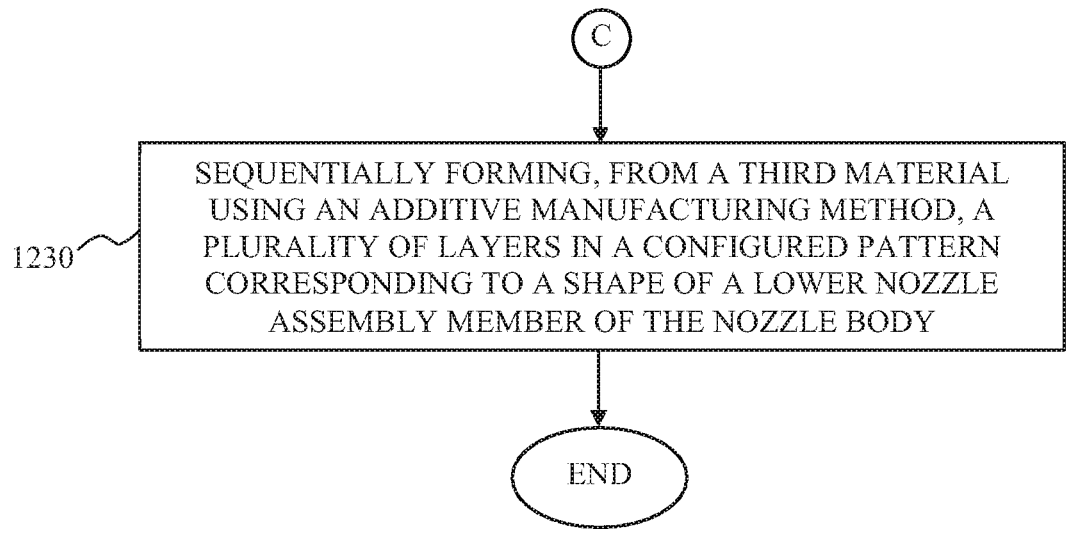
Figure 22:
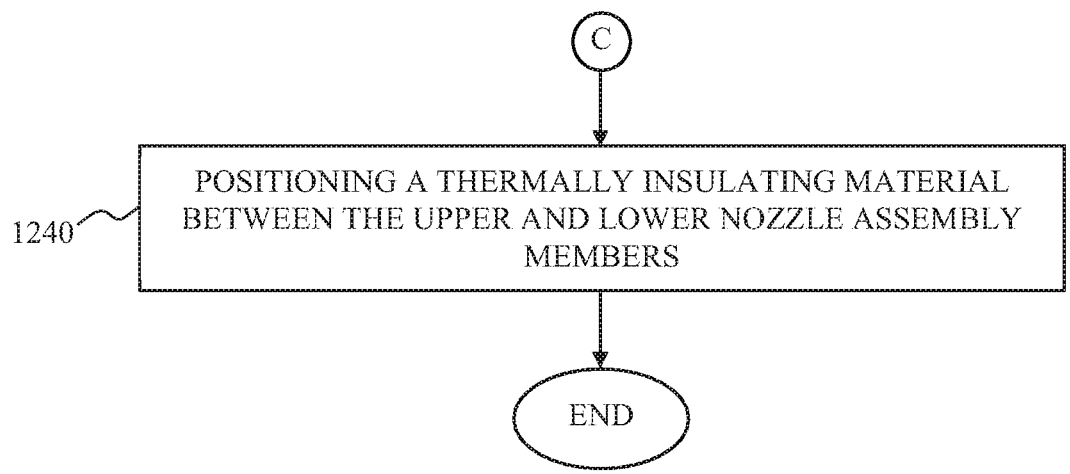
Figure 23:
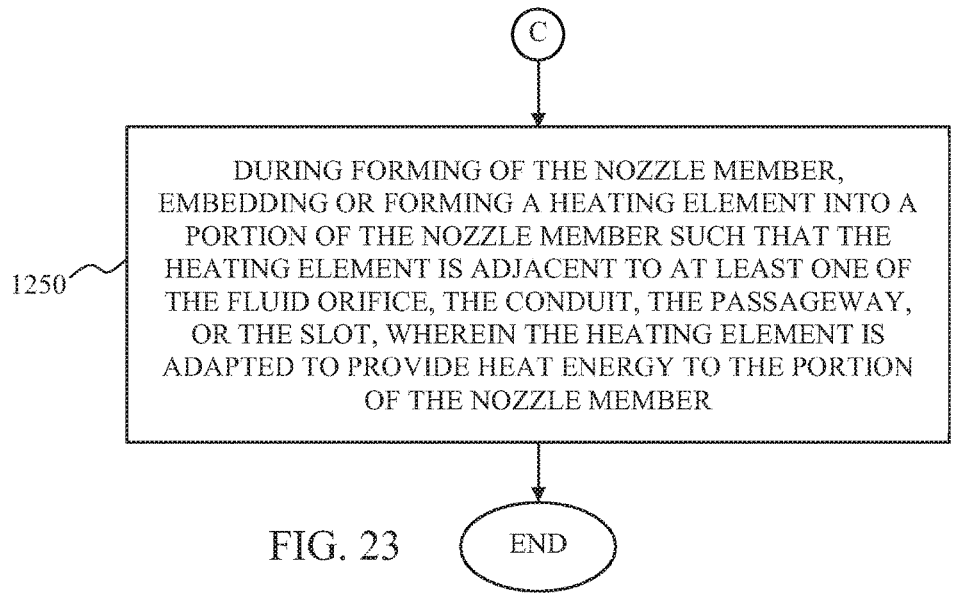

FIGS. 21-25 illustrate one or more additional, optional steps that may be performed, before, during, or after the steps depicted in FIG. 20 (indicated generally by the circled C in FIG. 20). As shown in FIG. 21, in configurations in which the nozzle member may comprise an upper nozzle assembly member, the method may further comprise optional Step 1230 in which a plurality of layers in a configured pattern corresponding to a shape of a lower nozzle assembly member of the nozzle body are sequentially formed, from a third material using an additive manufacturing method. As shown in FIG. 22, the method may further comprise optional Step 1240 in which a thermally insulating material is positioned between the upper and lower nozzle assembly members. As shown in FIG. 23, the method may further comprise optional Step 1250 in which a heating element is embedded or formed into a portion of the nozzle member during formation of the nozzle member such that the heating element is adjacent to at least one of the fluid orifice, the conduit, the passageway, or the slot, in which the heating element is adapted to provide heat energy to the portion of the nozzle member.

Figure 24:
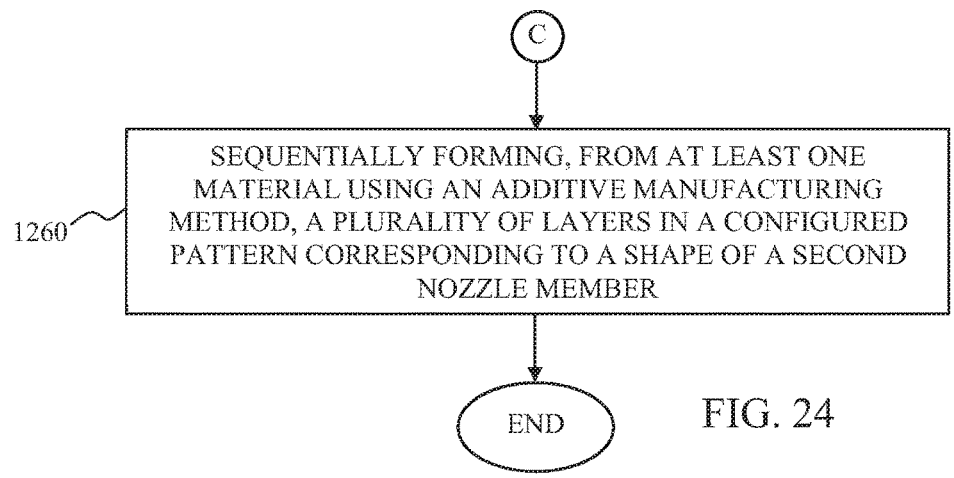
Figure 25:
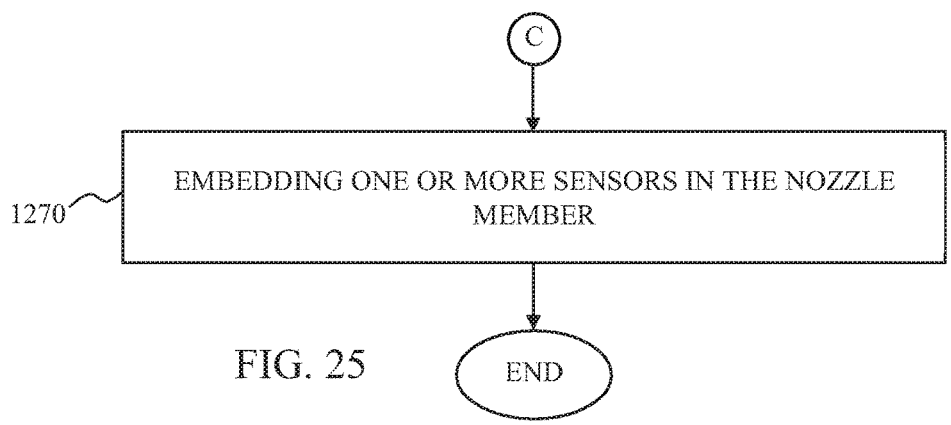

As shown in FIG. 24, in configurations in which the nozzle member may comprise a first nozzle member, the method may further comprise optional Step 1260 in which a plurality of layers in a configured pattern corresponding to a shape of a second nozzle member are sequentially formed from at least one material using an additive manufacturing method. In some examples, at least one of the first nozzle member or the second nozzle member may comprise the passageway; and at least one dimension of the passageway may be configured to manage a pressure profile of the first fluid through the passageway. In some particular examples, the at least one dimension of the passageway may be configured to maintain a mass flow rate of the first fluid through the slot, the mass flow rate being substantially constant across a width of the passageway in a cross direction (CD). In other examples, the passageway may extend up to within 0.2 mm of opposing outer end surfaces of the at least one of the first nozzle member or the second nozzle member. In further examples, at least one of the first nozzle member or the second nozzle member may have an internal hollow portion comprising approximately 50% of the internal volume of the one nozzle member. As shown in FIG. 25, the method may further comprise the optional step of embedding one or more sensors in the nozzle member at Step 1270.

Figure 26:
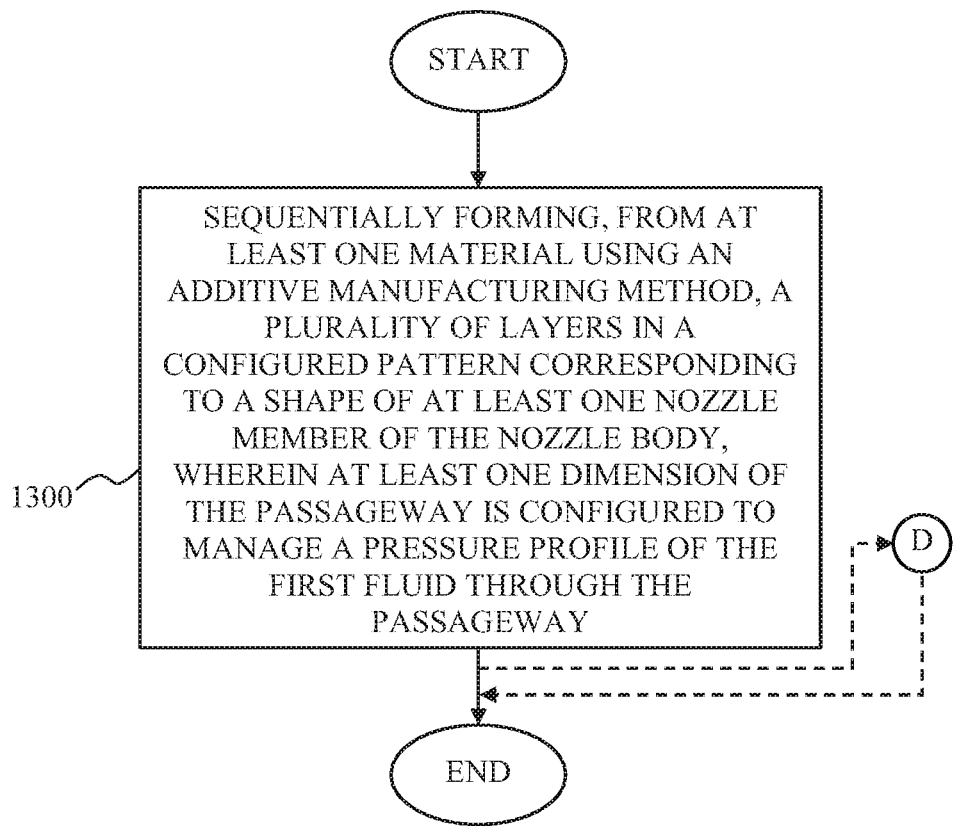

With reference to FIG. 26, a method for making an apparatus comprising a nozzle body for applying a first fluid to an advancing substrate may begin at Step 1300 in which a plurality of layers in a configured pattern corresponding to a shape of the at least one nozzle member of the nozzle body are sequentially formed from at least one material using an additive manufacturing method, in which the nozzle body comprises: a fluid orifice for receiving the first fluid; a conduit in fluid communication with the fluid orifice for receiving the first fluid received by the fluid orifice; a passageway in fluid communication with the conduit for receiving the first fluid received by the conduit; and a slot in fluid communication with the passageway for applying the first fluid to the advancing substrate, in which at least one dimension of the passageway is configured to manage a pressure profile of the first fluid through the passageway, after which the method may terminate. The additive manufacturing method may comprise at least one of metal powder application (MPA), selective laser melting (SLM), or laser metal deposition (LMD). The at least one material may comprise a first material having a first set of properties and a second material having a second set of properties, in which the first set of properties may be different from the second set of properties. The at least one material may comprise, for example, at least one of an iron-based alloy, an aluminum-based alloy, a titanium-based alloy, a nickel-based alloy, or a high-alloy steel with one or more carbides. In some configurations, the nozzle body may further comprise at least one duct for receiving and conveying a second fluid. In some particular examples, the at least one duct may be formed such that the second fluid is supplied to the first fluid as the first fluid exits the slot and is deposited onto the advancing substrate. In other configurations, the at least one nozzle member may comprise an upper nozzle assembly member and a lower nozzle assembly member; the at least one material used to form the upper nozzle assembly member may comprise one or more metals; and the at least one material used to form the lower nozzle assembly member may comprise one of (i) one or more metals or (ii) one or more polymers.

Figure 27:
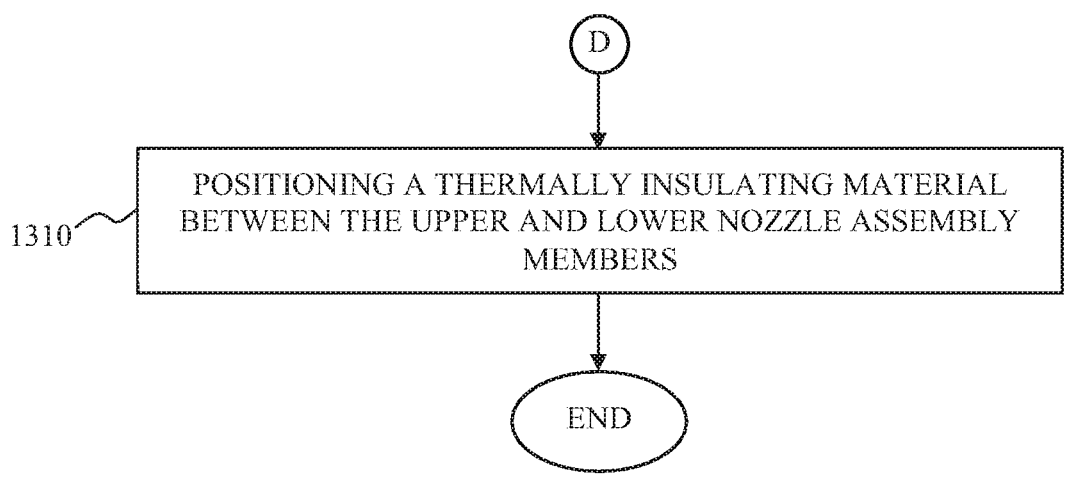
Figure 28:
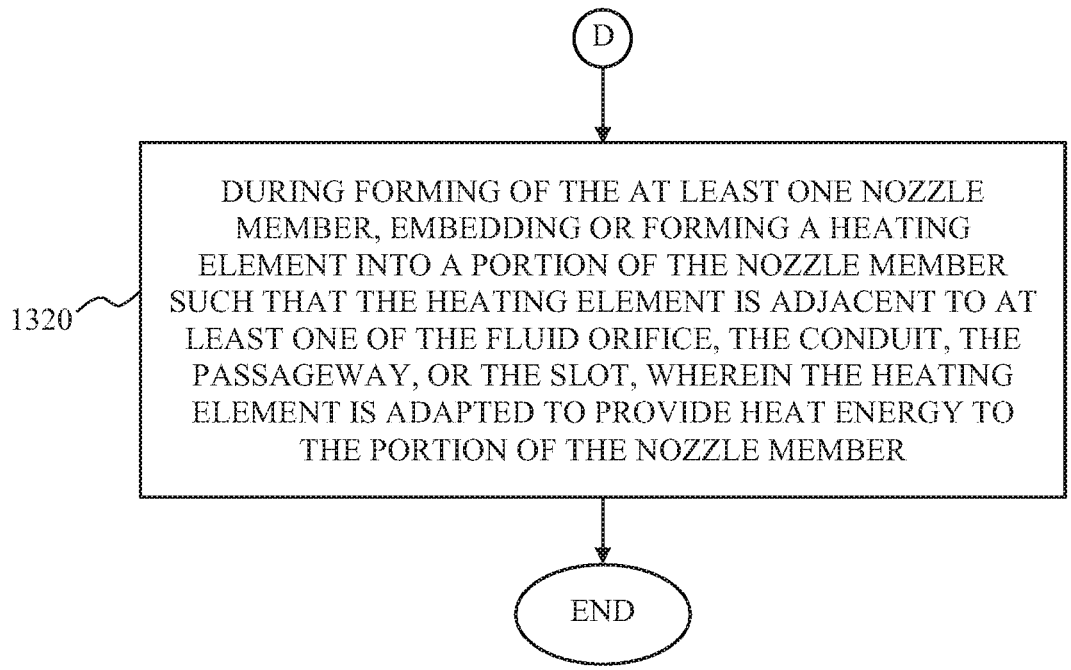

FIGS. 27-31 illustrate one or more additional, optional steps that may be performed, before, during, or after the steps depicted in FIG. 26 (indicated generally by the circled D in FIG. 26). As shown in FIG. 27, the method may further comprise optional Step 1310 in which a thermally insulating material is positioned between the upper and lower nozzle assembly members in configurations in which the at least one nozzle member may comprise an upper nozzle assembly member and a lower nozzle assembly member. As shown in FIG. 28, the method may further comprise optional Step 1320 in which a heating element is embedded or formed into a portion of the at least one nozzle member during formation of the nozzle member such that the heating element is adjacent to at least one of the fluid orifice, the conduit, the passageway, or the slot, in which the heating element is adapted to provide heat energy to the portion of the nozzle member.

Figure 29:
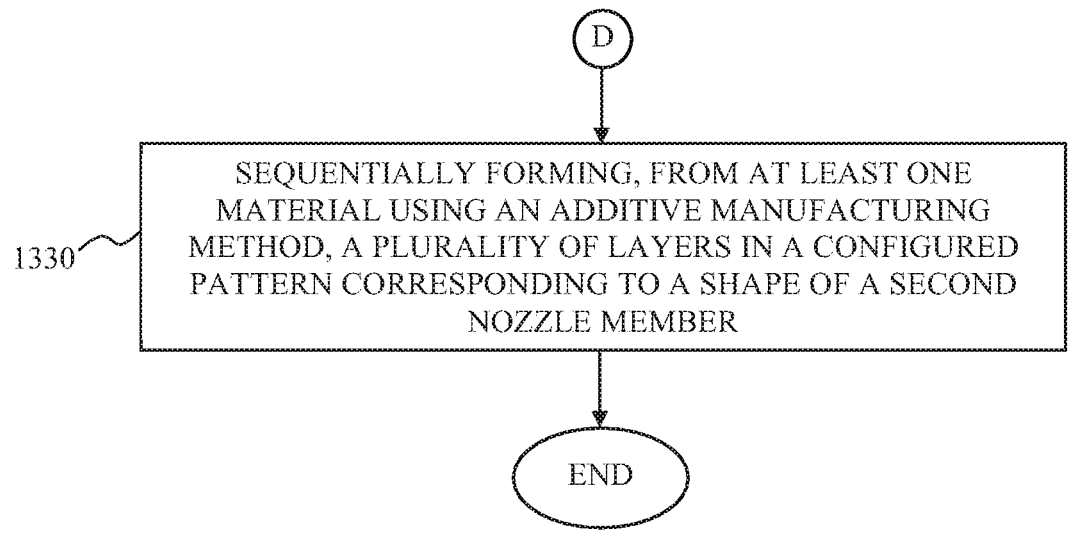

As shown in FIG. 29, in configurations in which the at least one nozzle member may comprise a first nozzle member, the method may further comprise optional Step 1330 in which a plurality of layers in a configured pattern corresponding to a shape of a second nozzle member are sequentially formed from at least one material using an additive manufacturing method. In some examples, the at least one dimension of the passageway may be configured to maintain a mass flow rate of the first fluid through the slot, the mass flow rate being substantially constant across a width of the passageway in a cross direction (CD). In other examples, the passageway may extend up to within 0.2 mm of opposing outer end surfaces of the at least one of the first nozzle member or the second nozzle member. In further examples, a first portion of at least one of the first nozzle member or the second nozzle member may comprise a first material having a first set of properties and a second portion of the at least one of the first nozzle member or the second nozzle member may comprise a second material having a second set of properties, the first set of properties being different from the second set of properties. In some particular examples, the second material may comprise a material having a greater wear resistance as compared to the first material. In yet further examples, at least one of the first nozzle member or the second nozzle member may have an internal hollow portion comprising approximately 50% of the internal volume of the one nozzle member.

Figure 30:
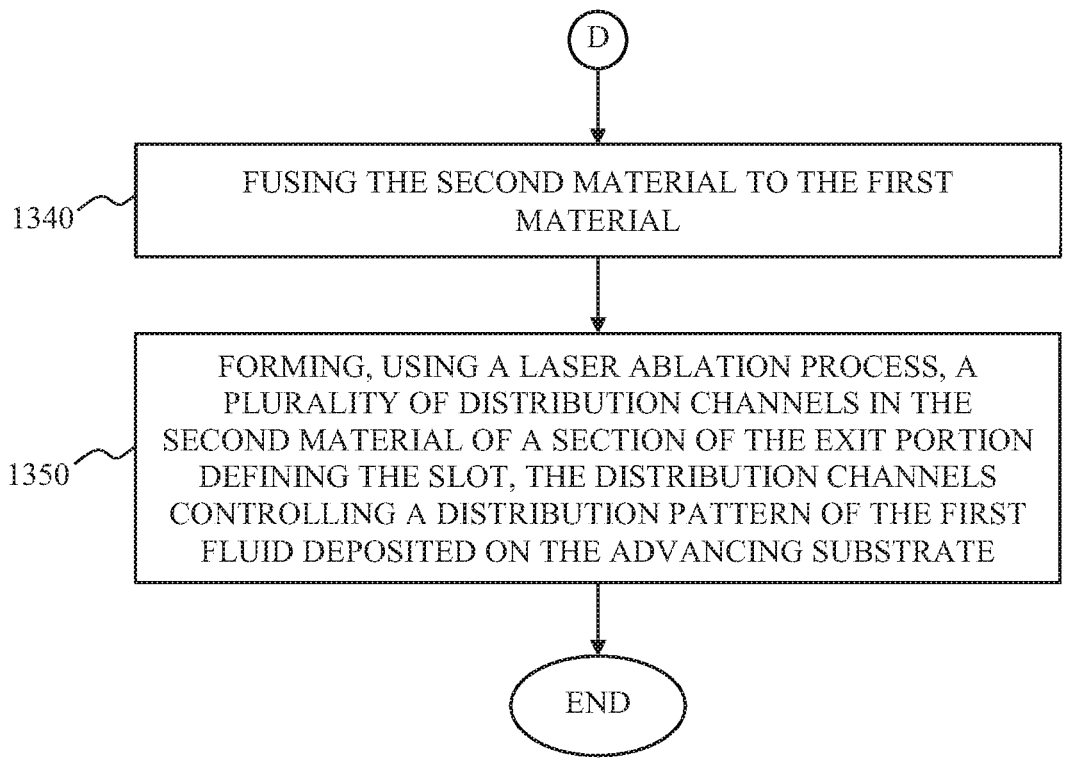
Figure 31:
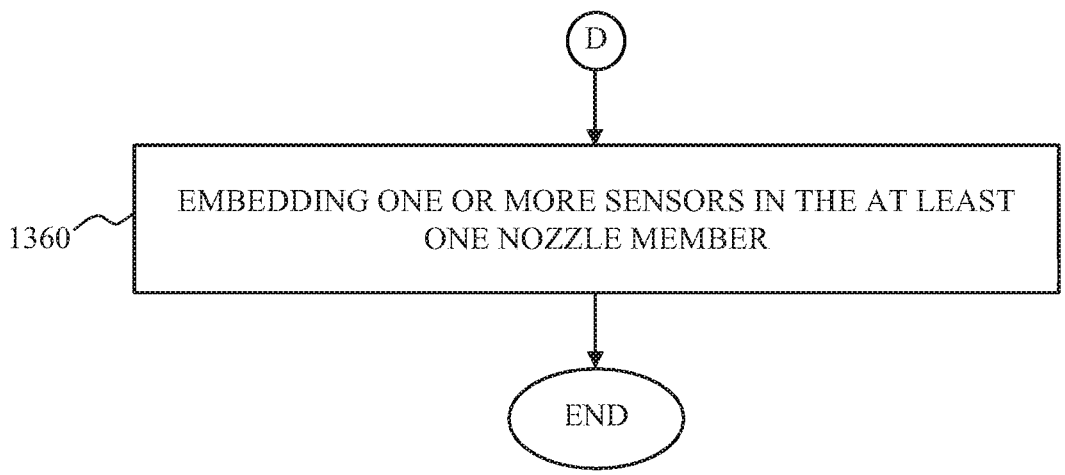

As shown in FIG. 30, in some particular configurations in which at least one of the first nozzle member or the second nozzle member comprises the passageway and the slot and the second portion comprises an exit portion of the at least one of the first nozzle member or the second nozzle member, the method may further comprise the optional steps of fusing the second material to the first material at Step 1340, and forming, using a laser ablation process at Step 1350, a plurality of distribution channels in the second material of a section of the exit portion defining the slot, the distribution channels controlling a distribution pattern of the first fluid deposited on the advancing substrate. As shown in FIG. 31, the method may further comprise the optional step of embedding one or more sensors in the at least one nozzle member at Step 1360.

Figure 32A:
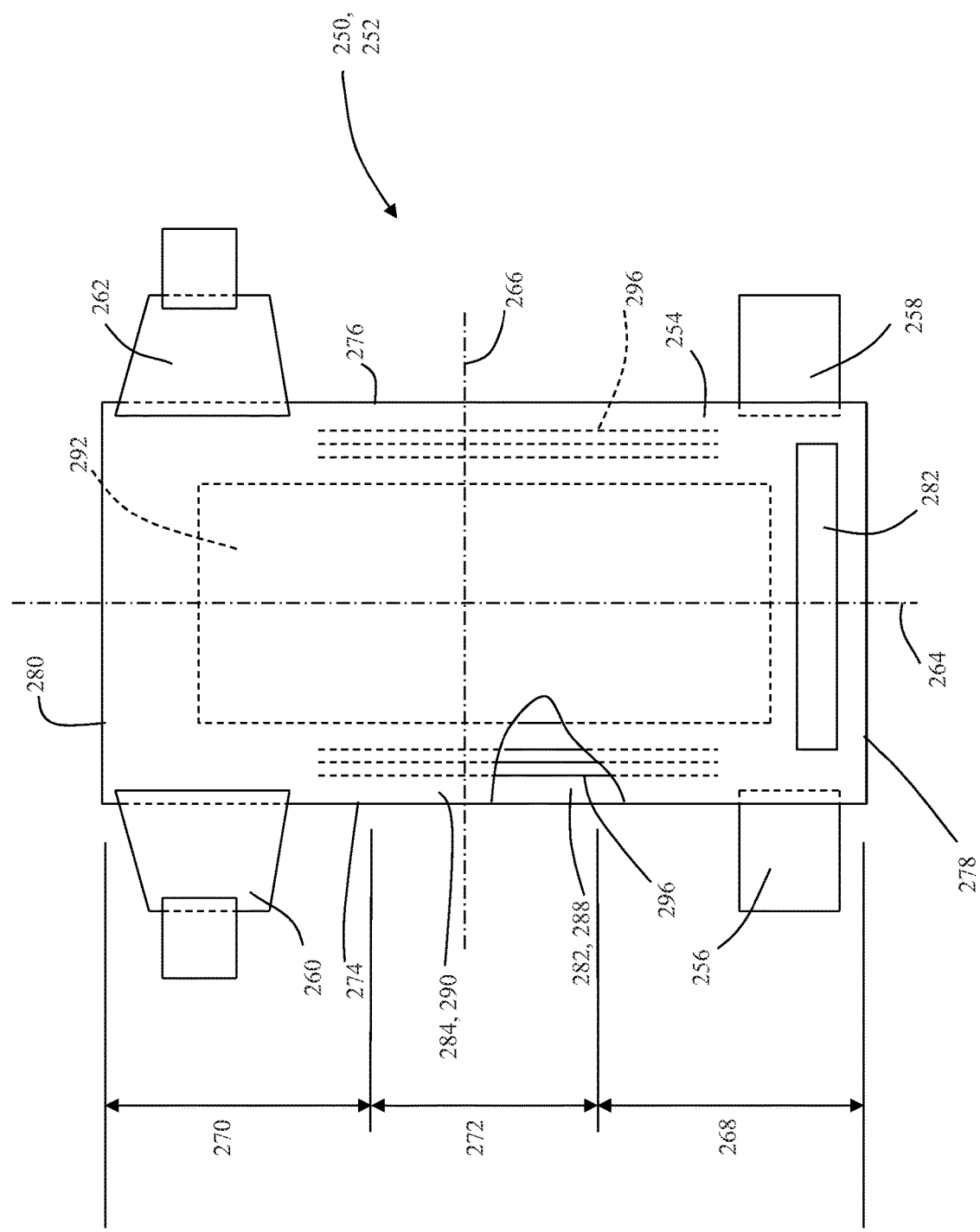
FIG. 32A is a partially cut away plan view of an absorbent article in the form of a taped diaper that may include one or more substrates and components manipulated during manufacture according to the apparatuses and methods disclosed herein with the portion of the diaper that faces away from a wearer oriented towards the viewer.
Figure 32B:
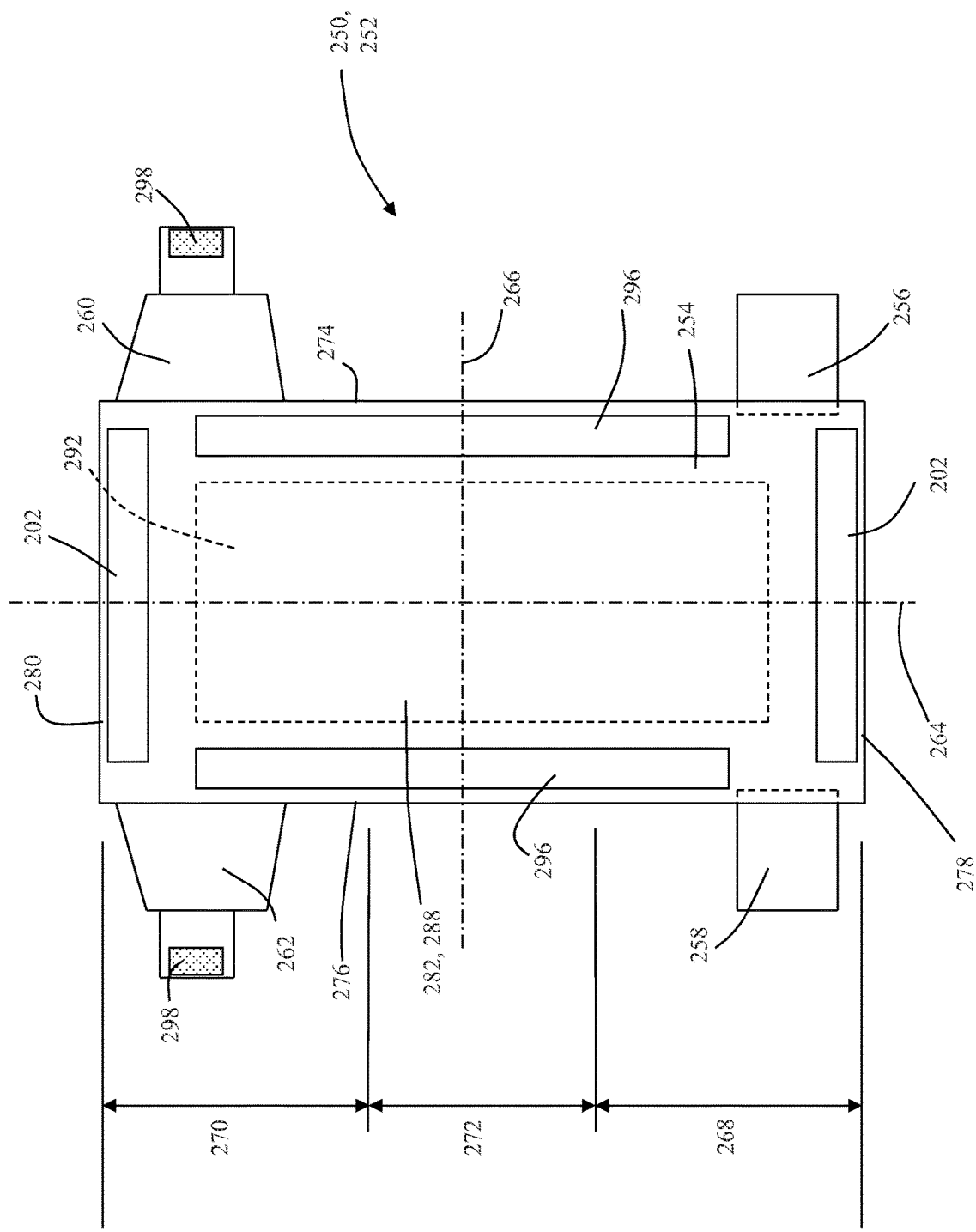
FIG. 32B is a plan view of the absorbent article of FIG. 32A that may include one or more substrates and components manipulated during manufacture according to the apparatuses and methods disclosed herein with the portion of the diaper that faces toward a wearer oriented towards the viewer.

As mentioned above, apparatuses and methods of the present disclosure may be utilized to perform various manufacturing operations on substrates used in the manufacture of absorbent articles. Such substrates may be utilized in absorbent article components such as, for example: backsheets, topsheets, absorbent cores, front and/or back ears, fastener components, and various types of elastic webs and components such as leg elastics, barrier leg cuff elastics, and waist elastics. For the purposes of a specific illustration, FIGS. 32A and 32B show an example of a disposable absorbent article 250 in the form of a diaper 252 that may be constructed from such substrates and components manipulated during manufacture according to the apparatuses and methods disclosed herein. In particular, FIG. 32A is a partially cut away plan view of an absorbent article in the form of a taped diaper that may include one or more substrates and components manipulated during manufacture according to the apparatuses and methods disclosed herein with the portion of the diaper that faces away from a wearer oriented towards the viewer. FIG. 32B is a plan view of the absorbent article of FIG. 32A that may include one or more substrates and components manipulated during manufacture according to the apparatuses and methods disclosed herein with the portion of the diaper that faces toward a wearer oriented towards the viewer.

As shown in FIGS. 32A and 32B, the diaper 252 includes a chassis 254 having a first ear 256, a second ear 258, a third ear 260, and a fourth ear 262. To provide a frame of reference for the present discussion, the chassis is shown with a longitudinal axis 264 and a lateral axis 266. The chassis 254 is shown as having a first waist region 268, a second waist region 270, and a crotch region 272 disposed intermediate the first and second waist regions. The periphery of the diaper is defined by a pair of longitudinally extending side edges 274, 276; a first outer edge 278 extending laterally adjacent the first waist region 268; and a second outer edge 280 extending laterally adjacent the second waist region 270. As shown in FIGS. 32A and 32B, the chassis 254 includes an inner, body-facing surface 282, and an outer, garment-facing surface 284. A portion of the chassis structure is cut-away in FIGS. 32A and 32B to more clearly show the construction of and various features that may be included in the diaper. As shown in FIGS. 32A and 32B, the chassis 254 of the diaper 252 may include a topsheet 288 defining the inner, body-facing surface 282, and a backsheet 290 defining the outer, garment-facing surface 284. An absorbent core 292 may be disposed between a portion of the topsheet 288 and the backsheet 290. As discussed in more detail below, any one or more of the regions may be stretchable and may include an elastomeric material or laminate as described herein. As such, the diaper 252 may be configured to adapt to a specific wearer's anatomy upon application and to maintain coordination with the wearer's anatomy during wear.

The absorbent article 250 may also include an elastic waist feature 202 shown in FIGS. 32A and 32B in the form of a waist band and may provide improved fit and waste containment. The elastic waist feature 202 may be configured to elastically expand and contract to dynamically fit the wearer's waist. The elastic waist feature 202 can be incorporated into the diaper and may extend at least longitudinally outwardly from the absorbent core 292 and generally form at least a portion of the first and/or second outer edges 278, 280 of the diaper 252. In addition, the elastic waist feature may extend laterally to include the ears. While the elastic waist feature 202 or any constituent elements thereof may comprise one or more separate elements affixed to the diaper, the elastic waist feature may be constructed as an extension of other elements of the diaper, such as the backsheet 290, the topsheet 288, or both the backsheet and the topsheet. In addition, the elastic waist feature 202 may be disposed on the outer, garment-facing surface 284 of the chassis 254; the inner, body-facing surface 282; or between the inner and outer facing surfaces. The elastic waist feature 202 may be constructed in a number of different configurations including those described in U.S. Patent Publication Nos. 2007/0142806 A1; 2007/0142798 A1; and 2007/0287983 A1.

As shown in FIGS. 32A and 32B, the diaper 252 may include leg cuffs 296 that may provide improved containment of liquids and other body exudates. In particular, elastic gasketing leg cuffs can provide a sealing effect around the wearer's thighs to prevent leakage. It is to be appreciated that when the diaper is worn, the leg cuffs may be placed in contact with the wearer's thighs, and the extent of that contact and contact pressure may be determined in part by the orientation of diaper on the body of the wearer. The leg cuffs 296 may be disposed in various ways on the diaper 202.

The diaper 252 may be provided in the form of a pant-type diaper or may alternatively be provided with a re-closable fastening system, which may include fastener elements in various locations to help secure the diaper in position on the wearer. For example, fastener elements 298 may be located on the ears and may be adapted to releasably connect with one or more corresponding fastening elements located in the first or second waist regions. For example, as shown in FIG. 32A, the diaper 252 may include a connection zone 282, sometimes referred to as a landing zone, in the first waist region 268. It is to be appreciated that various types of fastening elements may be used with the diaper. Additional non-limiting examples of absorbent articles such as panty liners and sanitary napkins include those disclosed in U.S. Pat. Nos. 4,324,246; 4,463,045; 4,342,314; 4,556,146; 4,589,876; 4,687,478; 4,950,264; 5,009,653; 5,267,992; and 6,004,893.

This application claims the benefit of U.S. Provisional Application No. 62/643,785, filed on Mar. 16, 2018, the entireties of which are all incorporated by reference herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for applying a first fluid to an advancing substrate, the apparatus comprising:
   a nozzle body made, at least in part, using an additive manufacturing method, the nozzle body comprises an upper nozzle assembly comprising at least one first material and a lower nozzle assembly comprising at least one second material; and a thermally insulating material positioned between and separating the upper and lower nozzle assemblies to minimize heat transfer from the upper nozzle assembly to the lower nozzle assembly; the at least one first material comprises one or more metals having a high thermal conductivity; and the at least one second material comprises one or more polymers having a resistance to heat, the nozzle body further comprises:
- a fluid orifice for receiving the first fluid;
- a conduit in fluid communication with the fluid orifice for receiving the first fluid received by the fluid orifice;
- a passageway in fluid communication with the conduit for receiving the first fluid received by the conduit; and
- a slot in fluid communication with the passageway for applying the first fluid to the advancing substrate.

2. The apparatus of claim 1, wherein:
the nozzle body comprises an upper nozzle assembly comprising a first nozzle member and a second nozzle member;
at least one of the first nozzle member and the second nozzle member comprises the passageway and the slot;
wherein a first portion of at least one of the first nozzle member and the second nozzle member comprises a first material having a first set of properties and a second portion of at least one of the first nozzle member and the second nozzle member comprises a second material having a second set of properties, the first set of properties being different from the second set of properties;
the second portion comprises an exit portion, the second material being fused to the first material; and
a section of the respective exit portion defines the slot and comprises a plurality of distribution channels formed in the second material by a laser ablation process, the distribution channels controlling a distribution pattern of the first fluid deposited on the advancing substrate.

3. The apparatus of claim 1, further comprising at least one sensor embedded into a portion of the nozzle body.

4. The apparatus of claim 3, further comprising a controller coupled to the at least one sensor for receiving data from the at least one sensor, wherein the controller controls operation of the apparatus based on the data.

5. An apparatus for applying a first fluid to an advancing substrate, the apparatus comprising:
a nozzle assembly comprising a nozzle body made, at least in part, using an additive manufacturing method, the nozzle body comprises an upper nozzle assembly comprising at least one first material and a lower nozzle assembly comprising at least one second material; and a thermally insulating material positioned between and separating the upper and lower nozzle assemblies to minimize heat transfer from the upper nozzle assembly to the lower nozzle assembly; the at least one first material comprises one or more metals having a high thermal conductivity; and the at least one second material comprises one or more polymers having a resistance to heat, the nozzle body further comprising:
a fluid orifice for receiving the first fluid;
a conduit in fluid communication with the fluid orifice for receiving the first fluid received by the fluid orifice;
a passageway in fluid communication with the fluid orifice for receiving the first fluid received by the conduit;
a slot in fluid communication with the passageway for applying the first fluid to the advancing substrate; and
a heating element embedded or formed into a portion of the nozzle body adjacent to at least one of the fluid orifice, the conduit, the passageway, and the slot, wherein the heating element is adapted to provide heat energy to the portion of the nozzle body.

6. The apparatus of claim 5, wherein the upper nozzle assembly comprising a first nozzle member and a second nozzle member
at least one of the first nozzle member and the second nozzle member comprises the passageway;
at least one dimension of the passageway is configured to manage a pressure profile of the first fluid through the passageway; and
wherein the at least one dimension of the passageway is configured to maintain a mass flow rate of the first fluid through the slot, the mass flow rate being substantially constant across a width of the passageway in a cross direction (CD).

7. The apparatus of claim 6, wherein:
the at least one of the first nozzle member and the second nozzle member comprises the passageway and the slot;
the at least one of the first nozzle member and the second nozzle member further comprises an exit portion, the at least one second material being fused to the at least one first material; and
a section of the respective exit portion defines the slot and comprises a plurality of distribution channels formed in the second material by a laser ablation process, the distribution channels controlling a distribution pattern of the first fluid deposited on the advancing substrate.

8. The apparatus of claim 5, wherein the nozzle body comprises an upper nozzle assembly comprising a first nozzle member and a second nozzle member
at least one of the first nozzle member and the second nozzle member comprises the passageway;
at least one dimension of the passageway is configured to manage a pressure profile of the first fluid through the passageway; and
wherein the passageway extends up to within 0.2 mm of opposing outer end surfaces of the at least one of the first nozzle member or the second nozzle member.

9. The apparatus of claim 5, further comprising at least one sensor embedded into a portion of the nozzle body; and a controller coupled to the at least one sensor for receiving data from the at least one sensor, wherein the controller controls operation of the apparatus based on the data.

10. An apparatus for applying a first fluid to an advancing substrate, the apparatus comprising:
a nozzle assembly comprising a nozzle body made, at least in part, using an additive manufacturing method, the nozzle body comprises an upper nozzle assembly comprising at least one first material and a lower nozzle assembly comprising at least one second material; and a thermally insulating material positioned between and separating the upper and lower nozzle assemblies to minimize heat transfer from the upper nozzle assembly to the lower nozzle assembly; the at least one first material comprises one or more metals having a high thermal conductivity; and the at least one second material comprises one or more polymers having a resistance to heat, the nozzle assembly further comprising:
a fluid orifice for receiving the first fluid;
a conduit in fluid communication with the fluid orifice for receiving the first fluid received by the fluid orifice;

a passageway in fluid communication with the fluid orifice for receiving the first fluid received by the conduit; and a slot in fluid communication with the passageway for applying the first fluid to the advancing substrate, wherein the slot comprises a plurality of distribution channels formed by a laser ablation process, the distribution channels controlling a distribution pattern of the first fluid deposited on the advancing substrate.

11. The apparatus of claim 10, wherein:
the at least one first material comprises at least one of an iron-based alloy, an aluminum-based alloy, a titanium-based alloy, a nickel-based alloy, and a high-alloy steel with one or more carbides.

12. The apparatus of claim 10, further comprising a heating element embedded or formed into a portion of the nozzle body adjacent to at least one of the fluid orifice, the conduit, the passageway, and the slot, wherein the heating element is adapted to provide heat energy to the portion of the nozzle body.

13. The apparatus of claim 10, wherein: at least one dimension of the passageway is configured to manage a pressure profile of the first fluid through the passageway, wherein the at least one dimension of the passageway is configured to maintain a mass flow rate of the first fluid through the slot, the mass flow rate being substantially constant across a width of the passageway in a cross direction (CD).

* * * * *